United States Patent
Cebe et al.

(10) Patent No.: US 12,522,654 B2
(45) Date of Patent: *Jan. 13, 2026

(54) ENGINEERED HETERODIMERIC PROTEINS

(71) Applicant: Novartis AG, Basel (CH)

(72) Inventors: Regis Cebe, Saint-Louis (FR);
Sebastien Irigaray, Mulhouse (FR);
Darko Skegro, Grenchen (CH)

(73) Assignee: Novartis AG, Basel (CH)

( * ) Notice: Subject to any disclaimer, the term of this patent is extended or adjusted under 35 U.S.C. 154(b) by 625 days.

This patent is subject to a terminal disclaimer.

(21) Appl. No.: 18/049,747

(22) Filed: Oct. 26, 2022

(65) Prior Publication Data

US 2023/0295291 A1 Sep. 21, 2023

Related U.S. Application Data

(63) Continuation of application No. 16/483,185, filed as application No. PCT/IB2018/051305 on Mar. 1, 2018, now Pat. No. 11,685,776.

(60) Provisional application No. 62/465,937, filed on Mar. 2, 2017.

(51) Int. Cl.
*C12P 21/06* (2006.01)
*C07K 16/24* (2006.01)
*C07K 16/28* (2006.01)
*C07K 16/00* (2006.01)

(52) U.S. Cl.
CPC ........ *C07K 16/244* (2013.01); *C07K 16/2863* (2013.01); *C07K 2317/31* (2013.01); *C07K 2317/50* (2013.01); *C07K 2317/522* (2013.01); *C07K 2317/55* (2013.01); *C07K 2317/60* (2013.01); *C07K 2317/66* (2013.01)

(58) Field of Classification Search
None
See application file for complete search history.

(56) References Cited

U.S. PATENT DOCUMENTS

| | | |
|---|---|---|
| 7,276,585 B2 | 10/2007 | Lazar et al. |
| 7,951,917 B1 | 5/2011 | Arathoon et al. |
| 2012/0328612 A1 | 12/2012 | Grosse-Hovest et al. |
| 2014/0348839 A1 | 11/2014 | Chowdhury et al. |
| 2015/0315296 A1 | 11/2015 | Schaefer et al. |
| 2017/0129962 A1 | 5/2017 | Regula et al. |

FOREIGN PATENT DOCUMENTS

| | | |
|---|---|---|
| WO | 2013065708 A1 | 5/2013 |
| WO | 2014081955 A1 | 5/2014 |

OTHER PUBLICATIONS

Brinkmann, et al., The making of bispecific antibodies, mAbs, 2017, 182-212, 9(2).
Griffin, et al., Analysis of heavy and light chain sequences of conventional camelid antibodies from *Camelus dromedarius* and *Camelus bactrianus* species, Journal of Immunological Methods, Jan. 18, 2014, 35-46, 405.
Yan, Medical Immunology, China Medical Science and Technology Press, Jul. 31, 2016, 22-25.

*Primary Examiner* — Chun W Dahle
(74) *Attorney, Agent, or Firm* — Linyu L. Mitra

(57) ABSTRACT

The present invention provides heterodimeric antibodies and fragments thereof and methods for their preparation, wherein the pairing of heavy and light chains has been improved. Interface residues were mutated such that each light chain strongly favoured its cognate heavy chain when two different heavy chains and two different light chains were co-transfected and co-expressed in the same cell to assemble a functional, heterodimeric antibody or fragment thereof.

16 Claims, 1 Drawing Sheet
Specification includes a Sequence Listing.

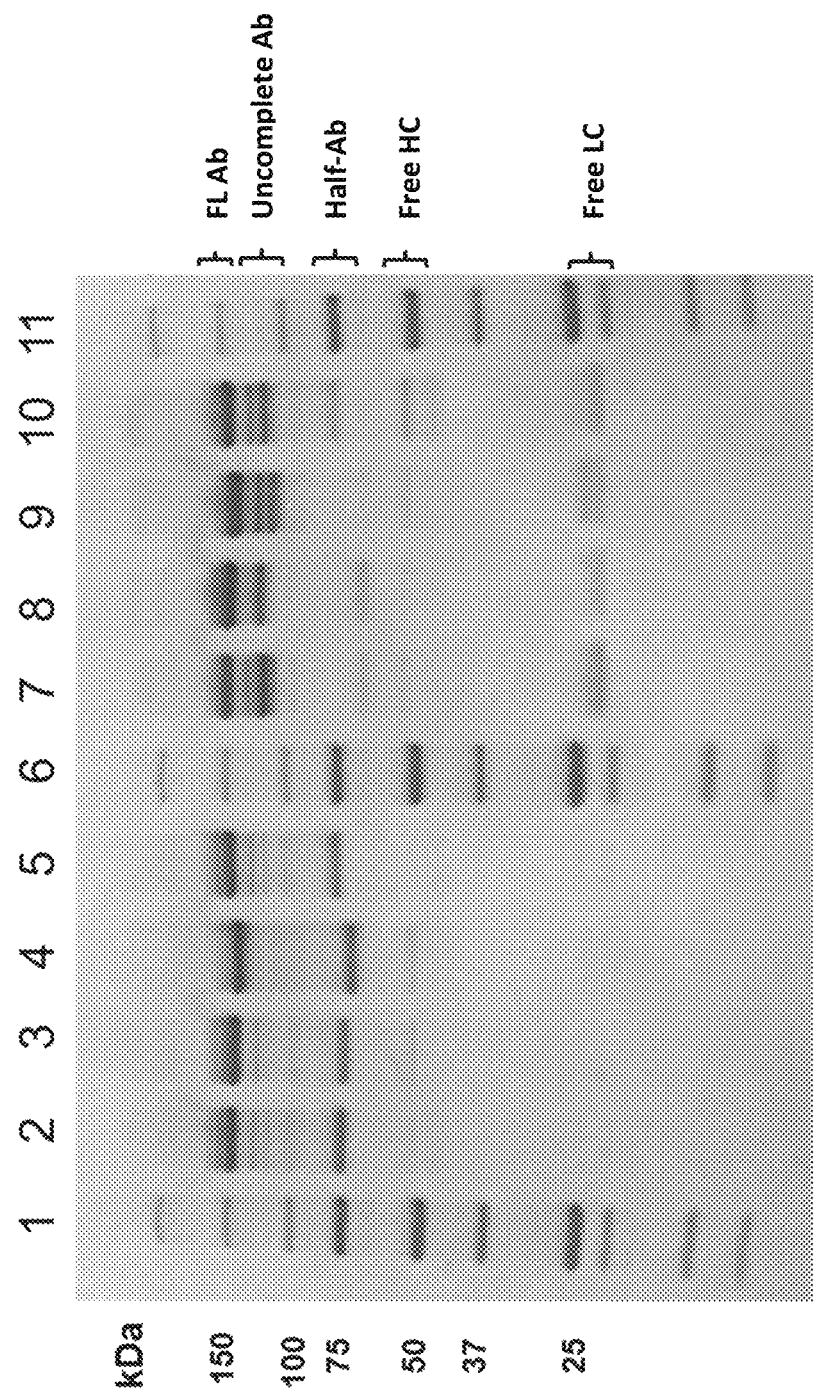

SEQUENCE LISTING

```
Sequence total quantity: 76
SEQ ID NO: 1                    moltype = AA  length = 225
FEATURE                         Location/Qualifiers
source                          1..225
                                mol_type = protein
                                organism = synthetic construct
```

```
                        note = Description of Artificial Sequence: Synthetic
                            polypeptide
SEQUENCE: 1
EVQLVESGGG LVQPGGSLRL SCAASGFAFS GYYMAWVRKA PGKGLEWVAN INYPGSSTYY    60
LDSVKGRFTI SRDNAKNSLY LQMNSLRAED TAVYYCARGD YYGTTYWYFD VWGQGTTVTV   120
SSASTKGPSV FPLAPSSKST SGGTAALGCL VDDYFPEPVT VSWNSGALTR GVHTFPAVLQ   180
SSGLYSLSSV VTVPSSSLGT QTYICNVNHK PSNTKVDKRV EPKSC                   225

SEQ ID NO: 2            moltype = AA  length = 227
FEATURE                 Location/Qualifiers
source                  1..227
                        mol_type = protein
                        organism = synthetic construct
                        note = Description of Artificial Sequence: Synthetic
                            polypeptide
SEQUENCE: 2
EVQLVESGGG LVQPGGSLRL SCAASGFAFS GYYMAWVRKA PGKGLEWVAN INYPGSSTYY    60
LDSVKGRFTI SRDNAKNSLY LQMNSLRAED TAVYYCARGD YYGTTYWYFD VWGQGTTVTV   120
SSASTKGPSV FPLAPSSKST SGGTAALGCL VDDYFPEPVT VSWNSGALTR GVHTFPAVLQ   180
SSGLYSLSSV VTVPSSSLGT QTYICNVNHK PSNTKVDKRV EPKSCAA                 227

SEQ ID NO: 3            moltype = AA  length = 225
FEATURE                 Location/Qualifiers
source                  1..225
                        mol_type = protein
                        organism = synthetic construct
                        note = Description of Artificial Sequence: Synthetic
                            polypeptide
SEQUENCE: 3
EVQLVESGGG LVQPGGSLRL SCAASGFAFS GYYMAWVRKA PGKGLEWVAN INYPGSSTYY    60
LDSVKGRFTI SRDNAKNSLY LQMNSLRAED TAVYYCARGD YYGTTYWYFD VWGQGTTVTV   120
SSASTKGPSV FPLAPSSKST SGGTAALGCL VDDYFPEPVT VSWNSGALTS GVHTFPAVLQ   180
SSGLYSLSSV VTVPSSSLGT QTYICNVNHK PSNTKVDKRV EPKSC                   225

SEQ ID NO: 4            moltype = AA  length = 225
FEATURE                 Location/Qualifiers
source                  1..225
                        mol_type = protein
                        organism = synthetic construct
                        note = Description of Artificial Sequence: Synthetic
                            polypeptide
SEQUENCE: 4
EVQLVESGGG LVQPGGSLRL SCAASGFAFS GYYMAWVRKA PGKGLEWVAN INYPGSSTYY    60
LDSVKGRFTI SRDNAKNSLY LQMNSLRAED TAVYYCARGD YYGTTYWYFD VWGQGTTVTV   120
SSASTKGPSV FPLAPSSKST SGGTAALGCL VKDYFPEPVT VSWNSGALTR GVHTFPAVLQ   180
SSGLYSLSSV VTVPSSSLGT QTYICNVNHK PSNTKVDKRV EPKSC                   225

SEQ ID NO: 5            moltype = AA  length = 225
FEATURE                 Location/Qualifiers
source                  1..225
                        mol_type = protein
                        organism = synthetic construct
                        note = Description of Artificial Sequence: Synthetic
                            polypeptide
SEQUENCE: 5
EVQLVESGGG LVQPGGSLRL SCAASGFAFS GYYMAWVRDA PGKGLEWVAN INYPGSSTYY    60
LDSVKGRFTI SRDNAKNSLY LQMNSLRAED TAVYYCARGD YYGTTYWYFD VWGQGTTVTV   120
SSASTKGPSV FPLAPSSKST SGGTAALGCL VKDYFPEPVT VSWNSGALTD GVHTFPAVLQ   180
SSGLYSLSSV VTVPSSSLGT QTYICNVNHK PSNTKVDKRV EPKSC                   225

SEQ ID NO: 6            moltype = AA  length = 227
FEATURE                 Location/Qualifiers
source                  1..227
                        mol_type = protein
                        organism = synthetic construct
                        note = Description of Artificial Sequence: Synthetic
                            polypeptide
SEQUENCE: 6
EVQLVESGGG LVQPGGSLRL SCAASGFAFS GYYMAWVRDA PGKGLEWVAN INYPGSSTYY    60
LDSVKGRFTI SRDNAKNSLY LQMNSLRAED TAVYYCARGD YYGTTYWYFD VWGQGTTVTV   120
SSASTKGPSV FPLAPSSKST SGGTAALGCL VKDYFPEPVT VSWNSGALTD GVHTFPAVLQ   180
SSGLYSLSSV VTVPSSSLGT QTYICNVNHK PSNTKVDKRV EPKSCAA                 227

SEQ ID NO: 7            moltype = AA  length = 225
FEATURE                 Location/Qualifiers
source                  1..225
```

```
                    mol_type = protein
                    organism = synthetic construct
                    note = Description of Artificial Sequence: Synthetic
                       polypeptide
SEQUENCE: 7
EVQLVESGGG LVQPGGSLRL SCAASGFAFS GYYMAWVRQA PGKGLEWVAN INYPGSSTYY   60
LDSVKGRFTI SRDNAKNSLY LQMNSLRAED TAVYYCARGD YYGTTYWYFD VWGQGTTVTV  120
SSASTKGPSV FPLAPSSKST SGGTAALGCL VKDYFPEPVT VSWNSGALTS GVHTFPAVLQ  180
SSGLYSLSSV VTVPSSSLGT QTYICNVNHK PSNTKVDKRV EPKSC              225

SEQ ID NO: 8            moltype = AA  length = 227
FEATURE                 Location/Qualifiers
source                  1..227
                        mol_type = protein
                        organism = synthetic construct
                        note = Description of Artificial Sequence: Synthetic
                           polypeptide
SEQUENCE: 8
EVQLVESGGG LVQPGGSLRL SCAASGFAFS GYYMAWVRQA PGKGLEWVAN INYPGSSTYY   60
LDSVKGRFTI SRDNAKNSLY LQMNSLRAED TAVYYCARGD YYGTTYWYFD VWGQGTTVTV  120
SSASTKGPSV FPLAPSSKST SGGTAALGCL VKDYFPEPVT VSWNSGALTS GVHTFPAVLQ  180
SSGLYSLSSV VTVPSSSLGT QTYICNVNHK PSNTKVDKRV EPKSCAA            227

SEQ ID NO: 9            moltype = AA  length = 225
FEATURE                 Location/Qualifiers
source                  1..225
                        mol_type = protein
                        organism = synthetic construct
                        note = Description of Artificial Sequence: Synthetic
                           polypeptide
SEQUENCE: 9
EVQLVESGGG LVQPGGSLRL SCAASGFAFS GYYMAWVRQA PGKGLEWVAN INYPGSSTYY   60
LDSVKGRFTI SRDNAKNSLY LQMNSLRAED TAVYYCARGD YYGTTYWYFD VWGQGTTVTV  120
SSASTKGPSV FPLAPSSKST SGGTAALGCL VDDYFPEPVT VSWNSGALTR GVHTFPAVLQ  180
SSGLYSLSSV VTVPSSSLGT QTYICNVNHK PSNTKVDKRV EPKSC              225

SEQ ID NO: 10           moltype = AA  length = 225
FEATURE                 Location/Qualifiers
source                  1..225
                        mol_type = protein
                        organism = synthetic construct
                        note = Description of Artificial Sequence: Synthetic
                           polypeptide
SEQUENCE: 10
EVQLVESGGG LVQPGGSLRL SCAASGFAFS GYYMAWVRKA PGKGLEWVAN INYPGSSTYY   60
LDSVKGRFTI SRDNAKNSLY LQMNSLRAED TAVYYCARGD YYGTTYWYFD VWGQGTTVTV  120
SSASTKGPSV FPLAPSSKST SGGTAALGCL VKDYFPEPVT VSWNSGALTS GVHTFPAVLQ  180
SSGLYSLSSV VTVPSSSLGT QTYICNVNHK PSNTKVDKRV EPKSC              225

SEQ ID NO: 11           moltype = AA  length = 225
FEATURE                 Location/Qualifiers
source                  1..225
                        mol_type = protein
                        organism = synthetic construct
                        note = Description of Artificial Sequence: Synthetic
                           polypeptide
SEQUENCE: 11
EVQLVESGGG LVQPGGSLRL SCAASGFAFS GYYMAWVRQA PGKGLEWVAN INYPGSSTYY   60
LDSVKGRFTI SRDNAKNSLY LQMNSLRAED TAVYYCARGD YYGTTYWYFD VWGQGTTVTV  120
SSASTKGPSV FPLAPSSKST SGGTAALGCL VDDYFPEPVT VSWNSGALTS GVHTFPAVLQ  180
SSGLYSLSSV VTVPSSSLGT QTYICNVNHK PSNTKVDKRV EPKSC              225

SEQ ID NO: 12           moltype = AA  length = 225
FEATURE                 Location/Qualifiers
source                  1..225
                        mol_type = protein
                        organism = synthetic construct
                        note = Description of Artificial Sequence: Synthetic
                           polypeptide
SEQUENCE: 12
EVQLVESGGG LVQPGGSLRL SCAASGFAFS GYYMAWVRQA PGKGLEWVAN INYPGSSTYY   60
LDSVKGRFTI SRDNAKNSLY LQMNSLRAED TAVYYCARGD YYGTTYWYFD VWGQGTTVTV  120
SSASTKGPSV FPLAPSSKST SGGTAALGCL VKDYFPEPVT VSWNSGALTR GVHTFPAVLQ  180
SSGLYSLSSV VTVPSSSLGT QTYICNVNHK PSNTKVDKRV EPKSC              225

SEQ ID NO: 13           moltype = AA  length = 225
FEATURE                 Location/Qualifiers
source                  1..225
                        mol_type = protein
```

```
                            organism = synthetic construct
                            note = Description of Artificial Sequence: Synthetic
                              polypeptide
SEQUENCE: 13
EVQLVESGGG LVQPGGSLRL SCAASGFAFS GYYMAWVRDA PGKGLEWVAN INYPGSSTYY     60
LDSVKGRFTI SRDNAKNSLY LQMNSLRAED TAVYYCARGD YYGTTYWYFD VWGQGTTVTV    120
SSASTKGPSV FPLAPSSKST SGGTAALGCL VKDYFPEPVT VSWNSGALTS GVHTFPAVLQ    180
SSGLYSLSSV VTVPSSSLGT QTYICNVNHK PSNTKVDKRV EPKSC                    225

SEQ ID NO: 14               moltype = AA   length = 225
FEATURE                     Location/Qualifiers
source                      1..225
                            mol_type = protein
                            organism = synthetic construct
                            note = Description of Artificial Sequence: Synthetic
                              polypeptide
SEQUENCE: 14
EVQLVESGGG LVQPGGSLRL SCAASGFAFS GYYMAWVRQA PGKGLEWVAN INYPGSSTYY     60
LDSVKGRFTI SRDNAKNSLY LQMNSLRAED TAVYYCARGD YYGTTYWYFD VWGQGTTVTV    120
SSASTKGPSV FPLAPSSKST SGGTAALGCL VKDYFPEPVT VSWNSGALTD GVHTFPAVLQ    180
SSGLYSLSSV VTVPSSSLGT QTYICNVNHK PSNTKVDKRV EPKSC                    225

SEQ ID NO: 15               moltype = AA   length = 213
FEATURE                     Location/Qualifiers
source                      1..213
                            mol_type = protein
                            organism = synthetic construct
                            note = Description of Artificial Sequence: Synthetic
                              polypeptide
SEQUENCE: 15
DIQMTQSPSS LSASVGDRVT ITCRASQSIS SYLNWYQDKP GKAPKLLIYY TSRLQSGVPS     60
RFSGSGSGTD FTLTISSLQP EDFATYYCQQ GRRLWSFGGG TKVEIKRTVA APSVFIFPPS    120
DEKLKSGTAS VVCLLNNFYP REAKVQWKVD NALQSGNSQE SVTEQDSDDS TYSLSSTLTL    180
SKADYEKHKV YACEVTHQGL SSPVTKSFNR GEC                                 213

SEQ ID NO: 16               moltype = AA   length = 215
FEATURE                     Location/Qualifiers
source                      1..215
                            mol_type = protein
                            organism = synthetic construct
                            note = Description of Artificial Sequence: Synthetic
                              polypeptide
SEQUENCE: 16
DIQMTQSPSS LSASVGDRVT ITCRASQSIS SYLNWYQDKP GKAPKLLIYY TSRLQSGVPS     60
RFSGSGSGTD FTLTISSLQP EDFATYYCQQ GRRLWSFGGG TKVEIKRTVA APSVFIFPPS    120
DEKLKSGTAS VVCLLNNFYP REAKVQWKVD NALQSGNSQE SVTEQDSDDS TYSLSSTLTL    180
SKADYEKHKV YACEVTHQGL SSPVTKSFNR GECAA                               215

SEQ ID NO: 17               moltype = AA   length = 213
FEATURE                     Location/Qualifiers
source                      1..213
                            mol_type = protein
                            organism = synthetic construct
                            note = Description of Artificial Sequence: Synthetic
                              polypeptide
SEQUENCE: 17
DIQMTQSPSS LSASVGDRVT ITCRASQSIS SYLNWYQDKP GKAPKLLIYY TSRLQSGVPS     60
RFSGSGSGTD FTLTISSLQP EDFATYYCQQ GRRLWSFGGG TKVEIKRTVA APSVFIFPPS    120
DEKLKSGTAS VVCLLNNFYP REAKVQWKVD NALQSGNSQE SVTEQDSKDS TYSLSSTLTL    180
SKADYEKHKV YACEVTHQGL SSPVTKSFNR GEC                                 213

SEQ ID NO: 18               moltype = AA   length = 213
FEATURE                     Location/Qualifiers
source                      1..213
                            mol_type = protein
                            organism = synthetic construct
                            note = Description of Artificial Sequence: Synthetic
                              polypeptide
SEQUENCE: 18
DIQMTQSPSS LSASVGDRVT ITCRASQSIS SYLNWYQDKP GKAPKLLIYY TSRLQSGVPS     60
RFSGSGSGTD FTLTISSLQP EDFATYYCQQ GRRLWSFGGG TKVEIKRTVA APSVFIFPPS    120
DEQLKSGTAS VVCLLNNFYP REAKVQWKVD NALQSGNSQE SVTEQDSDDS TYSLSSTLTL    180
SKADYEKHKV YACEVTHQGL SSPVTKSFNR GEC                                 213

SEQ ID NO: 19               moltype = AA   length = 213
FEATURE                     Location/Qualifiers
source                      1..213
                            mol_type = protein
                            organism = synthetic construct
```

```
                    note = Description of Artificial Sequence: Synthetic
                        polypeptide
SEQUENCE: 19
DIQMTQSPSS LSASVGDRVT ITCRASQSIS SYLNWYQKKP GKAPKLLIYY TSRLQSGVPS    60
RFSGSGSGTD FTLTISSLQP EDFATYYCQQ GRRLWSFGGG TKVEIKRTVA APSVFIFPPS   120
DEDLKSGTAS VVCLLNNFYP REAKVQWKVD NALQSGNSQE SVTEQDSKDS TYSLSSTLTL   180
SKADYEKHKV YACEVTHQGL SSPVTKSFNR GEC                                213

SEQ ID NO: 20           moltype = AA  length = 215
FEATURE                 Location/Qualifiers
source                  1..215
                        mol_type = protein
                        organism = synthetic construct
                        note = Description of Artificial Sequence: Synthetic
                            polypeptide
SEQUENCE: 20
DIQMTQSPSS LSASVGDRVT ITCRASQSIS SYLNWYQKKP GKAPKLLIYY TSRLQSGVPS    60
RFSGSGSGTD FTLTISSLQP EDFATYYCQQ GRRLWSFGGG TKVEIKRTVA APSVFIFPPS   120
DEDLKSGTAS VVCLLNNFYP REAKVQWKVD NALQSGNSQE SVTEQDSKDS TYSLSSTLTL   180
SKADYEKHKV YACEVTHQGL SSPVTKSFNR GECAA                              215

SEQ ID NO: 21           moltype = AA  length = 213
FEATURE                 Location/Qualifiers
source                  1..213
                        mol_type = protein
                        organism = synthetic construct
                        note = Description of Artificial Sequence: Synthetic
                            polypeptide
SEQUENCE: 21
DIQMTQSPSS LSASVGDRVT ITCRASQSIS SYLNWYQQKP GKAPKLLIYY TSRLQSGVPS    60
RFSGSGSGTD FTLTISSLQP EDFATYYCQQ GRRLWSFGGG TKVEIKRTVA APSVFIFPPS   120
DEQLKSGTAS VVCLLNNFYP REAKVQWKVD NALQSGNSQE SVTEQDSKDS TYSLSSTLTL   180
SKADYEKHKV YACEVTHQGL SSPVTKSFNR GEC                                213

SEQ ID NO: 22           moltype = AA  length = 215
FEATURE                 Location/Qualifiers
source                  1..215
                        mol_type = protein
                        organism = synthetic construct
                        note = Description of Artificial Sequence: Synthetic
                            polypeptide
SEQUENCE: 22
DIQMTQSPSS LSASVGDRVT ITCRASQSIS SYLNWYQQKP GKAPKLLIYY TSRLQSGVPS    60
RFSGSGSGTD FTLTISSLQP EDFATYYCQQ GRRLWSFGGG TKVEIKRTVA APSVFIFPPS   120
DEQLKSGTAS VVCLLNNFYP REAKVQWKVD NALQSGNSQE SVTEQDSKDS TYSLSSTLTL   180
SKADYEKHKV YACEVTHQGL SSPVTKSFNR GECAA                              215

SEQ ID NO: 23           moltype = AA  length = 213
FEATURE                 Location/Qualifiers
source                  1..213
                        mol_type = protein
                        organism = synthetic construct
                        note = Description of Artificial Sequence: Synthetic
                            polypeptide
SEQUENCE: 23
DIQMTQSPSS LSASVGDRVT ITCRASQSIS SYLNWYQQKP GKAPKLLIYY TSRLQSGVPS    60
RFSGSGSGTD FTLTISSLQP EDFATYYCQQ GRRLWSFGGG TKVEIKRTVA APSVFIFPPS   120
DEKLKSGTAS VVCLLNNFYP REAKVQWKVD NALQSGNSQE SVTEQDSDDS TYSLSSTLTL   180
SKADYEKHKV YACEVTHQGL SSPVTKSFNR GEC                                213

SEQ ID NO: 24           moltype = AA  length = 213
FEATURE                 Location/Qualifiers
source                  1..213
                        mol_type = protein
                        organism = synthetic construct
                        note = Description of Artificial Sequence: Synthetic
                            polypeptide
SEQUENCE: 24
DIQMTQSPSS LSASVGDRVT ITCRASQSIS SYLNWYQQKP GKAPKLLIYY TSRLQSGVPS    60
RFSGSGSGTD FTLTISSLQP EDFATYYCQQ GRRLWSFGGG TKVEIKRTVA APSVFIFPPS   120
DEKLKSGTAS VVCLLNNFYP REAKVQWKVD NALQSGNSQE SVTEQDSKDS TYSLSSTLTL   180
SKADYEKHKV YACEVTHQGL SSPVTKSFNR GEC                                213
```

```
SEQ ID NO: 25          moltype = AA   length = 213
FEATURE                Location/Qualifiers
source                 1..213
                       mol_type = protein
                       organism = synthetic construct
                       note = Description of Artificial Sequence: Synthetic
                       polypeptide
SEQUENCE: 25
DIQMTQSPSS LSASVGDRVT ITCRASQSIS SYLNWYQDKP GKAPKLLIYY TSRLQSGVPS    60
RFSGSGSGTD FTLTISSLQP EDFATYYCQQ GRRLWSFGGG TKVEIKRTVA APSVFIFPPS   120
DEQLKSGTAS VVCLLNNFYP REAKVQWKVD NALQSGNSQE SVTEQDSKDS TYSLSSTLTL   180
SKADYEKHKV YACEVTHQGL SSPVTKSFNR GEC                                213

SEQ ID NO: 26          moltype = AA   length = 213
FEATURE                Location/Qualifiers
source                 1..213
                       mol_type = protein
                       organism = synthetic construct
                       note = Description of Artificial Sequence: Synthetic
                       polypeptide
SEQUENCE: 26
DIQMTQSPSS LSASVGDRVT ITCRASQSIS SYLNWYQQKP GKAPKLLIYY TSRLQSGVPS    60
RFSGSGSGTD FTLTISSLQP EDFATYYCQQ GRRLWSFGGG TKVEIKRTVA APSVFIFPPS   120
DEQLKSGTAS VVCLLNNFYP REAKVQWKVD NALQSGNSQE SVTEQDSDDS TYSLSSTLTL   180
SKADYEKHKV YACEVTHQGL SSPVTKSFNR GEC                                213

SEQ ID NO: 27          moltype = AA   length = 213
FEATURE                Location/Qualifiers
source                 1..213
                       mol_type = protein
                       organism = synthetic construct
                       note = Description of Artificial Sequence: Synthetic
                       polypeptide
SEQUENCE: 27
DIQMTQSPSS LSASVGDRVT ITCRASQSIS SYLNWYQKKP GKAPKLLIYY TSRLQSGVPS    60
RFSGSGSGTD FTLTISSLQP EDFATYYCQQ GRRLWSFGGG TKVEIKRTVA APSVFIFPPS   120
DEQLKSGTAS VVCLLNNFYP REAKVQWKVD NALQSGNSQE SVTEQDSKDS TYSLSSTLTL   180
SKADYEKHKV YACEVTHQGL SSPVTKSFNR GEC                                213

SEQ ID NO: 28          moltype = AA   length = 213
FEATURE                Location/Qualifiers
source                 1..213
                       mol_type = protein
                       organism = synthetic construct
                       note = Description of Artificial Sequence: Synthetic
                       polypeptide
SEQUENCE: 28
DIQMTQSPSS LSASVGDRVT ITCRASQSIS SYLNWYQQKP GKAPKLLIYY TSRLQSGVPS    60
RFSGSGSGTD FTLTISSLQP EDFATYYCQQ GRRLWSFGGG TKVEIKRTVA APSVFIFPPS   120
DEDLKSGTAS VVCLLNNFYP REAKVQWKVD NALQSGNSQE SVTEQDSKDS TYSLSSTLTL   180
SKADYEKHKV YACEVTHQGL SSPVTKSFNR GEC                                213

SEQ ID NO: 29          moltype = AA   length = 452
FEATURE                Location/Qualifiers
source                 1..452
                       mol_type = protein
                       organism = synthetic construct
                       note = Description of Artificial Sequence: Synthetic
                       polypeptide
SEQUENCE: 29
EVQLVESGGG LVQPGGSLRL SCAASGFAFS GYYMAWVRQA PGKGLEWVAN INYPGSSTYY    60
LDSVKGRFTI SRDNAKNSLY LQMNSLRAED TAVYYCARGD YYGTTYWYFD VWGQGTTVTV   120
SSASTKGPSV FPLAPSSKST SGGTAALGCL VKDYFPEPVT VSWNSGALTS GVHTFPAVLQ   180
SSGLYSLSSV VTVPSSSLGT QTYICNVNHK PSNTKVDKRV EPKSCDKTHT CPPCPAPELL   240
GGPSVFLFPP KPKDTLMISR TPEVTCVVVD VSHEDPEVKF NWYVDGVEVH NAKTKPREEQ   300
YNSTYRVVSV LTVLHQDWLN GKEYKCKVSN KALPAPIEKT ISKAKGQPRE PQVYTLPPSR   360
EEMTKNQVSL TCLVKGFYPS DIAVEWESNG QPENNYKTTP PVLDSDGSFF LYSKLTVDKS   420
RWQQGNVFSC SVMHEALHNH YTQKSLSLSP GK                                 452

SEQ ID NO: 30          moltype = AA   length = 213
FEATURE                Location/Qualifiers
source                 1..213
                       mol_type = protein
                       organism = synthetic construct
                       note = Description of Artificial Sequence: Synthetic
                       polypeptide
```

-continued

```
SEQUENCE: 30
DIQMTQSPSS LSASVGDRVT ITCRASQSIS SYLNWYQQKP GKAPKLLIYY TSRLQSGVPS    60
RFSGSGSGTD FTLTISSLQP EDFATYYCQQ GRRLWSFGGG TKVEIKRTVA APSVFIFPPS   120
DEQLKSGTAS VVCLLNNFYP REAKVQWKVD NALQSGNSQE SVTEQDSKDS TYSLSSTLTL   180
SKADYEKHKV YACEVTHQGL SSPVTKSFNR GEC                                213

SEQ ID NO: 31             moltype = AA   length = 447
FEATURE                   Location/Qualifiers
source                    1..447
                          mol_type = protein
                          organism = synthetic construct
                          note = Description of Artificial Sequence: Synthetic
                              polypeptide
SEQUENCE: 31
EVQLLESGGG LVQPGGSLRL SCAASGFTFS SYAMSWVRQA PGKGLEWVSV TGAVGRSTYY    60
PDSVKGRFTI SRDNSKNTLY LQMNSLRAED TAVYYCARWG DEGFDIWGQG TLVTVSSAST   120
KGPSVFPLAP SSKSTSGGTA ALGCLVKDYF PEPVTVSWNS GALTSGVHTF PAVLQSSGLY   180
SLSSVVTVPS SSLGTQTYIC NVNHKPSNTK VDKRVEPKSC DKTHTCPPCP APEAAGGPSV   240
FLFPPKPKDT LMISRTPEVT CVVVDVSHED PEVKFNWYVD GVEVHNAKTK PREEQYNSTY   300
RVVSVLTVLH QDWLNGKEYK CKVSNKALPA PIEKTISKAK GQPREPQVYT LPPSREEMTK   360
NQVSLTCLVK GFYPSDIAVE WESNGQPENN YKTTPPVLDS DGSFFLYSKL TVDKSRWQQG   420
NVFSCSVMHE ALHNHYTQKS LSLSPGK                                      447

SEQ ID NO: 32             moltype = AA   length = 214
FEATURE                   Location/Qualifiers
source                    1..214
                          mol_type = protein
                          organism = synthetic construct
                          note = Description of Artificial Sequence: Synthetic
                              polypeptide
SEQUENCE: 32
DIQMTQSPSS LSASVGDRVT ITCRASQGIS NWLAWYQQKP GKAPKLLIYG ASSLQSGVPS    60
RFSGSGSGTD FTLTISSLQP EDFATYYCQQ YSSFPTTFGQ GTKVEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214

SEQ ID NO: 33             moltype = AA   length = 446
FEATURE                   Location/Qualifiers
source                    1..446
                          mol_type = protein
                          organism = synthetic construct
                          note = Description of Artificial Sequence: Synthetic
                              polypeptide
SEQUENCE: 33
EVQLVESGGD LVQPGGSLRL SCAASGFTFS SYWMSWVRQA PGKGLEWVAN IKQDGSEKYY    60
VDSVKGRFTI SRDNAKNSLY LQMNSLRAED TAVYYCARDR GSLYYWGQGT LVTVSSASTK   120
GPSVFPLAPS SKSTSGGTAA LGCLVKDYFP EPVTVSWNSA LTSGVHTFPA VLQSSGLYS   180
LSSVVTVPSS SLGTQTYICN VNHKPSNTKV DKRVEPKSCD KTHTCPPCPA PEAAGGPSVF   240
LFPPKPKDTL MISRTPEVTC VVVDVSHEDP EVKFNWYVDG VEVHNAKTKP REEQYNSTYR   300
VVSVLTVLHQ DWLNGKEYKC KVSNKALPAP IEKTISKAKG QPREPQVYTL PPSREEMTKN   360
QVSLTCLVKG FYPSDIAVEW ESNGQPENNY KTTPPVLDSD GSFFLYSKLT VDKSRWQQGN   420
VFSCSVMHEA LHNHYTQKSL SLSPGK                                       446

SEQ ID NO: 34             moltype = AA   length = 214
FEATURE                   Location/Qualifiers
source                    1..214
                          mol_type = protein
                          organism = synthetic construct
                          note = Description of Artificial Sequence: Synthetic
                              polypeptide
SEQUENCE: 34
AIQLTQSPSS LSASVGDRVT ITCRPSQGIN WELAWYQQKP GKAPKLLIYD ASSLEQGVPS    60
RFSGSGSGTD FTLTISSLQP EDFATYYCQQ FNSYPLTFGG GTKVEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214

SEQ ID NO: 35             moltype = AA   length = 449
FEATURE                   Location/Qualifiers
source                    1..449
                          mol_type = protein
                          organism = synthetic construct
                          note = Description of Artificial Sequence: Synthetic
                              polypeptide
SEQUENCE: 35
EVQLVQSGAE VKKPGSSVKV SCKASGGTFK SYAISWVRQA PGQGLEWMGN IIPMTGQTYY    60
AQKFQGRVTI TADESTSTAY MELSSLRSED TAVYYCARAA YHPLVFDNWG QGTLVTVSSA   120
STKGPSVFPL APSSKSTSGG TAALGCLVKD YFPEPVTVSW NSGALTSGVH TFPAVLQSSG   180
LYSLSSVVTV PSSSLGTQTY ICNVNHKPSN TKVDKRVEPK SCDKTHTCPP CPAPEAAGGP   240
SVFLFPPKPK DTLMISRTPE VTCVVVDVSH EDPEVKFNWY VDGVEVHNAK TKPREEQYNS   300
```

```
TYRVVSVLTV LHQDWLNGKE YKCKVSNKAL PAPIEKTISK AKGQPREPQV YTLPPSREEM  360
TKNQVSLTCL VKGFYPSDIA VEWESNGQPE NNYKTTPPVL DSDGSFFLYS KLTVDKSRWQ  420
QGNVFSCSVM HEALHNHYTQ KSLSLSPGK                                   449

SEQ ID NO: 36              moltype = AA  length = 216
FEATURE                    Location/Qualifiers
source                     1..216
                           mol_type = protein
                           organism = synthetic construct
                           note = Description of Artificial Sequence: Synthetic
                             polypeptide
SEQUENCE: 36
DIVLTQPPSV SGAPGQRVTI SCSGSSSNIG NHYVNWYQQL PGTAPKLLIY RNNHRPSGVP   60
DRFSGSKSGT SASLAITGLQ SEDEADYYCQ SWDYSGFSTV FGGGTKLTVL GQPKAAPSVT  120
LFPPSSEELQ ANKATLVCLI SDFYPGAVTV AWKADSSPVK AGVETTTPSK QSNNKYAASS  180
YLSLTPEQWK SHRSYSCQVT HEGSTVEKTV APTECS                           216

SEQ ID NO: 37              moltype = AA  length = 447
FEATURE                    Location/Qualifiers
source                     1..447
                           mol_type = protein
                           organism = synthetic construct
                           note = Description of Artificial Sequence: Synthetic
                             polypeptide
SEQUENCE: 37
EVQLLESGGG LVQPGGSLRL SCAASGFTFS SYAMSWVRKA PGKGLEWVSV TGAVGRSTYY   60
PDSVKGRFTI SRDNSKNTLY LQMNSLRAED TAVYYCARWG DEGFDIWGQG TLVTVSSAST  120
KGPSVFPLAP SSKSTSGGTA ALGCLVDDYF PEPVTVSWNS GALTRGVHTF PAVLQSSGLY  180
SLSSVVTVPS SSLGTQTYIC NVNHKPSNTK VDKRVEPKSC DKTHTCPPCP APEAAGGPSV  240
FLFPPKPKDT LMISRTPEVT CVVVDVSHED PEVKFNWYVD GVEVHNAKTK PREEQYNSTY  300
RVVSVLTVLH QDWLNGKEYK CKVSNKALPA PIEKTISKAK GQPREPQVYT LPPSREEMTK  360
NQVSLTCLVK GFYPSDIAVE WESNGQPENN YKTTPPVLDS DGSFFLYSKL TVDKSRWQQG  420
NVFSCSVMHE ALHNHYTQKS LSLSPGK                                     447

SEQ ID NO: 38              moltype = AA  length = 214
FEATURE                    Location/Qualifiers
source                     1..214
                           mol_type = protein
                           organism = synthetic construct
                           note = Description of Artificial Sequence: Synthetic
                             polypeptide
SEQUENCE: 38
DIQMTQSPSS LSASVGDRVT ITCRASQGIS NWLAWYQDKP GKAPKLLIYG ASSLQSGVPS   60
RFSGSGSGTD FTLTISSLQP EDFATYYCQQ YSSFPTTFGQ GTKVEIKRTV AAPSVFIFPP  120
SDEKLKSGTA SVVCLLNNFY PREAKVQWKV DNALQSGNSQ ESVTEQDSDD STYSLSSTLT  180
LSKADYEKHK VYACEVTHQG LSSPVTKSFN RGEC                              214

SEQ ID NO: 39              moltype = AA  length = 447
FEATURE                    Location/Qualifiers
source                     1..447
                           mol_type = protein
                           organism = synthetic construct
                           note = Description of Artificial Sequence: Synthetic
                             polypeptide
SEQUENCE: 39
EVQLLESGGG LVQPGGSLRL SCAASGFTFS SYAMSWVRDA PGKGLEWVSV TGAVGRSTYY   60
PDSVKGRFTI SRDNSKNTLY LQMNSLRAED TAVYYCARWG DEGFDIWGQG TLVTVSSAST  120
KGPSVFPLAP SSKSTSGGTA ALGCLVKDYF PEPVTVSWNS GALTDGVHTF PAVLQSSGLY  180
SLSSVVTVPS SSLGTQTYIC NVNHKPSNTK VDKRVEPKSC DKTHTCPPCP APEAAGGPSV  240
FLFPPKPKDT LMISRTPEVT CVVVDVSHED PEVKFNWYVD GVEVHNAKTK PREEQYNSTY  300
RVVSVLTVLH QDWLNGKEYK CKVSNKALPA PIEKTISKAK GQPREPQVYT LPPSREEMTK  360
NQVSLTCLVK GFYPSDIAVE WESNGQPENN YKTTPPVLDS DGSFFLYSKL TVDKSRWQQG  420
NVFSCSVMHE ALHNHYTQKS LSLSPGK                                     447

SEQ ID NO: 40              moltype = AA  length = 214
FEATURE                    Location/Qualifiers
source                     1..214
                           mol_type = protein
                           organism = synthetic construct
                           note = Description of Artificial Sequence: Synthetic
                             polypeptide
SEQUENCE: 40
DIQMTQSPSS LSASVGDRVT ITCRASQGIS NWLAWYQKKP GKAPKLLIYG ASSLQSGVPS   60
RFSGSGSGTD FTLTISSLQP EDFATYYCQQ YSSFPTTFGQ GTKVEIKRTV AAPSVFIFPP  120
SDEDLKSGTA SVVCLLNNFY PREAKVQWKV DNALQSGNSQ ESVTEQDSKD STYSLSSTLT  180
LSKADYEKHK VYACEVTHQG LSSPVTKSFN RGEC                              214

SEQ ID NO: 41              moltype = AA  length = 446
FEATURE                    Location/Qualifiers
```

```
source                  1..446
                        mol_type = protein
                        organism = synthetic construct
                        note = Description of Artificial Sequence: Synthetic
                            polypeptide
SEQUENCE: 41
EVQLVESGGD LVQPGGSLRL SCAASGFTFS SYWMSWVRKA PGKGLEWVAN IKQDGSEKYY    60
VDSVKGRFTI SRDNAKNSLY LQMNSLRAED TAVYYCARDR GSLYYWGQGT LVTVSSASTK   120
GPSVFPLAPS SKSTSGGTAA LGCLVDDYFP EPVTVSWNSG ALTRGVHTFP AVLQSSGLYS   180
LSSVVTVPSS SLGTQTYICN VNHKPSNTKV DKRVEPKSCD KTHTCPPCPA PEAAGGPSVF   240
LFPPKPKDTL MISRTPEVTC VVVDVSHEDP EVKFNWYVDG VEVHNAKTKP REEQYNSTYR   300
VVSVLTVLHQ DWLNGKEYKC KVSNKALPAP IEKTISKAKG QPREPQVYTL PPSREEMTKN   360
QVSLTCLVKG FYPSDIAVEW ESNGQPENNY KTTPPVLDSD GSFFLYSKLT VDKSRWQQGN   420
VFSCSVMHEA LHNHYTQKSL SLSPGK                                       446

SEQ ID NO: 42           moltype = AA   length = 214
FEATURE                 Location/Qualifiers
source                  1..214
                        mol_type = protein
                        organism = synthetic construct
                        note = Description of Artificial Sequence: Synthetic
                            polypeptide
SEQUENCE: 42
AIQLTQSPSS LSASVGDRVT ITCRPSQGIN WELAWYQDKP GKAPKLLIYD ASSLEQGVPS    60
RFSGSGSGTD FTLTISSLQP EDFATYYCQQ FNSYPLTFGG GTKVEIKRTV AAPSVFIFPP   120
SDEKLKSGTA SVVCLLNNFY PREAKVQWKV DNALQSGNSQ ESVTEQDSDD STYSLSSTLT   180
LSKADYEKHK VYACEVTHQG LSSPVTKSFN RGEC                               214

SEQ ID NO: 43           moltype = AA   length = 452
FEATURE                 Location/Qualifiers
source                  1..452
                        mol_type = protein
                        organism = synthetic construct
                        note = Description of Artificial Sequence: Synthetic
                            polypeptide
SEQUENCE: 43
EVQLVESGGG LVQPGGSLRL SCAASGFAFS GYYMAWVRDA PGKGLEWVAN INYPGSSTYY    60
LDSVKGRFTI SRDNAKNSLY LQMNSLRAED TAVYYCARGD YYGTTYWYFD VWGQGTTVTV   120
SSASTKGPSV FPLAPSSKST SGGTAALGCL VKDYFPEPVT VSWNSGALTD GVHTFPAVLQ   180
SSGLYSLSSV VTVPSSSLGT QTYICNVNHK PSNTKVDKRV EPKSCDKTHT CPPCPAPELL   240
GGPSVFLFPP KPKDTLMISR TPEVTCVVVD VSHEDPEVKF NWYVDGVEVH NAKTKPREEQ   300
YNSTYRVVSV LTVLHQDWLN GKEYKCKVSN KALPAPIEKT ISKAKGQPRE PQVYTLPPSR   360
EEMTKNQVSL TCLVKGFYPS DIAVEWESNG QPENNYKTTP PVLDSDGSFF LYSKLTVDKS   420
RWQQGNVFSC SVMHEALHNH YTQKSLSLSP GK                                 452

SEQ ID NO: 44           moltype = AA   length = 213
FEATURE                 Location/Qualifiers
source                  1..213
                        mol_type = protein
                        organism = synthetic construct
                        note = Description of Artificial Sequence: Synthetic
                            polypeptide
SEQUENCE: 44
DIQMTQSPSS LSASVGDRVT ITCRASQSIS SYLNWYQKKP GKAPKLLIYY TSRLQSGVPS    60
RFSGSGSGTD FTLTISSLQP EDFATYYCQQ GRRLWSFGGG TKVEIKRTVA APSVFIFPPS   120
DEDLKSGTAS VVCLLNNFYP REAKVQWKVD NALQSGNSQE SVTEQDSKDS TYSLSSTLTL   180
SKADYEKHKV YACEVTHQGL SSPVTKSFNR GEC                                213

SEQ ID NO: 45           moltype = AA   length = 452
FEATURE                 Location/Qualifiers
source                  1..452
                        mol_type = protein
                        organism = synthetic construct
                        note = Description of Artificial Sequence: Synthetic
                            polypeptide
SEQUENCE: 45
EVQLVESGGG LVQPGGSLRL SCAASGFAFS GYYMAWVRKA PGKGLEWVAN INYPGSSTYY    60
LDSVKGRFTI SRDNAKNSLY LQMNSLRAED TAVYYCARGD YYGTTYWYFD VWGQGTTVTV   120
SSASTKGPSV FPLAPSSKST SGGTAALGCL VDDYFPEPVT VSWNSGALTR GVHTFPAVLQ   180
SSGLYSLSSV VTVPSSSLGT QTYICNVNHK PSNTKVDKRV EPKSCDKTHT CPPCPAPELL   240
GGPSVFLFPP KPKDTLMISR TPEVTCVVVD VSHEDPEVKF NWYVDGVEVH NAKTKPREEQ   300
YNSTYRVVSV LTVLHQDWLN GKEYKCKVSN KALPAPIEKT ISKAKGQPRE PQVYTLPPSR   360
EEMTKNQVSL TCLVKGFYPS DIAVEWESNG QPENNYKTTP PVLDSDGSFF LYSKLTVDKS   420
RWQQGNVFSC SVMHEALHNH YTQKSLSLSP GK                                 452

SEQ ID NO: 46           moltype = AA   length = 213
FEATURE                 Location/Qualifiers
source                  1..213
                        mol_type = protein
```

```
                        organism = synthetic construct
                        note = Description of Artificial Sequence: Synthetic
                            polypeptide
SEQUENCE: 46
DIQMTQSPSS LSASVGDRVT ITCRASQSIS SYLNWYQDKP GKAPKLLIYY TSRLQSGVPS      60
RFSGSGSGTD FTLTISSLQP EDFATYYCQQ GRRLWSFGGG TKVEIKRTVA APSVFIFPPS     120
DEKLKSGTAS VVCLLNNFYP REAKVQWKVD NALQSGNSQE SVTEQDSDDS TYSLSSTLTL     180
SKADYEKHKV YACEVTHQGL SSPVTKSFNR GEC                                  213

SEQ ID NO: 47           moltype = AA  length = 449
FEATURE                 Location/Qualifiers
source                  1..449
                        mol_type = protein
                        organism = synthetic construct
                        note = Description of Artificial Sequence: Synthetic
                            polypeptide
SEQUENCE: 47
EVQLVQSGAE VKKPGSSVKV SCKASGGTFK SYAISWVRDA PGQGLEWMGN IIPMTGQTYY      60
AQKFQGRVTI TADESTSTAY MELSSLRSED TAVYYCARAA YHPLVFDNWG QGTLVTVSSA     120
STKGPSVFPL APSSKSTSGG TAALGCLVKD YFPEPVTVSW NSGALTDGVH TFPAVLQSSG     180
LYSLSSVVTV PSSSLGTQTY ICNVNHKPSN TKVDKRVEPK SCDKTHTCPP CPAPEAAGGP     240
SVFLFPPKPK DTLMISRTPE VTCVVVDVSH EDPEVKFNWY VDGVEVHNAK TKPREEQYNS     300
TYRVVSVLTV LHQDWLNGKE YKCKVSNKAL PAPIEKTISK AKGQPREPQV YTLPPSREEM     360
TKNQVSLTCL VKGFYPSDIA VEWESNGQPE NNYKTTPPVL DSDGSFFLYS KLTVDKSRWQ     420
QGNVFSCSVM HEALHNHYTQ KSLSLSPGK                                       449

SEQ ID NO: 48           moltype = AA  length = 216
FEATURE                 Location/Qualifiers
source                  1..216
                        mol_type = protein
                        organism = synthetic construct
                        note = Description of Artificial Sequence: Synthetic
                            polypeptide
SEQUENCE: 48
DIVLTQPPSV SGAPGQRVTI SCSGSSSNIG NHYVNWYQKL PGTAPKLLIY RNNHRPSGVP      60
DRFSGSKSGT SASLAITGLQ SEDEADYYCQ SWDYSGFSTV FGGGTKLTVL GQPKAAPSVT     120
LFPPSSEDLQ ANKATLVCLI SDFYPGAVTV AWKADSSPVK AGVETTTPSK QSKNKYAASS     180
YLSLTPEQWK SHRSYSCQVT HEGSTVEKTV APTECS                               216

SEQ ID NO: 49           moltype = AA  length = 214
FEATURE                 Location/Qualifiers
source                  1..214
                        mol_type = protein
                        organism = synthetic construct
                        note = Description of Artificial Sequence: Synthetic
                            polypeptide
SEQUENCE: 49
DIQMTQSPSS LSASVGDRVT ITCRASQSIS SYLNWYQQKP GKAPKLLIYA ASSLQSGVPS      60
RFSGSGSGTD FTLTISSLQP EDFATYYCQQ SYSTPLTFGQ GTKVEIKRTV AAPSVFIFPP     120
SDEQLKSGTA SVVCLLNNFY PREAKVQWKV DNALQSGNSQ ESVTEQDSKD STYSLSSTLT     180
LSKADYEKHK VYACEVTHQG LSSPVTKSFN RGEC                                 214

SEQ ID NO: 50           moltype = AA  length = 212
FEATURE                 Location/Qualifiers
source                  1..212
                        mol_type = protein
                        organism = synthetic construct
                        note = Description of Artificial Sequence: Synthetic
                            polypeptide
SEQUENCE: 50
SYELTQPLSV SVALGQTARI TCGGNNIGSK NVHWYQQKPG QAPVLVIYRD SNRPSGIPER      60
FSGSNSGNTA TLTISRAQAG DEADYYCQVW DSSTVVFGGG TKLTVLGQPK AAPSVTLFPP     120
SSEELQANKA TLVCLISDFY PGAVTVAWKA DSSPVKAGVE TTTPSKQSNN KYAASSYLSL     180
TPEQWKSHRS YSCQVTHEGS TVEKTVAPTE CS                                   212

SEQ ID NO: 51           moltype = AA  length = 214
FEATURE                 Location/Qualifiers
source                  1..214
                        mol_type = protein
                        organism = synthetic construct
                        note = Description of Artificial Sequence: Synthetic
                            polypeptide
SEQUENCE: 51
EIVMTQSPAT LSVSPGERAT LSCRASQSVS SNLAWYQQKP GQAPRLLIYG ASTRATGIPA      60
RFSGSGSGTE FTLTISSLQS EDFAVYYCQQ YNNWPLTFGQ GTKVEIKRTV AAPSVFIFPP     120
SDEQLKSGTA SVVCLLNNFY PREAKVQWKV DNALQSGNSQ ESVTEQDSKD STYSLSSTLT     180
LSKADYEKHK VYACEVTHQG LSSPVTKSFN RGEC                                 214

SEQ ID NO: 52           moltype = AA  length = 216
```

```
FEATURE              Location/Qualifiers
source               1..216
                     mol_type = protein
                     organism = synthetic construct
                     note = Description of Artificial Sequence: Synthetic
                       polypeptide
SEQUENCE: 52
QSVLTQPPSA SGTPGQRVTI SCSGSSSNIG SNYVYWYQQL PGTAPKLLIY RNNQRPSGVP    60
DRFSGSKSGT SASLAISGLR SEDEADYYCA AWDDSLSGWV FGGGTKLTVL GQPKAAPSVT   120
LFPPSSEELQ ANKATLVCLI SDFYPGAVTV AWKADSSPVK AGVETTTPSK QSNNKYAASS   180
YLSLTPEQWK SHRSYSCQVT HEGSTVEKTV APTECS                             216

SEQ ID NO: 53        moltype = AA  length = 214
FEATURE              Location/Qualifiers
source               1..214
                     mol_type = protein
                     organism = synthetic construct
                     note = Description of Artificial Sequence: Synthetic
                       polypeptide
SEQUENCE: 53
DIQMTQSPSS LSASVGDRVT ITCQASQDIS NYLNWYQQKP GKAPKLLIYD ASNLETGVPS    60
RFSGSGSGTD FTFTISSLQP EDIATYYCQQ YDNLPLTFGG GTKVEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214

SEQ ID NO: 54        moltype = AA  length = 450
FEATURE              Location/Qualifiers
source               1..450
                     mol_type = protein
                     organism = synthetic construct
                     note = Description of Artificial Sequence: Synthetic
                       polypeptide
SEQUENCE: 54
EVQLLESGGG LVQPGGSLRL SCAASGFTFS SYAMSWVRQA PGKGLEWVSA ISGSGGSTYY    60
ADSVKGRFTI SRDNSKNTLY LQMNSLRAED TAVYYCARWG GDGFYAMDYW GQGTLVTVSS   120
ASTKGPSVFP LAPSSKSTSG GTAALGCLVK DYFPEPVTVS WNSGALTSGV HTFPAVLQSS   180
GLYSLSSVVT VPSSSLGTQT YICNVNHKPS NTKVDKRVEP KSCDKTHTCP PCPAPELLGG   240
PSVFLFPPKP KDTLMISRTP EVTCVVVDVS HEDPEVKFNW YVDGVEVHNA KTKPREEQYN   300
STYRVVSVLT VLHQDWLNGK EYKCKVSNKA LPAPIEKTIS KAKGQPREPQ VYTLPPCREE   360
MTKNQVSLWC LVKGFYPSDI AVEWESNGQP ENNYKTTPPV LDSDGSFFLY SKLTVDKSRW   420
QQGNVFSCSV MHEALHNHYT QKSLSLSPGK                                    450

SEQ ID NO: 55        moltype = AA  length = 450
FEATURE              Location/Qualifiers
source               1..450
                     mol_type = protein
                     organism = synthetic construct
                     note = Description of Artificial Sequence: Synthetic
                       polypeptide
SEQUENCE: 55
QVQLVESGGG VVQPGRSLRL SCAASGFTFS SYGMHWVRQA PGKGLEWVAV ISYEGSNKYY    60
ADSVKGRFTI SRDNSKNTLY LQMNSLRAED TAVYYCARWG GDGFYAMDYW GQGTLVTVSS   120
ASTKGPSVFP LAPSSKSTSG GTAALGCLVK DYFPEPVTVS WNSGALTSGV HTFPAVLQSS   180
GLYSLSSVVT VPSSSLGTQT YICNVNHKPS NTKVDKRVEP KSCDKTHTCP PCPAPELLGG   240
PSVFLFPPKP KDTLMISRTP EVTCVVVDVS HEDPEVKFNW YVDGVEVHNA KTKPREEQYN   300
STYRVVSVLT VLHQDWLNGK EYKCKVSNKA LPAPIEKTIS KAKGQPREPQ VYTLPPCREE   360
MTKNQVSLWC LVKGFYPSDI AVEWESNGQP ENNYKTTPPV LDSDGSFFLY SKLTVDKSRW   420
QQGNVFSCSV MHEALHNHYT QKSLSLSPGK                                    450

SEQ ID NO: 56        moltype = AA  length = 452
FEATURE              Location/Qualifiers
source               1..452
                     mol_type = protein
                     organism = synthetic construct
                     note = Description of Artificial Sequence: Synthetic
                       polypeptide
SEQUENCE: 56
EVQLVESGGG LVKPGGSLRL SCAASGFTFS NAWMSWVRQA PGKGLEWVGR IKSKTEGGTT    60
DYAAPVKGRF TISRDDSKNT LYLQMNSLKT EDTAVYYCAR WGDGFYAMD YWGQGTLVTV   120
SSASTKGPSV FPLAPSSKST SGGTAALGCL VKDYFPEPVT VSWNSGALTS GVHTFPAVLQ   180
SSGLYSLSSV VTVPSSSLGT QTYICNVNHK PSNTKVDKRV EPKSCDKTHT CPPCPAPELL   240
GGPSVFLFPP KPKDTLMISR TPEVTCVVVD VSHEDPEVKF NWYVDGVEVH NAKTKPREEQ   300
YNSTYRVVSV LTVLHQDWLN GKEYKCKVSN KALPAPIEKT ISKAKGQPRE PQVYTLPPCR   360
EEMTKNQVSL WCLVKGFYPS DIAVEWESNG QPENNYKTTP PVLDSDGSFF LYSKLTVDKS   420
RWQQGNVFSC SVMHEALHNH YTQKSLSLSP GK                                 452

SEQ ID NO: 57        moltype = AA  length = 450
FEATURE              Location/Qualifiers
```

```
                                         -continued
source                   1..450
                         mol_type = protein
                         organism = synthetic construct
                         note = Description of Artificial Sequence: Synthetic
                             polypeptide
SEQUENCE: 57
QVQLVQSGAE VKKPGASVKV SCKASGYTFT SYYMHWVRQA PGQGLEWMGI ISPSGGSTSY    60
AQKFQGRVTM TRDTSTSTVY MELSSLRSED TAVYYCARWG GDGFYAMDYW GQGTLVTVSS   120
ASTKGPSVFP LAPSSKSTSG GTAALGCLVK DYFPEPVTVS WNSGALTSGV HTFPAVLQSS   180
GLYSLSSVVT VPSSSLGTQT YICNVNHKPS NTKVDKRVEP KSCDKTHTCP PCPAPELLGG   240
PSVFLFPPKP KDTLMISRTP EVTCVVVDVS HEDPEVKFNW YVDGVEVHNA KTKPREEQYN   300
STYRVVSVLT VLHQDWLNGK EYKCKVSNKA LPAPIEKTIS KAKGQPREPQ VYTLPPCREE   360
MTKNQVSLWC LVKGFYPSDI AVEWESNGQP ENNYKTTPPV LDSDGSFFLY SKLTVDKSRW   420
QQGNVFSCSV MHEALHNHYT QKSLSLSPGK                                   450

SEQ ID NO: 58            moltype = AA   length = 450
FEATURE                  Location/Qualifiers
source                   1..450
                         mol_type = protein
                         organism = synthetic construct
                         note = Description of Artificial Sequence: Synthetic
                             polypeptide
SEQUENCE: 58
EVQLVQSGAE VKKPGESLKI SCKGSGYSFT SYWIGWVRQM PGKGLEWMGI IYPGDSDTRY    60
SPSFQGQVTI SADKSISTAY LQWSSLKASD TAMYYCARWG GDGFYAMDYW GRGTLVTVSS   120
ASTKGPSVFP LAPSSKSTSG GTAALGCLVK DYFPEPVTVS WNSGALTSGV HTFPAVLQSS   180
GLYSLSSVVT VPSSSLGTQT YICNVNHKPS NTKVDKRVEP KSCDKTHTCP PCPAPELLGG   240
PSVFLFPPKP KDTLMISRTP EVTCVVVDVS HEDPEVKFNW YVDGVEVHNA KTKPREEQYN   300
STYRVVSVLT VLHQDWLNGK EYKCKVSNKA LPAPIEKTIS KAKGQPREPQ VYTLPPCREE   360
MTKNQVSLWC LVKGFYPSDI AVEWESNGQP ENNYKTTPPV LDSDGSFFLY SKLTVDKSRW   420
QQGNVFSCSV MHEALHNHYT QKSLSLSPGK                                   450

SEQ ID NO: 59            moltype = AA   length = 453
FEATURE                  Location/Qualifiers
source                   1..453
                         mol_type = protein
                         organism = synthetic construct
                         note = Description of Artificial Sequence: Synthetic
                             polypeptide
SEQUENCE: 59
QVQLQQSGPG LVKPSQTLSL TCAISGDSVS SSSAAWNWIR QSPSRGLEWL GRTYYRSKWY    60
NDYAVSVKSR ITINPDTSKN QFSLQLNSVT PEDTAVYYCA RWGGDGFYAM DYWGQGTLVT   120
VSSASTKGPS VFPLAPSSKS TSGGTAALGC LVKDYFPEPV TVSWNSGALT SGVHTFPAVL   180
QSSGLYSLSS VVTVPSSSLG TQTYICNVNH KPSNTKVDKR VEPKSCDKTH TCPPCPAPEL   240
LGGPSVFLFP PKPKDTLMIS RTPEVTCVVV DVSHEDPEVK FNWYVDGVEV HNAKTKPREE   300
QYNSTYRVVS VLTVLHQDWL NGKEYKCKVS NKALPAPIEK TISKAKGQPR EPQVYTLPPC   360
REEMTKNQVS LWCLVKGFYP SDIAVEWESN GQPENNYKTT PPVLDSDGSF FLYSKLTVDK   420
SRWQQGNVFS CSVMHEALHN HYTQKSLSLS PGK                               453

SEQ ID NO: 60            moltype = AA   length = 214
FEATURE                  Location/Qualifiers
source                   1..214
                         mol_type = protein
                         organism = synthetic construct
                         note = Description of Artificial Sequence: Synthetic
                             polypeptide
SEQUENCE: 60
AIQLTQSPSS LSASVGDRVT ITCRPSQGIN WELAWYQDKP GKAPKLLIYD ASSLEQGVPS    60
RFSGSGSGTD FTLTISSLQP EDFATYYCQQ FNSYPLTFGG GTKVEIKRTV AAPSVFIFPP   120
SDEKLKSGTA SVVCLLNNFY PREAKVQWKV DNALQSGNSQ ESVTEQDSDD STYSLSSTLT   180
LSKADYEKHK VYACEVTHQG LSSPVTKSFN RGEC                              214

SEQ ID NO: 61            moltype = AA   length = 446
FEATURE                  Location/Qualifiers
source                   1..446
                         mol_type = protein
                         organism = synthetic construct
                         note = Description of Artificial Sequence: Synthetic
                             polypeptide
SEQUENCE: 61
EVQLVESGGD LVQPGGSLRL SCAASGFTFS SYWMSWVRKA PGKGLEWVAN IKQDGSEKYY    60
VDSVKGRFTI SRDNAKNSLY LQMNSLRAED TAVYYCARDR GSLYYWGQGT LVTVSSASTK   120
GPSVFPLAPS SKSTSGGTAA LGCLVDDYFP EPVTVSWNSG ALTRGVHTFP AVLQSSGLYS   180
LSSVVTVPSS SLGTQTYICN VNHKPSNTKV DKRVEPKSCD KTHTCPPCPA PELLGGPSVF   240
LFPPKPKDTL MISRTPEVTC VVVDVSHEDP EVKFNWYVDG VEVHNAKTKP REEQYNSTYR   300
VVSVLTVLHQ DWLNGKEYKC KVSNKALPAP IEKTISKAKG QPREPQVCTL PPSREEMTKN   360
QVSLSCAVKG FYPSDIAVEW ESNGQPENNY KTTPPVLDSD GSFFLVSKLT VDKSRWQQGN   420
VFSCSVMHEA LHNHYTQKSL SLSPGK                                       446
```

```
SEQ ID NO: 62           moltype = AA  length = 214
FEATURE                 Location/Qualifiers
source                  1..214
                        mol_type = protein
                        organism = synthetic construct
                        note = Description of Artificial Sequence: Synthetic
                            polypeptide
SEQUENCE: 62
DIQMTQSPSS LSASVGDRVT ITCRASQSIS SYLNWYQKKP GKAPKLLIYA ASSLQSGVPS   60
RFSGSGSGTD FTLTISSLQP EDFATYYCQQ SYSTPLTFGQ GTKVEIKRTV AAPSVFIFPP  120
SDEDLKSGTA SVVCLLNNFY PREAKVQWKV DNALQSGNSQ ESVTEQDSKD STYSLSSTLT  180
LSKADYEKHK VYACEVTHQG LSSPVTKSFN RGEC                              214

SEQ ID NO: 63           moltype = AA  length = 212
FEATURE                 Location/Qualifiers
source                  1..212
                        mol_type = protein
                        organism = synthetic construct
                        note = Description of Artificial Sequence: Synthetic
                            polypeptide
SEQUENCE: 63
SYELTQPLSV SVALGQTARI TCGGNNIGSK NVHWYQKKPG QAPVLVIYRD SNRPSGIPER   60
FSGSNSGNTA TLTISRAQAG DEADYYCQVW DSSTVVFGGG TKLTVLGQPK AAPSVTLFPP  120
SSEELQANKA TLVCLISDFY PGAVTVAWKA DSSPVKAGVE TTTPSKQSRN KYAASSYLSL  180
TPEQWKSHRS YSCQVTHEGS TVEKTVAPTE CS                                212

SEQ ID NO: 64           moltype = AA  length = 214
FEATURE                 Location/Qualifiers
source                  1..214
                        mol_type = protein
                        organism = synthetic construct
                        note = Description of Artificial Sequence: Synthetic
                            polypeptide
SEQUENCE: 64
EIVMTQSPAT LSVSPGERAT LSCRASQSVS SNLAWYQKKP GQAPRLLIYG ASTRATGIPA   60
RFSGSGSGTE FTLTISSLQS EDFAVYYCQQ YNNWPLTFGQ GTKVEIKRTV AAPSVFIFPP  120
SDEDLKSGTA SVVCLLNNFY PREAKVQWKV DNALQSGNSQ ESVTEQDSKD STYSLSSTLT  180
LSKADYEKHK VYACEVTHQG LSSPVTKSFN RGEC                              214

SEQ ID NO: 65           moltype = AA  length = 216
FEATURE                 Location/Qualifiers
source                  1..216
                        mol_type = protein
                        organism = synthetic construct
                        note = Description of Artificial Sequence: Synthetic
                            polypeptide
SEQUENCE: 65
QSVLTQPPSA SGTPGQRVTI SCSGSSSNIG SNYVYWYQKL PGTAPKLLIY RNNQRPSGVP   60
DRFSGSKSGT SASLAISGLR SEDEADYYCA AWDDSLSGWV FGGGTKLTVL GQPKAAPSVT  120
LFPPSSEELQ ANKATLVCLI SDFYPGAVTV AWKADSSPVK AGVETTTPSK QSRNKYAASS  180
YLSLTPEQWK SHRSYSCQVT HEGSTVEKTV APTECS                            216

SEQ ID NO: 66           moltype = AA  length = 214
FEATURE                 Location/Qualifiers
source                  1..214
                        mol_type = protein
                        organism = synthetic construct
                        note = Description of Artificial Sequence: Synthetic
                            polypeptide
SEQUENCE: 66
DIQMTQSPSS LSASVGDRVT ITCQASQDIS NYLNWYQKKP GKAPKLLIYD ASNLETGVPS   60
RFSGSGSGTD FTFTISSLQP EDIATYYCQQ YDNLPLTFGQ GTKVEIKRTV AAPSVFIFPP  120
SDEDLKSGTA SVVCLLNNFY PREAKVQWKV DNALQSGNSQ ESVTEQDSKD STYSLSSTLT  180
LSKADYEKHK VYACEVTHQG LSSPVTKSFN RGEC                              214

SEQ ID NO: 67           moltype = AA  length = 450
FEATURE                 Location/Qualifiers
source                  1..450
                        mol_type = protein
                        organism = synthetic construct
                        note = Description of Artificial Sequence: Synthetic
                            polypeptide
SEQUENCE: 67
EVQLLESGGG LVQPGGSLRL SCAASGFTFS SYAMSWVRDA PGKGLEWVSA ISGSGGSTYY   60
ADSVKGRFTI SRDNSKNTLY LQMNSLRAED TAVYYCARWG GDGFYAMDYW GQGTLVTVSS  120
ASTKGPSVFP LAPSSKSTSG GTAALGCLVK DYFPEPVTVS WNSGALTDGV HTFPAVLQSS  180
GLYSLSSVVT VPSSSLGTQT YICNVNHKPS NTKVDKRVEP KSCDKTHTCP PCPAPELLGG  240
PSVFLFPPKP KDTLMISRTP EVTCVVVDVS HEDPEVKFNW YVDGVEVHNA KTKPREEQYN  300
STYRVVSVLT VLHQDWLNGK EYKCKVSNKA LPAPIEKTIS KAKGQPREPQ VYTLPPCREE  360
```

```
MTKNQVSLWC LVKGFYPSDI AVEWESNGQP ENNYKTTPPV LDSDGSFFLY SKLTVDKSRW   420
QQGNVFSCSV MHEALHNHYT QKSLSLSPGK                                    450

SEQ ID NO: 68           moltype = AA  length = 450
FEATURE                 Location/Qualifiers
source                  1..450
                        mol_type = protein
                        organism = synthetic construct
                        note = Description of Artificial Sequence: Synthetic
                           polypeptide
SEQUENCE: 68
EVQLLESGGG LVQPGGSLRL SCAASGFTFS SYAMSWVRDA PGKGLEWVSA ISGSGGSTYY    60
ADSVKGRFTI SRDNSKNTLY LQMNSLRAED TAVYYCARWG GDGFYAMDYW GQGTLVTVSS   120
ASTKGPSVFP LAPSSKSTSG GTAALGCLVK DYFPEPVTVS WNSGALTDGV HTFPAVLQSS   180
GLYSLSSVVT VPSSSLGTQT YICNVNHKPS NTKVDKRVEP KSCDKTHTCP PCPAPELLGG   240
PSVFLFPPKP KDTLMISRTP EVTCVVVDVS HEDPEVKFNW YVDGVEVHNA KTKPREEQYN   300
STYRVVSVLT VLHQDWLNGK EYKCKVSNKA LPAPIEKTIS KAKGQPREPQ VYTLPPCREE   360
MTKNQVSLWC LVKGFYPSDI AVEWESNGQP ENNYKTTPPV LDSDGSFFLY SKLTVDKSRW   420
QQGNVFSCSV MHEALHNHYT QKSLSLSPGK                                    450

SEQ ID NO: 69           moltype = AA  length = 452
FEATURE                 Location/Qualifiers
source                  1..452
                        mol_type = protein
                        organism = synthetic construct
                        note = Description of Artificial Sequence: Synthetic
                           polypeptide
SEQUENCE: 69
EVQLVESGGG LVKPGGSLRL SCAASGFTFS NAWMSWVRDA PGKGLEWVGR IKSKTEGGTT    60
DYAAPVKGRF TISRDDSKNT LYLQMNSLKT EDTAVYYCAR WGGDGFYAMD YWGQGTLVTV   120
SSASTKGPSV FPLAPSSKST SGGTAALGCL VKDYFPEPVT VSWNSGALTD GVHTFPAVLQ   180
SSGLYSLSSV VTVPSSSLGT QTYICNVNHK PSNTKVDKRV EPKSCDKTHT CPPCPAPELL   240
GGPSVFLFPP KPKDTLMISR TPEVTCVVVD VSHEDPEVKF NWYVDGVEVH NAKTKPREEQ   300
YNSTYRVVSV LTVLHQDWLN GKEYKCKVSN KALPAPIEKT ISKAKGQPRE PQVYTLPPCR   360
EEMTKNQVSL WCLVKGFYPS DIAVEWESNG QPENNYKTTP PVLDSDGSFF LYSKLTVDKS   420
RWQQGNVFSC SVMHEALHNH YTQKSLSLSP GK                                 452

SEQ ID NO: 70           moltype = AA  length = 450
FEATURE                 Location/Qualifiers
source                  1..450
                        mol_type = protein
                        organism = synthetic construct
                        note = Description of Artificial Sequence: Synthetic
                           polypeptide
SEQUENCE: 70
QVQLVQSGAE VKKPGASVKV SCKASGYTFT SYYMHWVRDA PGQGLEWMGI ISPSGGSTSY    60
AQKFQGRVTM TRDTSTSTVY MELSSLRSED TAVYYCARWG GDGFYAMDYW GQGTLVTVSS   120
ASTKGPSVFP LAPSSKSTSG GTAALGCLVK DYFPEPVTVS WNSGALTDGV HTFPAVLQSS   180
GLYSLSSVVT VPSSSLGTQT YICNVNHKPS NTKVDKRVEP KSCDKTHTCP PCPAPELLGG   240
PSVFLFPPKP KDTLMISRTP EVTCVVVDVS HEDPEVKFNW YVDGVEVHNA KTKPREEQYN   300
STYRVVSVLT VLHQDWLNGK EYKCKVSNKA LPAPIEKTIS KAKGQPREPQ VYTLPPCREE   360
MTKNQVSLWC LVKGFYPSDI AVEWESNGQP ENNYKTTPPV LDSDGSFFLY SKLTVDKSRW   420
QQGNVFSCSV MHEALHNHYT QKSLSLSPGK                                    450

SEQ ID NO: 71           moltype = AA  length = 450
FEATURE                 Location/Qualifiers
source                  1..450
                        mol_type = protein
                        organism = synthetic construct
                        note = Description of Artificial Sequence: Synthetic
                           polypeptide
SEQUENCE: 71
EVQLVQSGAE VKKPGESLKI SCKGSGYSFT SYWIGWVRDM PGKGLEWMGI IYPGDSDTRY    60
SPSFQGQVTI SADKSISTAY LQWSSLKASD TAMYYCARWG GDGFYAMDYW GRGTLVTVSS   120
ASTKGPSVFP LAPSSKSTSG GTAALGCLVK DYFPEPVTVS WNSGALTDGV HTFPAVLQSS   180
GLYSLSSVVT VPSSSLGTQT YICNVNHKPS NTKVDKRVEP KSCDKTHTCP PCPAPELLGG   240
PSVFLFPPKP KDTLMISRTP EVTCVVVDVS HEDPEVKFNW YVDGVEVHNA KTKPREEQYN   300
STYRVVSVLT VLHQDWLNGK EYKCKVSNKA LPAPIEKTIS KAKGQPREPQ VYTLPPCREE   360
MTKNQVSLWC LVKGFYPSDI AVEWESNGQP ENNYKTTPPV LDSDGSFFLY SKLTVDKSRW   420
QQGNVFSCSV MHEALHNHYT QKSLSLSPGK                                    450

SEQ ID NO: 72           moltype = AA  length = 453
FEATURE                 Location/Qualifiers
source                  1..453
                        mol_type = protein
                        organism = synthetic construct
                        note = Description of Artificial Sequence: Synthetic
                           polypeptide
```

```
SEQUENCE: 72
QVQLQQSGPG  LVKPSQTLSL  TCAISGDSVS  SSSAAWNWIR  DSPSRGLEWL  GRTYYRSKWY   60
NDYAVSVKSR  ITINPDTSKN  QFSLQLNSVT  PEDTAVYYCA  RWGGDGFYAM  DYWGQGTLVT  120
VSSASTKGPS  VFPLAPSSKS  TSGGTAALGC  LVKDYFPEPV  TVSWNSGALT  DGVHTFPAVL  180
QSSGLYSLSS  VVTVPSSSLG  TQTYICNVNH  KPSNTKVDKR  VEPKSCDKTH  TCPPCPAPEL  240
LGGPSVFLFP  PKPKDTLMIS  RTPEVTCVVV  DVSHEDPEVK  FNWYVDGVEV  HNAKTKPREE  300
QYNSTYRVVS  VLTVLHQDWL  NGKEYKCKVS  NKALPAPIEK  TISKAKGQPR  EPQVYTLPPC  360
REEMTKNQVS  LWCLVKGFYP  SDIAVEWESN  GQPENNYKTT  PPVLDSDGSF  FLYSKLTVDK  420
SRWQQGNVFS  CSVMHEALHN  HYTQKSLSLS  PGK                                 453

SEQ ID NO: 73           moltype = AA  length = 446
FEATURE                 Location/Qualifiers
source                  1..446
                        mol_type = protein
                        organism = synthetic construct
                        note = Description of Artificial Sequence: Synthetic
                              polypeptide
SEQUENCE: 73
EVQLVESGGD  LVQPGGSLRL  SCAASGFTFS  SYWMSWVRKA  PGKCLEWVAN  IKQDGSEKYY   60
VDSVKGRFTI  SRDNAKNSLY  LQMNSLRAED  TAVYYCARDR  GSLYYWGQGT  LVTVSSASTK  120
GPSVFPLAPS  SKSTSGGTAA  LGCLVDDYFP  EPVTVSWNSG  ALTRGVHTFP  AVLQSSGLYS  180
LSSVVTVPSS  SLGTQTYICN  VNHKPSNTKV  DKRVEPKSAD  KTHTCPPCPA  PELLGGPSVF  240
LFPPKPKDTL  MISRTPEVTC  VVVDVSHEDP  EVKFNWYVDG  VEVHNAKTKP  REEQYNSTYR  300
VVSVLTVLHQ  DWLNGKEYKC  KVSNKALPAP  IEKTISKAKG  QPREPQVCTL  PPSREEMTKN  360
QVSLSCAVKG  FYPSDIAVEW  ESNGQPENNY  KTTPPVLDSD  GSFFLVSKLT  VDKSRWQQGN  420
VFSCSVMHEA  LHNHYTQKSL  SLSPGK                                          446

SEQ ID NO: 74           moltype = AA  length = 214
FEATURE                 Location/Qualifiers
source                  1..214
                        mol_type = protein
                        organism = synthetic construct
                        note = Description of Artificial Sequence: Synthetic
                              polypeptide
SEQUENCE: 74
AIQLTQSPSS  LSASVGDRVT  ITCRPSQGIN  WELAWYQDKP  GKAPKLLIYD  ASSLEQGVPS   60
RFSGSGSGTD  FTLTISSLQP  EDFATYYCQQ  FNSYPLTFGC  GTKVEIKRTV  AAPSVFIFPP  120
SDEKLKSGTA  SVVCLLNNFY  PREAKVQWKV  DNALQSGNSQ  ESVTEQDSDD  STYSLSSTLT  180
LSKADYEKHK  VYACEVTHQG  LSSPVTKSFN  RGEA                                214

SEQ ID NO: 75           moltype = AA  length = 446
FEATURE                 Location/Qualifiers
source                  1..446
                        mol_type = protein
                        organism = synthetic construct
                        note = Description of Artificial Sequence: Synthetic
                              polypeptide
SEQUENCE: 75
EVQLVESGGD  LVQPGGSLRL  SCAASGFTFS  SYWMSWVRQA  PGKCLEWVAN  IKQDGSEKYY   60
VDSVKGRFTI  SRDNAKNSLY  LQMNSLRAED  TAVYYCARDR  GSLYYWGQGT  LVTVSSASTK  120
GPSVFPLAPS  SKSTSGGTAA  LGCLVKDYFP  EPVTVSWNSG  ALTSGVHTFP  AVLQSSGLYS  180
LSSVVTVPSS  SLGTQTYICN  VNHKPSNTKV  DKRVEPKSAD  KTHTCPPCPA  PELLGGPSVF  240
LFPPKPKDTL  MISRTPEVTC  VVVDVSHEDP  EVKFNWYVDG  VEVHNAKTKP  REEQYNSTYR  300
VVSVLTVLHQ  DWLNGKEYKC  KVSNKALPAP  IEKTISKAKG  QPREPQVCTL  PPSREEMTKN  360
QVSLSCAVKG  FYPSDIAVEW  ESNGQPENNY  KTTPPVLDSD  GSFFLVSKLT  VDKSRWQQGN  420
VFSCSVMHEA  LHNHYTQKSL  SLSPGK                                          446

SEQ ID NO: 76           moltype = AA  length = 214
FEATURE                 Location/Qualifiers
source                  1..214
                        mol_type = protein
                        organism = synthetic construct
                        note = Description of Artificial Sequence: Synthetic
                              polypeptide
SEQUENCE: 76
AIQLTQSPSS  LSASVGDRVT  ITCRPSQGIN  WELAWYQQKP  GKAPKLLIYD  ASSLEQGVPS   60
RFSGSGSGTD  FTLTISSLQP  EDFATYYCQQ  FNSYPLTFGC  GTKVEIKRTV  AAPSVFIFPP  120
SDEQLKSGTA  SVVCLLNNFY  PREAKVQWKV  DNALQSGNSQ  ESVTEQDSKD  STYSLSSTLT  180
LSKADYEKHK  VYACEVTHQG  LSSPVTKSFN  RGEA                                214
```

ENGINEERED HETERODIMERIC PROTEINS

CROSS REFERENCE TO RELATED APPLICATIONS

This application is a continuation application of U.S. application Ser. No. 16/483,185, filed Aug. 2, 2019, now U.S. Pat. No. 11,685,776, which is a 371 U.S. national phase application of the International Application No. PCT/IB2018/051305, filed on Mar. 1, 2018, which claims priority to, and the benefit of, U.S. Patent Application No. 62/465,937, filed on Mar. 2, 2017, the contents of each of which are incorporated herein by reference in their entireties.

SEQUENCE LISTING

The instant application contains a Sequence Listing which has been submitted electronically in ASCII format and is hereby incorporated by reference in its entirety. Said ASCII copy, created on Feb. 20, 2018 is named PAT057505-WO-PCT_SL.txt and is 201,737 bytes in size.

FIELD OF THE INVENTION

The invention relates to heterodimeric antibodies and fragments thereof comprising modifications that promote correct heavy and light chain pairing and methods for their preparation.

BACKGROUND OF THE INVENTION

The administration of heterodimeric antibodies, particularly bispecific antibodies as therapeutic agents for human diseases is of great clinical potential but the robust generation of heterodimeric antibodies, especially the production of pure and developable heterodimeric antibodies is still challenging. Antibody heavy chains bind antibody light chains in a promiscuous manner such that a given heavy chain can pair with many light chain sequences of both the lambda and kappa light chain classes (Edwards B M et al., (2003) J. Mol. Biol. 334:103-18). Previous work has shown that pairing of heavy and light chains occurs at random (Brezinschek H P et al., (1998) J. Immunol. 160:4762-7). As a result of this binding, concomitant expression of two antibody heavy chains and two antibody light chains naturally leads to scrambling of heavy chain-light chain pairings; however homogeneous pairing is an essential requirement for manufacturability and biological efficacy. Heterodimeric antibody formats such as DVD-Ig (Wu C et al., (2007) Nat. Biotech. 25(11):1290-7), CrossMab (Schaefer W et al., (2011) PNAS 108(27): 11187-92), or 'two-in-one' antibodies (Bostrom J et al., (2009) Science 323(5921): 1610-4) allow the production of bispecific antibodies but with varying liabilities. Despite these recent developments there still exists in the art a need for an improved heterodimeric antibody format having the correct heavy and light chain pairing and a method for achieving this homogeneous pairing to avoid the generation of mispaired contaminants.

SUMMARY OF THE INVENTION

In the present invention, to improve the pairing of heavy and light chains of heterodimeric antibodies, electrostatic steering mechanisms were applied to engineer the heavy and light chains of a subset of antibodies and antibody fragments. Interface residues were mutated in such a way that each light chain strongly favoured its cognate heavy chain when two different heavy chains and two different light chains were co-transfected and co-expressed in the same cell to assemble a functional, heterodimeric, bispecific antibody.

The design strategy for engineering of heavy chain-light chain pairing included identifying a representative Fab. A criterion for a representative Fab was that it was a member of commonly used heavy chain variable domain (VH) and light chain variable domain (VL) subgroup such as VH3 and Vκ1 or Vλ1. For charge engineering several criteria were considered. The chosen amino acids should not be in contact with the variable domain CDRs in the conformational structure as interaction-contacts to CDRs could eventually lead to loss of binding, and thereby should be avoided. The chosen positions should be highly conserved within most common antibody families, in order to be able to generate heterodimers of any given subfamily. Additionally, by avoiding positions in the centre of the interface of the VH with VL, and heavy chain constant domain 1 (CH1) with the light chain constant domain (CL), and choosing positions at the rim of this interface, it was possible to achieve an effect that strongly favours heterodimeric formation by creating salt bridges at the ends of the domains and thereby generating a "clip-effect" that closes the correct heavy-light chain formation. This "clip-effect" served to stabilize the protein and reduce destabilization of the interface of the constant domains CH1 and CL. Therefore, charged residues at the end of the VH and VL domains and at the beginning and end of CH1 and CL domains were introduced. Selection of the residues for charge engineering at the end of the CH1 and CL domains was based on the observed distance of up to 12 Å between the respective main chains, as opposed to selecting residues for modification based on side chain interactions.

In one aspect, the present invention provides a heterodimeric antibody or fragment thereof comprising an engineered VH and CH1 domain, and an engineered VL and CL domain comprising a number of substitutions at certain positions. The numbering of all substitution positions is according to EU numbering.

In one embodiment, the present invention provides a heterodimeric antibody or fragment thereof comprising an engineered VH domain and CH1 domain comprising a charged or neutral amino acid at positions 39, 147 and 165; and an engineered VL domain and CL domain comprising a charged or neutral amino acid at positions 38, 124 and 169/170 (EU numbering), wherein said amino acids in the VH and CH1 domains, and the corresponding amino acids of the interface in the VL and CL domains pairwise are of opposing charge or are charged/neutral, and form an interface that is electrostatically favourable to heterodimerization. To ensure that the amino acid at the positions specified is of the appropriate charge (negative, positive or neutral/uncharged), it may be necessary to substitute an amino acid at a specific position in the wild type sequence with an amino acid of a different charge. For example, the amino acid in the wild type sequence may be neutral, basic or acidic and the substitution results in a change in charge. More specifically, a neutral amino acid may be substituted with a basic or acidic amino acid, a basic amino acid may be substituted with a neutral or an acidic amino acid or an acidic amino acid may be substituted with a neutral or a basic amino acid.

In one embodiment, in the VH domain, the neutral amino acid glutamine (Q) at position 39 may be substituted with a basic or acidic amino acid. Examples of basic amino acids (positive charge) include arginine (R), lysine (K) or histidine (H) and examples of acidic amino acids (negative charge)

include aspartic acid (D) and glutamic acid (E). In particular, the substitution is from Q to R, K or D. In the CH1 domain, the basic amino acid K at position 147 may remain unchanged i.e. has a positive charge or may be substituted with a neutral or an acidic amino acid. In particular, the substitution is to an acidic amino acid and is from K to D. In addition, the neutral amino acid serine (S) at position 165 may remain uncharged i.e. is neutral or may be substituted with a basic or acidic amino acid. In particular the substitution is from S to R or D. In one embodiment, the VH domain is from the VH1, VH2, VH3, VH5 or VH6 subfamily. In a particular embodiment, the VH domain is from the VH3 subfamily.

In one embodiment, in which the light chain is of the kappa (κ) subtype, in the VL domain the neutral amino acid Q at position 38 maybe substituted with a basic or acidic amino acid. Examples of basic amino acids include arginine (R), lysine (K) or histidine (H) and examples of acidic amino acids include aspartic acid (D) and glutamic acid (E). In particular, the substitution is from Q to R, K or D. In the CL domain, the neutral amino acid Q at position 124 may remain unchanged i.e. is neutral or may be substituted with a basic or acidic amino acid. In particular, the substitution is from Q to K or D. In addition, the basic amino acid K at position 169 may remain unchanged i.e. has a positive charge or may be substituted with a neutral or an acidic amino acid, in particular the substitution is to an acidic amino acid and is from K to D. In one embodiment, the kappa light chain is of the Vκ1, or Vκ3 subfamily.

In one embodiment in which the light chain is of the lambda (λ) subtype, in the VL domain the neutral amino acid Q at position 38 maybe substituted with a basic or acidic amino acid. Examples of basic amino acids include arginine (R), lysine (K) or histidine (H) and examples of acidic amino acids include aspartic acid (D) and glutamic acid (E). In particular, the substitution is to a basic amino acid and is from Q to K. In the CL domain, the acidic amino acid E at position 124 may be substituted with a neutral, basic or another acidic amino acid. In particular, the substitution is to another acidic amino acid and is from E to D. In addition, the neutral amino acid N at position 170 may remain uncharged i.e. is neutral or may be substituted with a basic or acidic amino acid. In particular the substitution is to a basic amino acid and is from N to K or is from N to R. In one embodiment, the lambda light chain is of the Vλ1, Vλ2 or Vλ3 subfamily.

In one embodiment, the engineered VH and CH1 domains may comprise charged or neutral amino acids at positions 39, 147 and 165 and the engineered VL and CL domains may comprise charged or neutral amino acids at the corresponding positions 38, 124 and 169/170 of the interface (EU numbering). As such, the present invention provides a heterodimeric antibody or fragment thereof with engineered VH and CH1 domains and engineered VL and CL domains wherein:
  (i) the engineered VH and CH1 domains comprise an acidic amino acid at position 39, an acidic amino acid at position 147 and an acidic amino acid at position 165 and the engineered VL and CL domains comprise a basic amino acid at position 38, a basic amino acid at position 124 and a basic amino acid at position 169/170;
  (ii) the engineered VH and CH1 domains comprise a basic amino acid at position 39, a basic amino acid at position 147 and a basic amino acid at position 165 and the engineered VL and CL domains comprise an acidic amino acid at position 38, an acidic amino acid at position 124 and an acidic amino acid at position 169/170;
  (iii) the engineered VH and CH1 domains may comprise an acidic amino acid at position 39, an acidic amino acid at position 147 and a basic amino acid at position 165 and the engineered VL and CL domains may comprise a basic amino acid at position 38, a basic amino acid at position 124 and an acidic amino acid at position 169/170;
  (iv) the engineered VH and CH1 domains may comprise a basic amino acid at position 39, a basic amino acid at position 147 and an acidic amino acid at position 165 and the engineered VL and CL domains may comprise an acidic amino acid at position 38, an acidic amino acid at position 124 and a basic amino acid at position 169/170;
  (v) the engineered VH and CH1 domains may comprise an acidic amino acid at position 39, a basic amino acid at position 147 and an acidic amino acid at position 165 and the engineered VL and CL domains may comprise a basic amino acid at position 38, an acidic amino acid at position 124 and a basic amino acid at position 169/170;
  (vi) the engineered VH and CH1 domains may comprise a basic amino acid at position 39, an acidic amino acid at position 147 and a basic amino acid at position 165 and the engineered VL and CL domains may comprise an acidic amino acid at position 38, a basic amino acid at position 124 and an acidic amino acid at position 169/170;
  (vii) the engineered VH and CH1 domains may comprise an acidic amino acid at position 39, a basic amino acid at position 147 and an acidic amino acid at position 165 and the engineered VL and CL domains may comprise a basic amino acid at position 38, an acidic amino acid at position 124 and a neutral amino acid at position 169/170;
  (viii) the engineered VH and CH1 domains may comprise a basic amino acid at position 39, an acidic amino acid at position 147 and a neutral amino acid at position 165 and the engineered VL and CL domains may comprise an acidic amino acid at position 38, a basic amino acid at position 124 and a basic amino acid at position 169/170; or
  (ix) the engineered VH and CH1 domains may comprise an acidic amino acid at position 39, a basic amino acid at position 147 and a neutral amino acid at position 165 and the engineered VL and CL domains may comprise a basic amino acid at position 38, a neutral amino acid at position 124 and a basic amino acid at position 169/170.

In one embodiment, the engineered VH and CH1 domains may comprise a basic amino acid at position 39, an acidic amino acid at position 147 and a neutral amino acid at position 165 and the engineered VL and CL domains may comprise an acidic amino acid at position 38, a basic amino acid at position 124 and a basic amino acid at position 169 (EU numbering). Alternatively, the engineered VH and CH1 domains may comprise an acidic amino acid at position 39, a basic amino acid at position 147 and a neutral amino acid at position 165 and the engineered VL and CL domains may comprise a basic amino acid at position 38, a neutral amino acid at position 124 and a basic amino acid at position 169 (EU numbering). Alternatively, the engineered VH and CH1 domains may comprise an acidic amino acid at position 39, a basic amino acid at position 147 and an acidic amino acid at position 165 and the engineered VL and CL domains may comprise a basic amino acid at position 38, an acidic amino acid at position 124 and a neutral amino acid at position 1709 (EU numbering).

In a specific embodiment, the present invention provides a heterodimeric antibody or fragment thereof having engineered VH and CH1 domains comprising at positions 39, 147 and 165 (EU numbering) an acidic amino acid, a basic amino acid and an acidic amino acid, respectively therefore resulting in a negative, positive and negative charge, respectively at these positions, or vice versa. The corresponding engineered VL and CL domains comprise at positions 38, 124 and 169/170 (EU numbering) an amino acid having an opposing charge to that of the corresponding heavy chain interface amino acid. For example, if the engineered heavy chain comprises at position 39 an acidic amino acid, at position 147 a basic amino acid and at position 165 an acidic amino acid, then the corresponding light chain will comprise at position 38 a basic amino acid, at position 124 an acidic amino acid and at position 169/170 a basic amino acid (EU numbering). Alternatively, if the engineered heavy chain comprises at position 39 a basic amino acid, at position 147 an acidic amino acid and at position a basic amino acid, then the corresponding light chain will comprise at position 38 an acidic amino acid, at position 124 a basic amino acid and at position 169/170 an acidic amino acid (EU numbering).

In one embodiment, the present invention provides a heterodimeric antibody or fragment thereof comprising substitutions selected from the group consisting of:
i. Q39D, S165D in the VH and CH1, and Q38K in the VL,
ii. Q39K, K147D in the VH and CH1, and Q38D, Q124K in the kappa VL and CL;
iii. Q39D, S165D in the VH and CH1, and Q38K, Q124D in the kappa VL and CL;
iv. Q39K, K147D, S165R in the VH and CH1, and Q38D, Q124K, K169D in the kappa VL and CL;
v. Q39D, S165D in the VH and CH1, and Q38K, E124D, N170K in the lambda VL and CL
vi. Q39D, S165D in the VH and CH1, and Q38K, N170R in the lambda VL and CL.

In one embodiment, the present invention provides a heterodimeric antibody or fragment thereof comprising at least two Fabs, wherein each Fab binds to a different epitope on an antigen. The epitopes may be on the same antigen or alternatively, the epitopes may be on different antigens. In one embodiment the heterodimeric antibody or fragment thereof may be multispecific such as bispecific or trispecific. In such a mutispecific antibody, the amino acids at the interface of the VH and CH1 with the corresponding VL and CL need to be of opposing charge or charge/neutral, to ensure that an interface is formed that is electrostatically favourable to heterodimerization. For example, in a bispecific antibody or fragment thereof, a Fab that binds to a first epitope may have engineered VH and CH1 domains comprising at positions 39, 147 and 165 (EU numbering) an acidic amino acid, a basic amino acid and an acidic amino acid, respectively, and the corresponding engineered VL and CL domains comprise at positions 38, 124 and 169/170 (EU numbering) an amino acid having an opposing charge to that of the corresponding heavy chain interface amino acid. The Fab that binds to a second epitope may therefore have engineered VH and CH1 domains comprising at positions 39, 147 and 165 (EU numbering) a basic amino acid, an acidic amino acid and a basic amino acid, respectively, and the corresponding engineered VL and CL domains comprise at positions 38, 124 and 169/170 (EU numbering) an amino acid having an opposing charge to that of the corresponding heavy chain interface amino acid. Therefore, the engineered light chains will only associate with their cognate heavy chain of corresponding charge to ensure correct heavy chain-light chain pairing.

In a specific embodiment, the present invention provides a bispecific antibody or fragment thereof, comprising a first Fab comprising engineered VH and CH1 domains comprising the substitutions Q39K, K147D and S165R and engineered VL and CL domains comprising the substitutions Q38D, Q124K and K169D, and a second Fab comprising engineered VH and CH1 domains comprising the substitutions Q39D and S165D and engineered kappa VL and CL domains comprising the substitutions Q38K and Q124D, or engineered lambda VL and CL domains comprising the substitutions Q38K, Q38K and N170R or Q38K, E124D and N170K.

In a further aspect, the present invention provides a heterodimeric antibody or fragment thereof comprising a Fc region. In one embodiment, the Fc region comprises engineered CH3 domains comprising modifications according to the "knobs-into-holes" approach as described in, e.g., Ridgway J B B et al., (1996) Protein Engineering, 9(7): 617-21 and U.S. Pat. No. 5,731,168. This approach has been shown to promote the formation of heterodimers of heavy chains and hinder the assembly of corresponding heavy chain homodimers. In this approach, a knob is created by replacing small amino side chains at the interface between CH3 domains with larger ones, whereas a hole is constructed by replacing large side chains with smaller ones. In one embodiment, the "knob" mutation comprises T366W and the "hole" mutations comprise T366S, L368A and Y407V (Atwell S et al., (1997) J. Mol. Biol. 270: 26-35). In a specific embodiment, the "knob" mutations comprise T366W, S354C and the "hole" mutations comprise T366S, L368A, Y407V and Y349C, so that a disulphide bond is formed between the corresponding cysteine residues S354C and Y349C, further promoting heterodimer formation.

Another aspect of the present invention provides a method of preparing an heterodimeric antibody or fragment thereof comprising an engineered VH and CH1 domain and an engineered VL and CL domain, the method comprising substituting at least two amino acids in the VH and CH1 domains such that the engineered domains comprise a charged or neutral amino acid at positions 39, 147 and 165 (EU numbering), and substituting an amino acid in the VL and CL domains such that the engineered domains comprise charged or neutral amino acids at positions 38, 124 and 169/170 (EU numbering), and wherein said amino acids in the VH and CH1 domains and the corresponding amino acids of the interface in the VL and CL domains pairwise are of opposing charge or are charged/neutral and form an interface that is electrostatically favourable to heterodimerization.

In yet another aspect of the present invention, the electrostatic steering mechanisms as described herein, that promote correct heavy and light chain pairing for heterodimeric antibodies and fragments thereof, were combined with modifications to VH-VL and CH1-CL interface of the heterodimeric antibody to engineer an interchain disulfide bond. This interchain disulfide bond further promotes cognate heavy and light chain pairing. In addition, the engineered disulfide bond facilitates the analytical procedure for profiling the heterodimeric antibodies permitting easy identification and quantification of misassembled molecules by a simple electrophoresis based procedure. This results in a robust, high-throughput platform for screening of heterodimeric antibodies and fragments thereof with correct heavy chain-light chain pairing.

BRIEF DESCRIPTION OF THE FIGURE

FIG. 1 shows a SDS-polyacrylamide gel subjected to electrophoresis under non-reducing conditions, in which purified bispecific antibodies have been loaded. Details of the wells with the corresponding bispecific antibody arm modifications are shown in Table 9. In wells 2 to 5, the knob arm of the bispecific antibody comprised modifications relating to charge engineering and the hole arm comprised modification related to charge engineering plus disulfide bond engineering. In wells 7 to 10, the knob and hole arms comprise no modifications relating to charge engineering but the hole arm comprises modifications relating to disulfide bond engineering. As can be observed for wells 7 to 10 in comparison to wells 2 to 5, disulfide bond engineering alone was insufficient to achieve correct heavy chain-light chain pairing. Rows 1, 6 and 11 show the molecular weight marker.

DETAILED DESCRIPTION

Disclosed herein are heterodimeric antibodies or fragments thereof comprising mutated heavy and light chains that have a high degree of heterodimerization. Also disclosed herein are methods that utilize electrostatic steering to select interface residues which when mutated, result in an increase in the correct paring of a light chain with its cognate heavy chain. Co-transfection and co-expression of the mutated heavy and light chains in the same cell gives rise to the assembly of a functional, heterodimeric antibody or antibody fragment.

Definitions

As used herein, the term "antibody" refers to a protein, e.g., an immunoglobulin chain or fragment thereof, comprising at least one immunoglobulin variable domain sequence. The term "antibody" includes, for example, a monoclonal antibody (including a full length antibody which has an immunoglobulin Fc region). In an embodiment, an antibody comprises a full length antibody, or a full length immunoglobulin chain. In an embodiment, an antibody comprises an antigen binding or functional fragment of a full length antibody, or a full length immunoglobulin chain.

In an embodiment, an antibody can include a heavy (H) chain variable domain sequence (abbreviated herein as VH), and a light (L) chain variable domain sequence (abbreviated herein as VL). In an embodiment, an antibody comprises or consists of a heavy chain and a light chain (referred to herein as a half antibody). In another example, an antibody includes two VH sequences and two VL sequences, thereby forming two antigen binding sites, such as Fab, Fab', F(ab')2, Fc, Fd, Fd', Fv, single chain antibodies (scFv for example), single variable domain antibodies, diabodies (Dab) (bivalent and bispecific), and chimeric (e.g., humanized) antibodies, which may be produced by the modification of whole antibodies or those synthesized de novo using recombinant DNA technologies. These functional antibody fragments retain the ability to selectively bind with their respective antigen or receptor. Antibodies and antibody fragments can be from any class of antibodies including, but not limited to, IgG, IgA, IgM, IgD, and IgE, and from any subclass (e.g., IgG1, IgG2, IgG3, and IgG4) of antibodies. The preparation of an antibody can be monoclonal or polyclonal. An antibody can also be a human, humanized, CDR-grafted, or in vitro generated antibody. The antibody can have a heavy chain constant region chosen from, e.g., IgG1, IgG2, IgG3, or IgG4. The antibody can also have a light chain chosen from, e.g., kappa or lambda. The term "immunoglobulin" (Ig) is used interchangeably with the term "antibody" herein.

In an embodiment, an antibody comprises an antigen-binding fragment of an antibody. Examples of such fragments include: (i) a Fab fragment, a monovalent fragment consisting of the VL, VH, CL and CH1 domains; (ii) a F(ab')2 fragment, a bivalent fragment comprising two Fab fragments linked by a disulfide bridge at the hinge region; (iii) a Fd fragment consisting of the VH and CH1 domains; (iv) a Fv fragment consisting of the VL and VH domains of a single arm of an antibody, (v) a diabody (dAb) fragment, which consists of a VH domain; (vi) a camelid or camelized variable domain; (vii) a single chain Fv (scFv), see e.g., Bird et al., (1988) Science 242:423-426; and Huston et al., (1988) PNAS USA 85:5879-5883); (viii) a single domain antibody. These antibody fragments are obtained using conventional techniques known to those with skill in the art, and the fragments are screened for utility in the same manner as are intact antibodies.

A Fab as used herein refers to a polypeptide that comprises a VH, CH1, VL and CL immunoglobulin domain. Fab may refer to this polypeptide region in isolation, or as a polypeptide in the context of a full length antibody or antibody fragment.

As used herein, an "immunoglobulin variable domain sequence" refers to an amino acid sequence which can form the structure of an immunoglobulin variable domain. For example, the sequence may include all or part of the amino acid sequence of a naturally-occurring variable domain. For example, the sequence may or may not include one, two, or more N- or C-terminal amino acids, or may include other alterations that are compatible with formation of the protein structure.

The term "antigen-binding site" refers to the part of an antibody that comprises determinants that form an interface that binds to the antigen, or an epitope thereof. With respect to proteins (or protein mimetics), the antigen-binding site typically includes one or more loops (of at least four amino acids or amino acid mimics) that form an interface that binds to the antigen polypeptide. Typically, the antigen-binding site of an antibody molecule includes at least one or two CDRs and/or hypervariable loops, or more typically at least three, four, five or six CDRs and/or hypervariable loops.

In one embodiment, the antibody can be recombinantly produced, e.g., produced by phage display or by combinatorial methods. Phage display and combinatorial methods for generating antibodies are known in the art (as described in, e.g., Ladner et al. U.S. Pat. No. 5,223,409; Kang et al., WO 92/18619; Dower et al., WO 91/17271; Winter et al., WO 92/20791; Markland et al., WO 92/15679; Breitling et al., WO 93/01288; McCafferty et al., WO 92/01047; Garrard et al., WO 92/09690; Ladner et al., WO 90/02809; Fuchs et al., (1991) Bio/Technology 9:1370-1372; Hay et al., (1992) Hum Antibody Hybridomas 3:81-85; Huse et al., (1989) Science 246:1275-1281; Griffths et al., (1993) EMBO J 12:725-734; Hawkins et al., (1992) J Mol Biol 226:889-896; Clackson et al., (1991) Nature 352:624-628; Gram et al., (1992) PNAS 89:3576-3580; Garrard et al., (1991) Bio/Technology 9:1373-1377; Hoogenboom et al., (1991) Nuc Acid Res 19:4133-4137; and Barbas et al., (1991) PNAS 88:7978-7982, the contents of all of which are incorporated by reference herein).

In one embodiment, the antibody is a fully human antibody (e.g., an antibody made in a mouse which has been genetically engineered to produce an antibody from a human immunoglobulin sequence or an antibody isolated from a human), or a non-human antibody, e.g., a rodent (mouse or rat), goat, primate (e.g., monkey), camel antibody. Human monoclonal antibodies can be generated using transgenic mice carrying the human immunoglobulin genes rather than the mouse system. Splenocytes from these transgenic mice immunized with the antigen of interest are used to produce hybridomas that secrete human monoclonal antibodies with specific affinities for epitopes from a human protein (see, e.g., Wood et al., WO 91/00906, Kucherlapati et al., WO 91/10741; Lonberg et al., WO 92/03918; Kay et al., WO 92/03917; Lonberg, N. et al., (1994) Nature 368:856-859; Green, L. L. et al., (1994) Nature Genet. 7:13-21; Morrison, S. L. et al., (1994) PNAS USA 81:6851-6855; Bruggeman et al., (1993) Year Immunol 7:33-40; Tuaillon et al., (1993) PNAS 90:3720-3724; Bruggeman et al., (1991) Eur J Immunol 21:1323-1326).

An antibody can be one in which the variable region, or a portion thereof, e.g., the CDRs, are generated in a non-human organism, e.g., a rat or mouse. Chimeric, CDR-grafted, and humanized antibodies are within the invention. Antibodies generated in a non-human organism, e.g., a rat or mouse, and then modified, e.g., in the variable framework or constant region, to decrease antigenicity in a human are within the invention. Chimeric antibodies can be produced by recombinant DNA techniques known in the art (see Robinson et al., WO 87/002671; Akira et al., EP184187A1; Taniguchi, M., EP171496A1; Morrison et al., EP173494A1; Neuberger et al., WO 86/01533; Cabilly et al., U.S. Pat. No. 4,816,567; Cabilly et al., EP125023A1; Better et al., (1988) Science 240:1041-1043; Liu et al., (1987) PNAS 84:3439-3443; Liu et al., (1987), J. Immunol. 139:3521-3526; Sun et al., (1987) PNAS 84:214-218; Nishimura et al., (1987), Canc. Res. 47:999-1005; Wood et al., (1985) Nature 314: 446-449; and Shaw et al., (1988), J. Natl Cancer Inst. 80:1553-1559).

A humanized or CDR-grafted antibody will have at least one or two but generally all three recipient CDRs (of heavy and or light immunoglobulin chains) replaced with a donor CDR. The antibody may be replaced with at least a portion of a non-human CDR or only some of the CDRs may be replaced with non-human CDRs. It is only necessary to replace the number of CDRs required for binding of the humanized antibody to the target antigen. Preferably, the donor will be a rodent antibody, e.g., a rat or mouse antibody, and the recipient will be a human framework or a human consensus framework. Typically, the immunoglobulin providing the CDRs is called the 'donor' and the immunoglobulin providing the framework is called the 'acceptor'. In one embodiment, the donor immunoglobulin is a non-human (e.g., rodent). The acceptor framework is a naturally-occurring (e.g., a human) framework or a consensus framework, or a sequence about 85% or higher, preferably 90%, 95%, 99% or higher identical thereto.

As used herein, the term 'consensus sequence' refers to the sequence formed from the most frequently occurring amino acids (or nucleotides) in a family of related sequences (See e.g., Winnaker, From Genes to Clones (Verlagsgesellschaft, Weinheim, Germany 1987)). In a family of proteins, each position in the consensus sequence is occupied by the amino acid occurring most frequently at that position in the family. If two amino acids occur equally frequently, either can be included in the consensus sequence. A 'consensus framework' refers to the framework region in the consensus immunoglobulin sequence.

An antibody can be humanized by methods known in the art (see e.g., Morrison, S. L., (1985), Science 229:1202-1207; Oi et al., (1986), BioTechniques 4:214, and Queen et al., U.S. Pat. Nos. 5,585,089, 5,693,761 and 5,693,762, the contents of all of which are hereby incorporated by reference). Humanized or CDR-grafted antibodies can be produced by CDR-grafting or CDR substitution, wherein one, two, or all CDRs of an immunoglobulin chain can be replaced. See e.g., U.S. Pat. No. 5,225,539; Jones et al., (1986) Nature 321:552-525; Verhoeyan et al., (1988) Science 239:1534; Beidler et al., (1988) J. Immunol. 141:4053-4060 and Winter U.S. Pat. No. 5,225,539, the contents of all of which are hereby expressly incorporated by reference. Also within the scope of the invention are humanized antibodies in which specific amino acids have been substituted, deleted or added. Criteria for selecting amino acids from the donor are described in U.S. Pat. No. 5,585,089, e.g., columns 12-16 of U.S. Pat. No. 5,585,089, the contents of which are hereby incorporated by reference. Other techniques for humanizing antibodies are described in Padlan et al., EP 519596 A1.

In yet other embodiments, the antibody has a heavy chain constant region chosen from, e.g., the heavy chain constant regions of IgG1, IgG2, IgG3, IgG4, IgM, IgA1, IgA2, IgD, and IgE; particularly, chosen from, e.g., the (e.g., human) heavy chain constant regions of IgG1, IgG2, IgG3, and IgG4. In another embodiment, the antibody molecule has a light chain constant region chosen from, e.g., the (e.g., human) light chain constant regions of kappa or lambda. The constant region can be altered, e.g., mutated, to modify the properties of the antibody (e.g., to increase or decrease one or more of: Fc receptor binding, antibody glycosylation, the number of cysteine residues, effector cell function, and/or complement function). In one embodiment, the antibody has effector function and can fix complement. In other embodiments, the antibody does not recruit effector cells or fix complement. In another embodiment, the antibody has reduced or no ability to bind an Fc receptor. For example, it is a subtype, isotype, fragment or other mutant, which does not support binding to an Fc receptor, e.g., it has a mutagenized or deleted Fc receptor binding region.

Methods for altering an antibody constant region are known in the art. Antibodies with altered function, e.g. altered affinity for an effector ligand, such as FcR on a cell, or the C1 component of complement can be produced by replacing at least one amino acid residue in the constant portion of the antibody with a different residue (see e.g., EP388151A1, U.S. Pat. Nos. 5,624,821 and 5,648,260, the contents of all of which are hereby incorporated by reference). Similar type of alterations could be described which if applied to the murine, or other species immunoglobulin would reduce or eliminate these functions.

A 'conservative amino acid substitution' is one in which the amino acid residue is replaced with an amino acid residue having a similar side chain. Families of amino acid residues having similar side chains have been defined in the art. These families include amino acids with basic side chains (e.g., lysine (K), arginine (R), histidine (H)), acidic side chains (e.g., aspartic acid (D), glutamic acid (E)), uncharged polar side chains (e.g., glycine (G), asparagine (N), glutamine (Q), serine (S), threonine (T), tyrosine (Y), cysteine (C)), nonpolar side chains (e.g., alanine (A), valine (V), leucine (L), isoleucine (I), proline (P), phenylalanine (F), methionine (M), tryptophan (W)), beta-branched side chains (e.g., threonine (T), valine (V), isoleucine (I)) and aromatic side chains (e.g., tyrosine (Y), phenylalanine (F), tryptophan (W), histidine (H)).

Heterodimeric Antibodies

In an embodiment, an antibody is a heterodimeric antibody, e.g., it comprises a plurality of immunoglobulin variable domains sequences, wherein a first immunoglobulin variable domain sequence of the plurality has binding specificity for a first epitope and a second immunoglobulin variable domain sequence of the plurality has binding specificity for a second epitope. In an embodiment, the first and second epitopes are on the same antigen, e.g., the same protein (or subunit of a multimeric protein). In another embodiment, the first and second epitopes are on different antigens, e.g., the different proteins (or different subunits of a multimeric protein). In an embodiment, a heterodimeric antibody comprises a third, fourth or fifth immunoglobulin variable domain. In an embodiment, a heterodimeric antibody is a bispecific antibody, a trispecific antibody or tetraspecific antibody.

In a specific embodiment, the heterodimeric antibody is a bispecific antibody or fragment thereof. A bispecific antibody has specificity for no more than two epitopes. A bispecific antibody is characterized by a first immunoglobulin variable domain sequence which has binding specificity for a first epitope and a second immunoglobulin variable domain sequence that has binding specificity for a second epitope. In an embodiment, the first and second epitopes are on the same antigen, e.g., the same protein (or subunit of a multimeric protein). In an embodiment, the first and second epitopes overlap. In an embodiment, the first and second epitopes do not overlap. In an embodiment, the first and second epitopes are on different antigens, e.g., the different proteins (or different subunits of a multimeric protein). In an embodiment, a bispecific antibody comprises a heavy chain variable domain sequence and a light chain variable domain sequence which have binding specificity for a first epitope and a heavy chain variable domain sequence and a light chain variable domain sequence which have binding specificity for a second epitope. In an embodiment, a bispecific antibody molecule comprises a half antibody having binding specificity for a first epitope and a half antibody having binding specificity for a second epitope. In an embodiment, a bispecific antibody molecule comprises a half antibody, or fragment thereof, having binding specificity for a first epitope and a half antibody, or fragment thereof, having binding specificity for a second epitope. In an embodiment, a bispecific antibody or fragment thereof comprises a Fab having binding specificity for a first epitope and a Fab having binding specificity for a second epitope.

The most commonly used method for the production of heterodimeric antibodies, particularly bispecific antibodies is by separate expression of the component antibodies in different host cells, followed by purification and assembly into a functional IgG. However, such a method is costly and involves complex manufacturing processes. Therefore, single host cell expression systems are preferable but have been associated with issues of heavy chain and light chain pairing problems.

The heavy chain pairing problem reflects the ability of heavy chains to form homodimers as well as heterodimers when expressed in a single host cell. The homodimerization of the two heavy chains in an IgG is mediated by the interaction between the CH3 domains. One of the initial methods generated to improve the heterodimerization of heavy chains utilized the "knobs-into-holes" strategy (Ridgway et al., (1996) supra). Additional methods to improve heavy chain heterodimerization include inter alia the rational design of electrostatic steering mutations (Gunasekaran et al., (2010) JBC, 285: 19637-46; Strop et al., (2012) J. Mol. Biol. 420: 204-19), the use of computational design (Moore et al., (2011) mAbs, 3: 546-557; Von Kreudenstein et al., (2013) mAbs 5: 646-54), the exploitation of sequence divergence but structural similarity of the CH3 domains of IgG and IgA (Strand Exchange Engineered Domains (SEED) platform; Davis et al., (2010) Protein Eng. Des. Sel., 23: 195-202) and the use of a common heavy chain (Fischer et al., (2015) Nat Commun. 6: 6113). Recent work described in WO 16/118742 (Eli Lilly and Co), relates to bispecific antibodies that comprise substitutions in both CH3 domains to achieve heavy chain heterodimerization. These substitutions were also combined with substitutions to the VH and VL domains and CH1 and CL domains as described in Lewis et al., (2014) Nat. Biotech. 32: 191-8 and WO 14/150973 (Eli Lilly & Co; discussed below).

To address the light chain-heavy chain mispairing problem, previous methods have included the generation of bispecific antibodies using a single light chain. This requires heavy-light chain engineering or novel antibody libraries that utilize a single light chain that limits the diversity (Merchant et al., (1998) Nat. Biotech. 16(7):677-81). In addition, antibodies with a common light chain have been identified from transgenic mice with a single light chain (WO 11/097603 Regeneron; Dhimolea & Reichert (2012) mAbs, 4: 4-13). Another approach is to swap the CH1 domain of one heavy chain with CL domain of its cognate light chain (Crossmab technology, Schaefer et al., (2011) supra), which can also include the "knobs-into-holes" method to ensure heavy chain heterodimerization (Merchant et al., (1998) supra). Design of an orthogonal CH1-CL interface is also possible (Lewis S M et al., (2014) supra) or the use of electrostatic steering mechanisms to engineer antibody light chain-heavy chain interface residues (Liu Z et al., (2015) JBC, 290:7535-62). Analysis of Fab interfaces revealed that hydrogen bonds and Van-der-Waals interactions are dominant, whereas electrostatic interactions are rare between the light chain and heavy chain.

Additional protocols for generating heterodimeric antibodies include, but not limited to, for example: the electrostatic steering Fc pairing as described in, e.g., WO 09/089004, WO 06/106905 and WO 10/129304; Fab arm exchange as described in, e.g., WO 08/119353, WO 11/131746, and WO 13/060867; double antibody conjugate, e.g., by antibody cross-linking to generate a bi-specific structure using a heterobifunctional reagent having an amine-reactive group and a sulfhydryl reactive group as described in, e.g., U.S. Pat. No. 4,433,059; bispecific antibody determinants generated by recombining half antibodies (heavy-light chain pairs or Fabs) from different antibodies through cycle of reduction and oxidation of disulfide bonds between the two heavy chains, as described in, e.g., U.S. Pat. No. 4,444,878; trifunctional antibodies, e.g., three Fab' fragments cross-linked through sulfhydryl reactive groups, as described in, e.g., U.S. Pat. No. 5,273,743; biosynthetic binding proteins, e.g., pair of scFvs cross-linked through C-terminal tails preferably through disulfide or amine-reactive chemical cross-linking, as described in, e.g., U.S. Pat. No. 5,534,254; bifunctional antibodies, e.g., Fab fragments with different binding specificities dimerized through leucine zippers (e.g., c-fos and c-jun) that have replaced the constant domain, as described in, e.g., U.S. Pat. No. 5,582, 996; bispecific and oligospecific mono- and oligovalent receptors, e.g., VH-CH1 regions of two antibodies (two Fab fragments) linked through a polypeptide spacer between the CH1 region of one antibody and the VH region of the other antibody typically with associated light chains, as described in, e.g., U.S. Pat. No. 5,591,828; bispecific DNA-antibody conjugates, e.g., crosslinking of antibodies or Fab fragments through a double stranded piece of DNA, as described in, e.g., U.S. Pat. No. 5,635,602; bispecific fusion proteins, e.g., an expression construct containing two scFvs with a hydrophilic helical peptide linker between them and a full constant region, as described in, e.g., U.S. Pat. No. 5,637,481; multivalent and multispecific binding proteins, e.g., dimer of polypeptides having first domain with binding region of Ig heavy chain variable region, and second domain with binding region of Ig light chain variable region, generally termed diabodies (higher order structures are also disclosed creating bispecific, trispecific, or tetraspecific molecules, as described in, e.g., U.S. Pat. No. 5,837,242; minibody constructs with linked VL and VH chains further connected with peptide spacers to an antibody hinge region and CH3 region, which can be dimerized to form bispecific/multivalent molecules, as described in, e.g., U.S. Pat. No. 5,837,821; VH and VL domains linked with a short peptide linker (e.g., 5 or 10 amino acids) or no linker at all in either orientation, which can form dimers to form bispecific diabodies; trimers and tetramers, as described in, e.g., U.S. Pat. No. 5,844,094; String of VH domains (or VL domains in family members) connected by peptide linkages with cross linkable groups at the C-terminus further associated with VL domains to form a series of FVs (or scFvs), as described in, e.g., U.S. Pat. No. 5,864,019; and single chain binding polypeptides with both a VH and a VL domain linked through a peptide linker are combined into multivalent structures through non-covalent or chemical crosslinking to form, e.g., homobivalent, heterobivalent, trivalent, and tetravalent structures using both scFv or diabody type format, as described in, e.g., U.S. Pat. No. 5,869,620.

Charge Engineering

Specific examples of the use of charge engineering to generate bispecific antibody molecules include SEED heterodimer formation as described in, e.g., WO 07/110205 (Merck) as well as the technologies described in WO 09/089004 (Amgen), EP1870459B1 (Chugai), WO 10/129304 (Oncomed), WO 14/150973 (Eli Lilly & Co and University of North Carolina) and WO 16/118742 (Eli Lilly and & Co).

The SEED heterodimers as described in, WO 07/110205 (Merck), comprise engineered CH3 domains of IgA and IgG, wherein the first and second engineered domains form heterodimers with one another preferentially over forming homodimers. In addition, the Fc region can be differentially tagged to exploit the inability of human IgG3 isotype to bind to protein A enabling the efficient purification of heterodimers (U.S. Pat. No. 8,586,713).

WO 09/089004 (Amgen Inc.) describes and exemplifies methods for making bispecific antibody molecules using charge engineering in the CH3 domain to electrostatically favour heavy chain heterodimer formation over homodimer formation. This application further suggests that to increase the fidelity of each light chain to bind to the proper heavy chain, the CH1 domain of the heavy chains and constant region of the light chain can also be engineered to favour dimerization. Their analysis of the light chain-heavy chain interaction revealed positions in which charge pairs could be introduced into the sequence to enhance binding of a specific light and heavy chain pair. These positions included T112 of lambda light chain and A141 of the heavy chain, E156 of lambda light chain and S176 of the heavy chain, and S171 of lambda light chain and S183 of the heavy chain. Additional positions were shown in bold type in Tables 4 and 5 of WO 09/089004.

EP1870459B1 (Chugai) reports that the association between VH and VL can be regulated by substituting amino acids present at the VH-VL interface with charged amino acids, which is more effective at forming heterologous molecules than 'knob into hole' technology. They suggest that this can be applied not only to the regulation of association between VH and VL, but can also be applied to the regulation of associations among arbitrary polypeptides. Suggested modifications are in the VH/VL interface of an sc(Fv)2. Preparations of VH/VL interface modified sc(Fv)2 included modifications at Q39 of the VH and Q38 of the VL, and P44 of the VL.

In WO 10/129304 (Oncomed Pharmaceuticals. Inc.), methods are described in which altered electrostatic and/or hydrophobic/hydrophilic interactions between polypeptides in heterodimeric molecules favours the formation of heavy chain heteromultimers over homomultimers. Amino acids that interact at the interface between two polypeptides were selected for modification. An amino acid residue involved in hydrophilic interactions was replaced with a more hydrophobic amino acid residue and/or an amino acid involved in a charge interaction with another amino acid. Positions 236, 245, 249, 278, 286, and 288 in the CH3 domain of human IgG2 were selected for substitutions.

Work described in WO 14/150973 (Eli Lilly & Co and University of North Carolina), relates to Fabs and bispecific antibodies with designed residues in the interfaces of the VH and VL domains and CH1 and CL domains. Substitutions were made at position 62 in the VH and position 1 in the VL and/or position 39 in the VH and position 38 in the VL (Kabat numbering). Further substitutions were made at positions 172 and/or 174 in the CH1 and positions 135 and/or 176 in the CL. A further 'charge swop' substitution of K228D in the heavy chain and D122k in the light chain was also made to try and improve correct heavy chain-light chain pairing. Even with various combinations of these substitutions the percentage of correct heavy chain-light chain pairing that could be achieved was still below 90%.

More recent work described in WO 16/118742 (Eli Lilly & Co), relates to bispecific antibodies that comprise substitutions in both CH3 domains based on computational and rational design, to improve heavy chain heterodimerization, at inter alia positions: 407 with 366, 409; 407, 399 with 366, 409; 360, 399, 407 with 345, 347, 366, 409; 349, 370 with 357, 364; and 349, 366, 370, 409 with 357, 364, 407. In addition, mutations were made to the VH and VL domains as described in Lewis et al., (2014) supra and WO 14/150973 as described in detail above. Only with these additional CH3 mutations could an improvement in heavy chain-light chain binding be achieved over that observed in WO 14/50973.

Whilst the concept of electrostatic engineering has also been used in the present invention, the inventors have applied specific criteria to the selection of positions for charge modification. Choosing positions at the rim of the interface of the heavy chain-light chain pairing, rather than at the centre of the interaction achieves a 'clip-effect' favouring correct heavy chain-light chain pairing by aligning the correct heavy-light chain formation via strong salt-bridges. Substituting charged residues (acidic or basic, where appropriate) at the end of the variable domains and at the beginning and end of the CH1 domain and CL region also reduces the destabilisation of the interface of the CH1 and CL. Such modifications have resulted in achieving a correct paring of heavy chain with its cognate light chain of up to 100% and only minimal destabilisation of the interacting domains.

Disulfide Bond Engineering

Previous work has described that an enhancement of cognate LC and HC pairing can be achieved by the replacement of a native interchain disulfide bond within one CH1-CL interface with an engineered interchain disulfide bond (US20140348839 (MedImmune)). In an embodiment of the present invention, the combination of charge engineering and disulfide bond engineering has been applied. The native interchain disulfide bond was replaced with a bond within the VH-VL interface using a design based on the Fv stabilizing VH44-VL100 disulfide bond widely described in the literature (Reiter et al., (1996) Nat. Biotech. 14: 1239-45; Weatherill et al., (2012) Protein Eng. Des. Sel. 25(7): 321-9). Such a modification is intended to covalently lock the desired specific HC/LC pairing and in addition facilitates the analytical procedure needed to profile the preparations of bispecific antibodies. Misassembled molecules can be easily identified and quantified using a simple electrophoresis based procedure which further adds to the stringency of the electrostatic engineering method described herein to achieve correctly paired bispecific antibodies. With the addition of disulfide bond engineering to heavy and light chain pairs already modified by electrostatic engineering but which had not shown 100% correct cognate pairing, misassembled molecules could be eliminated resulting in bispecific antibodies having a correct paring of heavy chain with their cognate light chain of up to 100%.

Nucleic Acids and Expression Systems

The present invention also encompasses nucleic acids encoding the heavy and/or light chain constant and/or variable domains described herein. Nucleic acid molecules of the invention include DNA and RNA in both single-stranded and double-stranded form, as well as the corresponding complementary sequences. The nucleic acid molecules of the invention include full-length genes or cDNA molecules as well as a combination of fragments thereof. The nucleic acids of the invention are derived from human sources but the invention includes those derived from non-human species.

An "isolated nucleic acid" is a nucleic acid that has been separated from adjacent genetic sequences present in the genome of the organism from which the nucleic acid was isolated, in the case of nucleic acids isolated from naturally-occurring sources. In the case of nucleic acids synthesized enzymatically from a template or chemically, such as PCR products, cDNA molecules, or oligonucleotides for example, it is understood that the nucleic acids resulting from such processes are isolated nucleic acids. An isolated nucleic acid molecule refers to a nucleic acid molecule in the form of a separate fragment or as a component of a larger nucleic acid construct. In one preferred embodiment, the nucleic acids are substantially free from contaminating endogenous material. The nucleic acid molecule has preferably been derived from DNA or RNA isolated at least once in substantially pure form and in a quantity or concentration enabling identification, manipulation, and recovery of its component nucleotide sequences by standard biochemical methods (such as those outlined in Sambrook et al., Molecular Cloning: A Laboratory Manual, 2nd ed., Cold Spring Harbor Laboratory, Cold Spring Harbor, NY (1989)). Such sequences are preferably provided and/or constructed in the form of an open reading frame uninterrupted by internal non-translated sequences, or introns, that are typically present in eukaryotic genes. Sequences of non-translated DNA can be present 5' or 3' from an open reading frame, where the same do not interfere with manipulation or expression of the coding region.

Variant sequences can be prepared by site specific mutagenesis of nucleotides in the DNA encoding the polypeptide, using cassette or PCR mutagenesis or other techniques well known in the art, to produce DNA encoding the variant, and thereafter expressing the recombinant DNA in cell culture as outlined herein.

The present invention also provides expression systems and constructs in the form of plasmids, expression vectors, transcription or expression cassettes which comprise at least one polynucleotide as above. In addition, the invention provides host cells comprising such expression systems or constructs.

In one embodiment, the present invention provides a method of preparing a heterodimeric antibody or fragment thereof comprising an engineered VH and CH1 domain and an engineered VL and CL domain wherein the VH and CH1 domains comprise a charged amino acid at positions 39, 147 and 165 (EU numbering) and the VL and CL domains comprise a charged amino acid at positions 38, 124 and 169/170 (EU numbering), the method comprising the steps of: (a) culturing a host cell comprising a nucleic acid encoding the engineered VH and CH1 domain polypeptides and a nucleic acid comprising the engineered VL and CL domain polypeptides, wherein the cultured host cell expresses the engineered polypeptides; and (b) recovering the heterodimeric antibody from the host cell culture.

Expression vectors of use in the invention may be constructed from a starting vector such as a commercially available vector. After the vector has been constructed and a nucleic acid molecule encoding light chain, a heavy chain, or a light chain and a heavy chain sequence has been inserted into the proper site of the vector, the completed vector may be inserted into a suitable host cell for amplification and/or polypeptide expression. The transformation of an expression vector into a selected host cell may be accomplished by well-known methods including transfection, infection, calcium phosphate co-precipitation, electroporation, microinjection, lipofection, DEAE-dextran mediated transfection, or other known techniques. The method selected will in part be a function of the type of host cell to be used. These methods and other suitable methods are well known to the skilled artisan, and are set forth, for example, in Sambrook et al., 2001, supra.

Typically, expression vectors used in the host cells will contain sequences for plasmid maintenance and for cloning and expression of exogenous nucleotide sequences. Such sequences, collectively referred to as 'flanking sequences', in certain embodiments will typically include one or more of the following nucleotide sequences: a promoter, one or more enhancer sequences, an origin of replication, a transcriptional termination sequence, a complete intron sequence containing a donor and acceptor splice site, a sequence encoding a leader sequence for polypeptide secretion, a ribosome binding site, a polyadenylation sequence, a polylinker region for inserting the nucleic acid encoding the polypeptide to be expressed, and a selectable marker element.

A host cell, when cultured under appropriate conditions, can be used to express bispecific antibody that can subsequently be collected from the culture medium (if the host cell secretes it into the medium) or directly from the host cell producing it (if it is not secreted). The selection of an appropriate host cell will depend upon various factors, such as desired expression levels, polypeptide modifications that are desirable or necessary for activity (such as glycosylation or phosphorylation) and ease of folding into a biologically active molecule. A host cell may be eukaryotic or prokaryotic.

Mammalian cell lines available as hosts for expression are well known in the art and include, but are not limited to, immortalized cell lines available from the American Type Culture Collection (ATCC) and any cell lines used in an expression system known in the art can be used to make the recombinant polypeptides of the invention. In general, host cells are transformed with a recombinant expression vector that comprises DNA encoding a desired bispecific antibody. Among the host cells that may be employed are prokaryotes, yeast or higher eukaryotic cells. Prokaryotes include gram negative or gram positive organisms, for example E. coli or bacilli. Higher eukaryotic cells include insect cells and established cell lines of mammalian origin. Examples of suitable mammalian host cell lines include the COS-7 cells, L cells, C127 cells, 3T3 cells, Chinese hamster ovary (CHO) cells, or their derivatives and related cell lines which grow in serum free media, HeLa cells, BHK cell lines, the CVIIEBNA cell line, human embryonic kidney cells such as 293, 293 EBNA or MSR 293, human epidermal A431 cells, human Colo205 cells, other transformed primate cell lines, normal diploid cells, cell strains derived from in vitro culture of primary tissue, primary explants, HL-60, U937, HaK or Jurkat cells. Optionally, mammalian cell lines such as HepG2/3B, KB, NIH 3T3 or S49, for example, can be used for expression of the polypeptide when it is desirable to use the polypeptide in various signal transduction or reporter assays. Alternatively, it is possible to produce the polypeptide in lower eukaryotes such as yeast or in prokaryotes such as bacteria. Suitable yeasts include S. cerevisiae, S. pombe, Kluyveromyces strains, Candida, or any yeast strain capable of expressing heterologous polypeptides. Suitable bacterial strains include E. coli, B. subtilis, S. typhimurium, or any bacterial strain capable of expressing heterologous polypeptides. If the bispecific antibody is made in yeast or bacteria, it may be desirable to modify the product produced therein, for example by phosphorylation or glycosylation of the appropriate sites, in order to obtain a functional product. Such covalent attachments can be accomplished using known chemical or enzymatic methods.

EXAMPLES

Example 1: Rational Design

Rational design strategies were used to produce a set of proteins to identify mutations that exhibit desired properties such as correct heavy chain-light chain pairing. The design strategy for engineering of heavy chain-light chain pairing included identifying a representative Fab. A criterion for a representative Fab was that it was a member of commonly used VH and VL subgroup such as VH3 and VK1, or lambda light chain. After the selection of a Fab (anti c-Kit heavy chain, SEQ ID NO: 7 and light chain, SEQ ID NO: 21), an in silico analysis of the Fab interface was carried out to identify residues important for possible interactions between heavy and light chains.

After introducing a set of mutations in the variable domains VH and VK and constant domains CH1 and CK a model was generated with the modeling software MOE (Chemical Computing Group Inc.) using AMBER99 forcefield. Blastp 2.2.30+ program was used to run the mutated domains against the PDB database. The pdb X-ray structure with the highest identity was chosen to model the best variant (pdb 3KDM).

1.1 Selection of Residue Positions

In order to ensure the correct pairing of light chain to its cognate heavy chain methods were investigated to control the heavy chain-light chain assembly. The preferred approach was to control the assembly by charge engineering of the VH-VL and CH1-CL domains. In this example, appropriate positions for charge engineering were selected by human-guided design and several criteria were applied. The chosen amino acids should not be in contact with CDRs and, if possible, they should be highly conserved within most common antibody families. Positions in the centre of the interfaces should be avoided; rather they should be at the rim of the interfaces to achieve a "clip-effect". One arm should have a set of charged residues and the other arm should have counter charges or a neutral charge at the corresponding 3D positions. The residues that met the criteria for engineering are listed below in Table 1 and some of these were explored to make heterodimeric antibodies. Homology modelling was applied to check the distances of chosen side chains after energy minimization. Models were generated with the modelling software MOE (Chemical Computing Group Inc.) using AMBER99 force-field. Only side chain distances less than 10 Å were considered for further experiments. For example, the distance of K147D to T129R was 10.1 Å and this pairing was not pursued further.

TABLE 1

| HC | | kappa LC | | lambda LC | |
|---|---|---|---|---|---|
| EU number | Residue | EU number | Residue | EU number | Residue |
| Q39 | R/K/D | Q38 | K/R/D | Q38 | K/R/D |
| K147 | K/D | Q124 | K/D | E124 | E/K/D |
| S165 | R/D | K169 | K/D | N170 | K/D |

Example 2: Expression and Purification of Engineered Fabs

Heavy chain and light chain DNA was synthesized at GeneArt (Regensburg, Germany) and cloned into a mammalian expression vector using restriction enzyme-ligation based cloning techniques. The resulting plasmids were co-transfected into HEK293T cells. For transient expression of Fabs, equal quantities of vector for each engineered chain were co-transfected into suspension-adapted HEK293T cells using Polyethylenimine (PEI; Cat #24765 Polysciences, Inc.). Typically, 100 ml of cells in suspension at a density of 1-2 Mio cells per ml was transfected with DNA containing 50 µg of expression vector encoding the engineered heavy chain and 50 µg expression vectors encoding the engineered light chain. The recombinant expression vectors were then introduced into the host cells and the construct produced by further culturing of the cells for a period of 7 days to allow for secretion into the culture medium (HEK, serum-fee medium) supplemented with 0.1% pluronic acid, 4 mM glutamine, and 0.25 μg/ml antibiotic. The produced construct was then purified from cell-free supernatant using immunoaffinity chromatography. Filtered conditioned media was mixed with 300 μl Protein A resin (CaptivA PriMab™, Repligen), equilibrated with PBS buffer pH 7.4. The resin was washed three times with 15 column volumes of PBS pH 7.4 before the Fab was eluted with 10 column volumes protein A elution buffer (50 mM citrate, 90 mM NaCl, pH 2.5).

For proof-of-concept studies a Fab of an anti c-Kit antibody generated in-house, was selected. Competition studies were performed wherein two engineered light chains had the option to bind two different engineered heavy chains. To facilitate the validation, two additional alanine residues were fused to the C-termini of certain light chains or heavy chains, whereas other light chains and heavy chains were kept as charge engineered entities only. These different charge engineered chains with or without the two alanine residues resulted in different masses as shown in Table 2.

TABLE 2

| SEQ ID NO | HC Fab* | Mass (MW-Da) | SEQ ID NO | LC Fab* | Mass (MW-Da) |
|---|---|---|---|---|---|
| 1 | Q39K/K147D/S165R | 24080.0 | 15 | Q38D/Q124K/K169D | 23379.1 |
| 2 | Q39K/K147D/S165R/CterAA | 24222.2 | 16 | Q38D/Q124K/K169D/CterAA | 23521.2 |
| 3 | Q39K/K147D/S165 | 24010.9 | 17 | Q38D/Q124K/K169 | 23392.1 |
| 4 | Q39K/K147/S165R | 24093.1 | 18 | Q38D/Q124/K169D | 23379.0 |
| 5 | Q39D/K147/S165D | 24038.9 | 19 | Q38K/Q124D/K169 | 23392.1 |
| 6 | Q39D/K147/S165D/CterAA | 24181.1 | 20 | Q38K/Q124D/K169/CterAA | 23534.3 |
| 7 | Q39/K147/S165 | 24023.9 | 21 | Q38/Q124/K169 | 23405.1 |
| 8 | Q39/K147/S165/CterAA | 24166.1 | 22 | Q38/Q124/K169/CterAA | 23547.3 |
| 9 | Q39/K147D/S165R | 24080.0 | 23 | Q38/Q124K/K169D | 23392.1 |
| 10 | Q39K/K147/S165 | 24024.0 | 24 | Q38/Q124K/K169 | 23405.2 |
| 11 | Q39/K147D/S165 | 24010.9 | 25 | Q38D/Q124/K169 | 23392.1 |
| 12 | Q39/K147/S165R | 24093.1 | 26 | Q38/Q124/K169D | 23392.1 |
| 13 | Q39D/K147/S165 | 24011.0 | 27 | Q38K/Q124/K169 | 23405.2 |
| 14 | Q39/K147/S165D | 24052.0 | 28 | Q38/Q124D/K169 | 23392.1 |

*Q39K for example, indicates a mutation from Gln to Lys at position 39. Q39 for example, indicates no mutation was made at position 39.

Example 3: Mass Spectrometry Analysis of Engineered Fabs

Evaluation of correct heavy chain-light chain pairing of Fab variants was done by liquid chromatography-mass spectrometry (LC-UV-ESI-MS). In brief, purified proteins were concentrated to 100 μL using spin concentrators (3000 MWCO, Millipore) and analysed by reversed phase chromatography (column BEH C4 1.7 μm 2.1*50 mm, Waters) on an UPLC (Acquity UPLC I-Class, Waters) with 100% water, 0.05% Trifluoro acetic acid (TFA) and 100% acetonitrile, 0.04% TFA. Fab variants were separated at 80° C. by applying a first gradient of 5%-10% of acetonitrile, 0.04% in 0.2 minutes, and a second gradient of 10% to 45% of acetonitrile, 0.04% in 4 minutes. Eluted Fab variants were detected by UV (210-450 nm) and ionized by electrospray ionization (ESI) before analysis of their mass by QTOF (Xevo G2-S QTof, Waters). Finally, the relative composition of the injected Fab mixture was determined by double integration of UV signal and mass intensity.

Results of the pairing of different HC-LC combinations are shown in Table 3. The right hand column shows the percentage of correct HC-LC pairing. A value of 100% indicates that there was no mispairing and 100% of light chain bound to its cognate heavy chain. A value of 95%, for example, indicates that 95% of light chain bound to its cognate heavy chain but there was 5% of mispairing where the light chain did not bind to its cognate heavy chain.

TABLE 3

| HC | LC | Correct pairing (%) |
|---|---|---|
| Q39K/K147D/S165R | Q38D/Q124K/K169D | 100 |
| Q39K/K147D | Q38D/Q124K | 95 |
| Q39K/S165R | Q38D/K169D | 75 |
| K147D/S165R | Q124K/K169D | 90 |
| Q39K | Q38D | 74 |
| K147D | Q124K | 91 |
| S165R | K169D | 68 |
| Q39D/K147/S165D | Q38K/Q124D/K169 | 100 |
| Q39D/S165D | Q38K/K169 | 95 |
| Q39D/K147 | Q38K/Q124D | 93 |
| K147/S165D | Q124D/K169 | 88 |
| Q39D | Q38K | 95 |

TABLE 3-continued

| HC | LC | Correct pairing (%) |
|---|---|---|
| S165D | K169 | 87 |
| K147 | Q124D | 91 |
| WT | WT | 63 |

Example 4: Translation to IgG with Two Kappa Light Chains (VH3-VK_VH3-VK)

Several preferred mutation-sets were introduced into the variable and constant regions of a number of IgG1s. In addition to an anti c-Kit antibody (SEQ ID Nos: 29 and 30), anti-HER3 (SEQ ID NOs: 31 and 32) and anti-IL-17 (SEQ ID NO: 33 and 34) antibodies were used to evaluate the HC-LC pairing in an IgG1 setting. All three antibodies are members of subgroups VH3/VK1. For correct assembly of heavy chains the 'knobs into holes' technology (Ridway et al., supra) was used with mutations introduced into the CH3 domain of the antibodies. Additional mutations were introduced into the variable, CH1 and CL domains of the antibodies according to Table 4 below.

TABLE 4

| Antibody | SEQ ID NO | HC mutation | SEQ ID NO | LC mutation |
|---|---|---|---|---|
| anti-HER3 | 31 | parental | 32 | parental |
| anti-IL-17 | 33 | parental | 34 | parental |
| anti-c-Kit | 29 | parental | 30 | parental |
| anti-HER3 (a) | 37 | Q39K/K147D/S165R | 38 | Q38D/Q124K/K169D |
| anti-HER3 (b) | 39 | Q39D/K147/S165D | 40 | Q38K/Q124D/K169 |
| anti-IL-17 | 41 | Q39K/K147D/S165R | 42 | Q38D/Q124K/K169D |
| anti-c-Kit | 43 | Q39D/K147/S165D | 44 | Q38K/Q124D/K169 |

Heterodimeric antibodies comprising the mutation sets were generated using standard transient HEK expression in the same cell and were evaluated for correct assembly and biochemical and biophysical properties. Furthermore, the engineered heterodimeric antibodies were evaluated for simultaneous binding of antigens. A comparison with parental, unmutated IgG1s is shown in Table 5. The percentage of Fab heterodimerization was determined by liquid chromatography-mass spectrometry (LC-UV-ESI-MS; as described in Example 3). A value of 72%, for example, as observed for the IL-17/HER3 heterodimeric antibody, indicates that 72% of IL-17 and HER3 light chains bound to their cognate heavy chains but there was 28% of mispairing where the IL-17 light chain bound to the HER3 heavy chain and the HER3 light chain bound to the IL-17 heavy chain. A value of 100% indicates that there was no mispairing and 100% of light chains bound to their cognate heavy chains, as was observed for mutated IL-17/mutated HER3, and mutated IL-17/mutated c-Kit and mutated c-Kit/mutated HER3 heterodimeric antibodies.

TABLE 5

| Antibody 1/ Antibody 2 | Heterodimerization of Fab (%) | BIAcore ® - KD (nM) | DSC-Tm (° C.) | Simultaneous binding of antigens |
|---|---|---|---|---|
| c-Kit/— | — | 20 | 76.5 | — |
| HER3/— | — | 1 | 75.5 | — |
| IL-17/— | — | 0.01 | 79 | — |
| IL-17/HER3 | 72 | — | — | — |
| IL-17/c-Kit | 73 | — | — | — |
| c-Kit/HER3 | 45 | — | — | — |
| Mutated IL-17/ Mutated HER3 (b) | 100 | 0.01/4 | 74.5/72.5 | yes |
| Mutated IL-17/ Mutated c-Kit | 100 | 0.07/20 | 74.5/72 | yes |
| Mutated c-Kit/ Mutated HER3 (a) | 100 | 22/0.4 | 72/72.5 | yes |

Example 5: Translation to IgGs with One Kappa and One Lambda Light Chain (VH3-VK_VH3-VL)

To evaluate the effect of introducing charges into the Fab part of an antibody, antibodies with kappa light chains were mixed with antibodies containing lambda light chains. Preferred mutation-sets were introduced into IgG1s. In addition to an anti-c-Kit antibody (SEQ ID NOs: 29 and 30), anti-HER3 (SEQ ID NOs: 31 and 32), anti-IL-17 (SEQ ID NOs: 33 and 34), an anti-IL-18 (SEQ ID NOs: 35 and 36) antibodies were used to evaluate the heavy chain-light chain pairing in an IgG1 setting. c-Kit, HER3, and IL-17 antibodies are members of the subgroups VH3-VK1, whereas the IL-18 antibody contains a light chain which is a member of subgroup VL1. To ensure correct assembly of heavy chains the "knobs into holes" technology (supra) was used with mutations introduced into the CH3 domain of the antibodies. Additional mutations were introduced into the variable, CH1 and CL domains of the antibodies according to Table 6 below.

TABLE 6

| Antibody | SEQ ID NO | HC mutation | SEQ ID NO | LC mutation |
|---|---|---|---|---|
| anti-HER3 | 31 | parental | 32 | parental |
| anti-IL-17 | 33 | parental | 34 | parental |
| anti-c-Kit | 29 | parental | 30 | parental |
| anti-IL-18 | 35 | parental | 36 | parental |
| anti-HER3 | 37 | Q39K/K147D/S165R | 38 | Q38D/Q124K/K169D |
| anti-IL-17 | 41 | Q39K/K147D/S165R | 42 | Q38D/Q124K/K169D |
| anti-c-Kit | 45 | Q39K/K147D/S165R | 46 | Q38D/Q124K/K169D |
| anti-IL-18 | 47 | Q39D/K147/S165D | 48 | Q38K/E124D/N170K |

Heterodimeric antibodies comprising the mutation sets were generated and evaluated for correct assembly. A comparison with parental, unmutated IgG1s is shown in Table 7. The right hand column shows the percentage of Fab heterodimerization as determined using liquid chromatography-mass spectrometry (LC-UV-ESI-MS; as described in Example 3). A value of 71% as observed for the IL-17/IL-18 heterodimeric antibody indicates that 71% of IL-17 and IL-18 light chains bound to their cognate heavy chains but there was 29% of mispairing where the IL-17 light chain bound to the IL-18 heavy chain and the IL-18 light chain bound to the IL-17 heavy chain. A value of 100% indicates that there was no mispairing and 100% of light chains bound to their cognate heavy chains, as was observed for mutated IL-17/mutated IL-18 and mutated c-Kit/mutated IL-18 heterodimeric antibodies.

TABLE 7

| Antibody 1/Antibody 2 | Heterodimerization (%) of Fab |
|---|---|
| IL-17/IL-18 | 71 |
| HER3/IL-18 | 20 |
| c-Kit/IL-18 | 82 |
| Mutated IL-17/Mutated IL-18 | 100 |
| Mutated HER3/Mutated IL-18 | 95 |
| Mutated c-Kit/Mutated IL-18 | 100 |

Example 6: Surface Plasmon Resonance (SPR) Binding Analysis

A direct binding assay was performed to characterize the binding of the engineered antibodies against their antigen. Kinetic binding affinity constants (KD) were measured on protein-A captured protein using recombinant human antigens as analyte. Measurements were conducted on a BIAcore® T200 (GE Healthcare, Glattbrugg, Switzerland) at room temperature. For affinity measurements, the proteins were diluted in 10 mM NaP, 150 mM NaCl, 0.05% Tween 20, pH5.8 and immobilized on the flow cells of a CM5 research grade sensor chip (GE Healthcare, ref BR-1000-14) using standard amine coupling procedure according to the manufacturer's recommendation (GE Healthcare). To serve as reference, one flow cell was blank immobilized. Binding data were acquired by subsequent injection of analyte dilutions series on the reference and measuring flow cell. Zero concentration samples (running buffer only) were included to allow double referencing during data evaluation. For data evaluation, doubled referenced sensograms were used and analyzed by steady state analysis to generate the equilibrium dissociation constant (KD). The results are summarized in Table 5 (column BIAcore®-KD (nM).

Example 7: Differential Scanning Calorimetry (DSC)

The thermal stability of engineered heterodimeric antibodies and their parental antibodies were compared using calorimetric measurements as shown in Table 5 (column DSC-Tm (° C.)). calorimetric measurements were carried out on a differential scanning micro calorimeter (Nano DSC, TA instruments). The cell volume was 0.5 ml and the heating rate was 1° C./min. All proteins were used at a concentration of 1 mg/ml in PBS (pH 7.4). The molar heat capacity of each protein was estimated by comparison with duplicate samples containing identical buffer from which the protein had been omitted. The partial molar heat capacities and melting curves were analysed using standard procedure. Thermograms were baseline corrected and concentration normalized.

Example 8: Translation of Charge Engineering into IgGs with Different Frameworks To evaluate the effect of introducing charges into the Fab of antibodies with different frameworks, antibodies with light chain frameworks VK1, VK3, VL1, VL2, VL3 and heavy chain frame works VH1, VH2, VH3, VH5 and VH6 were mixed with an antibody containing kappa light chain VK1 and heavy chain VH3. The sequences of framework regions of human origin may be obtained from The Immunoglobulin Factsbook, by Marie-Paule Lefranc, Gerard Lefranc, Academic Press 2001, ISBN 012441351. Preferred mutation-sets were introduced into IgG1s and compared to their corresponding non-engineered parental antibodies. Antibodies to HER2 and five other antigens A-E, were combined with an anti-IL-17 antibody and used to evaluate the heavy chain-light chain mispairing in an IgG1 setting. To ensure correct assembly of heavy chains the "knobs into holes" technology (supra) was used.

Bispecific antibodies were generated having a first binding arm that targeted the antigen HER2 or a number of other antigens listed here as antigens A-E, and a second binding arm that targeted IL-17. Engineered antibodies to HER2 comprised the substitutions Q39D and S165D in the VH and CH1 domains and Q38K and Q124D in the kappa VL and CL domains or Q38K and N170R in the lambda VL and CL domains. Engineered antibodies to antigen A comprised the substitutions Q39D and S165D in the VH and CH1 domains and Q38K or Q38K and N170R in the lambda VL and CL domains. Engineered antibodies to antigens B, D and E comprised the substitutions Q39D and S165D in the VH and CH1 domains and Q38K and N170R in the lambda VL and CL domains. Engineered antibodies to antigen C comprised the substitutions Q39D and S165D in the VH and CH1 domains and Q38K in the lambda VL domain. Engineered antibodies to IL-17 comprised the substitutions Q39K, K147D and S165R in the VH and CH1 domains and Q38D, Q124K and K169D in the kappa VL and CL domains. A comparison of heavy chain-light chain pairing of the engineered bispecific antibodies with parental bispecific antibodies is shown in Table 8 below. For most of the engineered bispecific antibodies generated, mispairing, measured as a percentage of Fab heterodimerization by liquid chromatography-mass spectrometry was fully eliminated. Mispairing was only observed for 3 engineered bispecific antibodies up to a maximum of 5%, compared to the respective parental bispecific antibodies. This example clearly shows that the incidence of heavy-light chain mispairing for bispecific heterodimeric antibodies can be almost eliminated by using the specific electrostatic engineering mutations as disclosed herein and is not limited to bispecific heterodimeric antibodies comprising specific framework regions.

Example 9: Translation of Charge Engineering Plus Disulfide Bond Engineering into IgGs with Different Frameworks The effect of replacing the native LC-HC interchain disulfide bond with an engineered VH-VL disulfide bond in one Fab of a bispecific antibody in addition to introducing charges into the Fabs of the bispecific antibody, was evaluated. Antibodies with light chain frameworks VL2 or VL3 and heavy chain frameworks VH1, VH2, and VH5 were mixed with an antibody containing kappa light chain VK1 and heavy chain VH3. The sequences of framework regions of human origin may be obtained from The Immunoglobulin Factsbook (supra). Preferred electrostatic mutation-sets were introduced into IgG1s with the addition of an engineered VH-VL disulfide bond into one Fab. These engineered antibodies with charged residues and a non-native disulfide bond in one Fab were compared to the corresponding parental antibodies engineered with a non-native disulfide bond in one arm only. Antibodies to four antigens (antigens F, G, H and I) were combined with an anti-IL-17 antibody and used to evaluate the heavy chain-light chain mispairing in an IgG1 setting. To ensure correct assembly of heavy chains the "knobs into holes" technology (supra) was used.

Bispecific antibodies were generated having a first binding arm that targeted the antigens listed here as antigens F to I, and a second binding arm that targeted IL-17. Engineered antibodies to antigens F to I comprised the substitutions Q39D and S165D in the VH and CH1 domains and Q38K and N170R in the lambda VL and CL domains. Engineered antibodies to IL-17 (SEQ ID NOs: 73 and 74) comprised the substitutions Q39K, G44C, K147D, S165R and C220A in the VH and CH1 domains and Q38D, Q100C, Q124K, K169D and C214A in the kappa VL and CL domains. For comparison, the anti-IL-17 antibody with only disulfide bond engineering comprised substitutions G44C and C220A in VH-CH1 domains and Q100C, C124A in the LC, respectively (SEQ ID NOs: 75 and 76). The outcome of the comparison is shown in FIG. 1 with details of the well content and engineered positions given in Table 9 below.

The analytical procedure for detecting and quantifying correctly paired vs mispaired bispecific antibodies was greatly simplified using this method as only the correctly assembled bispecific antibodies could migrate as full length antibody (150 kDa) on a SDS-PAGE or any similar electrophoresis based system. In the case of mispairing, where the light chains and heavy chains were not covalently linked, incomplete molecules and free light chain appeared on the gel. Mispairing was observed for bispecific antibodies generated without charge engineering, where free, unpaired light chain (25 kDa bands) and incomplete molecules (125 kDa bands) were detected on the gel (FIG. 1; wells 7 to 10).

In contrary, bispecific antibodies combining disulfide bond and charge engineering showed only traces of these bands (FIG. 1; wells 2 to 5). This example clearly shows that the incidence of heavy-light chain mispairing for bispecific heterodimeric antibodies can be eliminated by using specific electrostatic engineering mutations as disclosed herein in combination with LC-HC interchain disulfide bond engineering in one Fab of the bispecific antibody. Disulfide bond engineering by itself appeared to be not sufficient to drive correct LC-HC pairing. In addition, the analytical procedure is simplified since heavy-light chain mispairing can be measured by electrophoresis, which enables high-through screening of bispecific candidates with the correct assembly of their cognate heavy and light chains.

TABLE 8

| | Knob arm | | | | Hole arm | | | |
|---|---|---|---|---|---|---|---|---|
| SEQ ID | HC 1* | SEQ ID | LC 1* | Target | HC 2 | LC 2 | Target | Mispairing (%) |
| 54 | VH3-23*01 | 49 | Vk1-39*01 | HER-2 | VH3_7*01 | Vk1_13*02 | IL-17 | 42 |
| 54 | VH3-23*01 | 50 | Vλ3-9*01 | | SEQ ID: 33 | SEQ ID: 34 | | 33 |
| 55 | VH3-30*01 | 51 | Vk3-15*01 | | | | | 11 |
| 56 | VH3-15*01 | 52 | Vλ1-47*01 | | | | | 17 |
| 57 | VH1-46*01 | 49 | Vk1-39*01 | | | | | 44 |
| 58 | VH5-51*01 | 53 | Vk1-33*01 | | | | | 74 |
| 59 | VH6-1*01 | 52 | Vλ1-47*01 | | | | | 39 |
| | VH1-2*02 | | Vλ1-1-40*01 | antigen A | | | | 30 |
| | VH2-70D*14 | | Vλ1-1-40*01 | antigen B | | | | 59 |
| | VH3-23D*01 | | Vλ2-14*01 | antigen C | | | | 18 |
| | VH3-23D*01 | | Vλ3-1*01 | antigen A | | | | 28 |
| | VH3-15*05 | | Vλ1-1-40*01 | antigen A | | | | 5 |
| | VH5-51*03 | | Vλ3-1*01 | antigen D | | | | 69 |
| | VH6-1*02 | | Vλ1-1-40*01 | antigen E | | | | 79 |
| | VH6-1*02 | | Vλ2-14*01 | antigen E | | | | 60 |
| | Engineered* HC1 | | Engineered* LC1 | | Engineered HC2 | Engineered LC2 | | |
| 67 | VH3-23*01 Q39D/S165D | 62 | Vk1-39*01 Q38K/Q124D | HER2 | VH3_7*01 SEQ ID 61 Q39K/K147D/ S165R | Vk1_13*02 SEQ ID 60 Q38D/Q124K/ K169D | IL-17 | 0 |
| 67 | VH3-23*01 Q39D/S165D | 63 | Vλ3-9*01 Q38K/N170R | | | | | 0 |
| 68 | VH3-30*01 Q39D/S165D | 64 | Vk3-15*01 Q38K/Q124D | | | | | 0 |
| 69 | VH3-15*01 Q39D/S165D | 65 | Vλ1-47*01 Q38K/N170R | | | | | 0 |
| 70 | VH1-46*01 Q39D/S165D | 62 | Vk1-39*01 Q38K/Q124D | | | | | 0 |
| 71 | VH5-51*01 Q39D/S165D | 66 | Vk1-33*01 Q38K/Q124D | | | | | 0 |
| 72 | VH6-1*01 Q39D/S165D | | Vλ1-47*01 Q38K/N170R | | | | | 0 |
| | VH1-2*02 Q39D/S165D | | Vλ1-1-40*01 Q38K/N170R | antigen A | | | | 0 |
| | VH2-70D*14 Q39D/S165D | | Vλ1-1-40*01 Q38K/N170R | antigen B | | | | 0 |
| | VH3-23D*01 Q39D/S165D | | Vλ2-14*01 Q38K/N170R | antigen C | | | | 0 |

TABLE 8-continued

| | | | |
|---|---|---|---|
| VH3-23D*01 Q39D/S165D | Vλ3-1*01 Q38K/N170R | antigen A | 4 |
| VH3-15*05 Q39D/S165D | Vλ1-1-40*01 Q38K/N170R | antigen A | 0 |
| VH5-51*03 Q39D/S165D | Vλ3-1*01 Q38K/N170R | antigen D | 5 |
| VH6-1*02 Q39D/S165D | Vλ1-1-40*01 Q38K/N170R | antigen E | 3 |
| VH6-1*02 Q39D/S165D | Vλ2-14*01 Q38K/N170R | antigen E | 0 |

*The sequences of framework regions of human origin may be obtained from The Immunoglobulin Factsbook, by Marie-Paule Lefranc, Gerard Lefranc, Academic Press 2001, ISBN 012441351

TABLE 9

| | Knob arm | | | Hole arm | | |
|---|---|---|---|---|---|---|
| Wells | HC 1 | LC 1 | Target | HC2 | LC2 | Target |
| 2 | VH1-2*02 Q39D/S165D | Vλ3-1*01 Q38K/N170R | antigen F | VH3_7*01 SEQ ID 73 | Vk1_13*02 SEQ ID 74 | IL-17 |
| 3 | VH2-70D*14 Q39D/S165D | Vλ2-14*01 Q38K/N170R | antigen G | Q39K/G44C/K147D/ S165R/C220A | Q38D/Q100C/Q124K/ K169D/C214A | |
| 4 | VH5-51*03 Q39D/S165D | Vλ2-14*01 Q38K/N170R | antigen H | | | |
| 5 | VH5-51*03 Q39D/S165D | Vλ3-1*01 Q38K/N170R | antigen I | | | |
| 7 | VH1-2*02 | Vλ3-1*01 | antigen F | VH3_7*01 | Vk1_13*02 | |
| 8 | VH2-70D*14 | Vλ2-14*01 | antigen G | SEQ ID 75 | SEQ ID 76 | |
| 9 | VH5-51*03 | Vλ2-14*01 | antigen H | G44C/C220A | Q100C/C214A | |
| 10 | VH5-51*03 | Vλ3-1*01 | antigen I | | | |
| 1, 6, 11 | | | Molecular weight marker | | | |

TABLE 10

Sequence Table

| SEQ ID NO | Description | Sequence |
|---|---|---|
| 1 | ANTI-C-KIT HC Q39K/K147D/S165R | EVQLVESGGGLVQPGGSLRLSCAASGFAFSGYYMAWVRKAPGK GLEWVANINYPGSSTYYLDSVKGRFTISRDNAKNSLYLQMNSLRA EDTAVYYCARGDYYGTTYWYFDVWGQGTTVTVSSASTKGPSVF PLAPSSKSTSGGTAALGCLVDDYFPEPVTVSWNSGALTRGVHTF PAVLQSSGLYSLSSVVTVPSSSLGTQTYICNVNHKPSNTKVDKRV EPKSC |
| 2 | ANTI-C-KIT HC Q39K/K147D/S165R/ C-TER AA | EVQLVESGGGLVQPGGSLRLSCAASGFAFSGYYMAWVRKAPGK GLEWVANINYPGSSTYYLDSVKGRFTISRDNAKNSLYLQMNSLRA EDTAVYYCARGDYYGTTYWYFDVWGQGTTVTVSSASTKGPSVF PLAPSSKSTSGGTAALGCLVDDYFPEPVTVSWNSGALTRGVHTF PAVLQSSGLYSLSSVVTVPSSSLGTQTYICNVNHKPSNTKVDKRV EPKSCAA |
| 3 | ANTI-C-KIT HC Q39K/K147D/S165 | EVQLVESGGGLVQPGGSLRLSCAASGFAFSGYYMAWVRKAPGK GLEWVANINYPGSSTYYLDSVKGRFTISRDNAKNSLYLQMNSLRA EDTAVYYCARGDYYGTTYWYFDVWGQGTTVTVSSASTKGPSVF PLAPSSKSTSGGTAALGCLVDDYFPEPVTVSWNSGALTSGVHTF PAVLQSSGLYSLSSVVTVPSSSLGTQTYICNVNHKPSNTKVDKRV EPKSC |
| 4 | ANTI-C-KIT HC Q39K/K147/S165R | EVQLVESGGGLVQPGGSLRLSCAASGFAFSGYYMAWVRKAPGK GLEWVANINYPGSSTYYLDSVKGRFTISRDNAKNSLYLQMNSLRA EDTAVYYCARGDYYGTTYWYFDVWGQGTTVTVSSASTKGPSVF PLAPSSKSTSGGTAALGCLVKDYFPEPVTVSWNSGALTRGVHTF PAVLQSSGLYSLSSVVTVPSSSLGTQTYICNVNHKPSNTKVDKRV EPKSC |
| 5 | ANTI-C-KIT HC Q39D/K147/S165D | EVQLVESGGGLVQPGGSLRLSCAASGFAFSGYYMAWVRDAPGK GLEWVANINYPGSSTYYLDSVKGRFTISRDNAKNSLYLQMNSLRA EDTAVYYCARGDYYGTTYWYFDVWGQGTTVTVSSASTKGPSVF PLAPSSKSTSGGTAALGCLVKDYFPEPVTVSWNSGALTDGVHTF PAVLQSSGLYSLSSVVTVPSSSLGTQTYICNVNHKPSNTKVDKRV EPKSC |

TABLE 10-continued

Sequence Table

| SEQ ID NO | Description | Sequence |
|---|---|---|
| 6 | ANTI-C-KIT HC Q39D/K147/S165D/ CTERAA | EVQLVESGGGLVQPGGSLRLSCAASGFAFSGYYMAWVRDAPGK GLEWVANINYPGSSTYYLDSVKGRFTISRDNAKNSLYLQMNSLRA EDTAVYYCARGDYYGTTYWYFDVWGQGTTVTVSSASTKGPSVF PLAPSSKSTSGGTAALGCLVKDYFPEPVTVSWNSGALTDGVHTF PAVLQSSGLYSLSSVVTVPSSSLGTQTYICNVNHKPSNTKVDKRV EPKSCAA |
| 7 | ANTI-C-KIT HC Q39/K147/S165 | EVQLVESGGGLVQPGGSLRLSCAASGFAFSGYYMAWVRQAPGK GLEWVANINYPGSSTYYLDSVKGRFTISRDNAKNSLYLQMNSLRA EDTAVYYCARGDYYGTTYWYFDVWGQGTTVTVSSASTKGPSVF PLAPSSKSTSGGTAALGCLVKDYFPEPVTVSWNSGALTSGVHTF PAVLQSSGLYSLSSVVTVPSSSLGTQTYICNVNHKPSNTKVDKRV EPKSC |
| 8 | ANTI-C-KIT HC Q39/K147/S165/ CTERAA | EVQLVESGGGLVQPGGSLRLSCAASGFAFSGYYMAWVRQAPGK GLEWVANINYPGSSTYYLDSVKGRFTISRDNAKNSLYLQMNSLRA EDTAVYYCARGDYYGTTYWYFDVWGQGTTVTVSSASTKGPSVF PLAPSSKSTSGGTAALGCLVKDYFPEPVTVSWNSGALTSGVHTF PAVLQSSGLYSLSSVVTVPSSSLGTQTYICNVNHKPSNTKVDKRV EPKSCAA |
| 9 | ANTI-C-KIT HC Q39/K147D/S165R | EVQLVESGGGLVQPGGSLRLSCAASGFAFSGYYMAWVRQAPGK GLEWVANINYPGSSTYYLDSVKGRFTISRDNAKNSLYLQMNSLRA EDTAVYYCARGDYYGTTYWYFDVWGQGTTVTVSSASTKGPSVF PLAPSSKSTSGGTAALGCLVDDYFPEPVTVSWNSGALTRGVHTF PAVLQSSGLYSLSSVVTVPSSSLGTQTYICNVNHKPSNTKVDKRV EPKSC |
| 10 | ANTI-C-KIT HC Q39K/K147/S165 | EVQLVESGGGLVQPGGSLRLSCAASGFAFSGYYMAWVRKAPGK GLEWVANINYPGSSTYYLDSVKGRFTISRDNAKNSLYLQMNSLRA EDTAVYYCARGDYYGTTYWYFDVWGQGTTVTVSSASTKGPSVF PLAPSSKSTSGGTAALGCLVKDYFPEPVTVSWNSGALTSGVHTF PAVLQSSGLYSLSSVVTVPSSSLGTQTYICNVNHKPSNTKVDKRV EPKSC |
| 11 | ANTI-C-KIT HC Q39/K147D/S165 | EVQLVESGGGLVQPGGSLRLSCAASGFAFSGYYMAWVRQAPGK GLEWVANINYPGSSTYYLDSVKGRFTISRDNAKNSLYLQMNSLRA EDTAVYYCARGDYYGTTYWYFDVWGQGTTVTVSSASTKGPSVF PLAPSSKSTSGGTAALGCLVDDYFPEPVTVSWNSGALTSGVHTF PAVLQSSGLYSLSSVVTVPSSSLGTQTYICNVNHKPSNTKVDKRV EPKSC |
| 12 | ANTI-C-KIT HC Q39/K147/S165R | EVQLVESGGGLVQPGGSLRLSCAASGFAFSGYYMAWVRQAPGK GLEWVANINYPGSSTYYLDSVKGRFTISRDNAKNSLYLQMNSLRA EDTAVYYCARGDYYGTTYWYFDVWGQGTTVTVSSASTKGPSVF PLAPSSKSTSGGTAALGCLVKDYFPEPVTVSWNSGALTRGVHTF PAVLQSSGLYSLSSVVTVPSSSLGTQTYICNVNHKPSNTKVDKRV EPKSC |
| 13 | ANTI-C-KIT HC Q39D/K147/S165 | EVQLVESGGGLVQPGGSLRLSCAASGFAFSGYYMAWVRDAPGK GLEWVANINYPGSSTYYLDSVKGRFTISRDNAKNSLYLQMNSLRA EDTAVYYCARGDYYGTTYWYFDVWGQGTTVTVSSASTKGPSVF PLAPSSKSTSGGTAALGCLVKDYFPEPVTVSWNSGALTSGVHTF PAVLQSSGLYSLSSVVTVPSSSLGTQTYICNVNHKPSNTKVDKRV EPKSC |
| 14 | ANTI-C-KIT HC Q39/K147/S165D | EVQLVESGGGLVQPGGSLRLSCAASGFAFSGYYMAWVRQAPGK GLEWVANINYPGSSTYYLDSVKGRFTISRDNAKNSLYLQMNSLRA EDTAVYYCARGDYYGTTYWYFDVWGQGTTVTVSSASTKGPSVF PLAPSSKSTSGGTAALGCLVKDYFPEPVTVSWNSGALTDGVHTF PAVLQSSGLYSLSSVVTVPSSSLGTQTYICNVNHKPSNTKVDKRV EPKSC |
| 15 | ANTI-C-KIT LC Q38D/Q124K/K169D | DIQMTQSPSSLSASVGDRVTITCRASQSISSYLNWYQDKPGKAPK LLIYYTSRLQSGVPSRFSGSGSGTDFTLTISSLQPEDFATYYCQQG RRLWSFGGGTKVEIKRTVAAPSVFIFPPSDEKLKSGTASVVCLLN NFYPREAKVQWKVDNALQSGNSQESVTEQDSDDSTYSLSSTLTL SKADYEKHKVYACEVTHQGLSSPVTKSFNRGEC |
| 16 | ANTI-C-KIT LC Q38D/Q124K/K169D/ CTERAA | DIQMTQSPSSLSASVGDRVTITCRASQSISSYLNWYQDKPGKAPK LLIYYTSRLQSGVPSRFSGSGSGTDFTLTISSLQPEDFATYYCQQG RRLWSFGGGTKVEIKRTVAAPSVFIFPPSDEKLKSGTASVVCLLN NFYPREAKVQWKVDNALQSGNSQESVTEQDSDDSTYSLSSTLTL SKADYEKHKVYACEVTHQGLSSPVTKSFNRGECAA |

TABLE 10-continued

Sequence Table

| SEQ ID NO | Description | Sequence |
|---|---|---|
| 17 | ANTI-C-KIT LC Q38D/Q124K/K169 | DIQMTQSPSSLSASVGDRVTITCRASQSISSYLNWYQDKPGKAPK LLIYYTSRLQSGVPSRFSGSGSGTDFTLTISSLQPEDFATYYCQQG RRLWSFGGGTKVEIKRTVAAPSVFIFPPSDEKLKSGTASVVCLLN NFYPREAKVQWKVDNALQSGNSQESVTEQDSKDSTYSLSSTLTL SKADYEKHKVYACEVTHQGLSSPVTKSFNRGEC |
| 18 | ANTI-C-KIT LC Q38D/Q124/K169D | DIQMTQSPSSLSASVGDRVTITCRASQSISSYLNWYQDKPGKAPK LLIYYTSRLQSGVPSRFSGSGSGTDFTLTISSLQPEDFATYYCQQG RRLWSFGGGTKVEIKRTVAAPSVFIFPPSDEQLKSGTASVVCLLN NFYPREAKVQWKVDNALQSGNSQESVTEQDSDDSTYSLSSTLTL SKADYEKHKVYACEVTHQGLSSPVTKSFNRGEC |
| 19 | ANTI-C-KIT LC Q38K/Q124D/K169 | DIQMTQSPSSLSASVGDRVTITCRASQSISSYLNWYQKKPGKAPK LLIYYTSRLQSGVPSRFSGSGSGTDFTLTISSLQPEDFATYYCQQG RRLWSFGGGTKVEIKRTVAAPSVFIFPPSDEDLKSGTASVVCLLN NFYPREAKVQWKVDNALQSGNSQESVTEQDSKDSTYSLSSTLTL SKADYEKHKVYACEVTHQGLSSPVTKSFNRGEC |
| 20 | ANTI-C-KIT LC Q38K/Q124D/K169/ CTERAA | DIQMTQSPSSLSASVGDRVTITCRASQSISSYLNWYQKKPGKAPK LLIYYTSRLQSGVPSRFSGSGSGTDFTLTISSLQPEDFATYYCQQG RRLWSFGGGTKVEIKRTVAAPSVFIFPPSDEDLKSGTASVVCLLN NFYPREAKVQWKVDNALQSGNSQESVTEQDSKDSTYSLSSTLTL SKADYEKHKVYACEVTHQGLSSPVTKSFNRGECAA |
| 21 | ANTI-C-KIT LC Q38/Q124/K169 | DIQMTQSPSSLSASVGDRVTITCRASQSISSYLNWYQQKPGKAPK LLIYYTSRLQSGVPSRFSGSGSGTDFTLTISSLQPEDFATYYCQQG RRLWSFGGGTKVEIKRTVAAPSVFIFPPSDEQLKSGTASVVCLLN NFYPREAKVQWKVDNALQSGNSQESVTEQDSKDSTYSLSSTLTL SKADYEKHKVYACEVTHQGLSSPVTKSFNRGEC |
| 22 | ANTI-C-KIT LC Q38/Q124/K169/ CTERAA | DIQMTQSPSSLSASVGDRVTITCRASQSISSYLNWYQQKPGKAPK LLIYYTSRLQSGVPSRFSGSGSGTDFTLTISSLQPEDFATYYCQQG RRLWSFGGGTKVEIKRTVAAPSVFIFPPSDEQLKSGTASVVCLLN NFYPREAKVQWKVDNALQSGNSQESVTEQDSKDSTYSLSSTLTL SKADYEKHKVYACEVTHQGLSSPVTKSFNRGECAA |
| 23 | ANTI-C-KIT LC Q38/Q124K/K169D | DIQMTQSPSSLSASVGDRVTITCRASQSISSYLNWYQQKPGKAPK LLIYYTSRLQSGVPSRFSGSGSGTDFTLTISSLQPEDFATYYCQQG RRLWSFGGGTKVEIKRTVAAPSVFIFPPSDEKLKSGTASVVCLLN NFYPREAKVQWKVDNALQSGNSQESVTEQDSDDSTYSLSSTLTL SKADYEKHKVYACEVTHQGLSSPVTKSFNRGEC |
| 24 | ANTI-C-KIT LC Q38/Q124K/K169 | DIQMTQSPSSLSASVGDRVTITCRASQSISSYLNWYQQKPGKAPK LLIYYTSRLQSGVPSRFSGSGSGTDFTLTISSLQPEDFATYYCQQG RRLWSFGGGTKVEIKRTVAAPSVFIFPPSDEKLKSGTASVVCLLN NFYPREAKVQWKVDNALQSGNSQESVTEQDSKDSTYSLSSTLTL SKADYEKHKVYACEVTHQGLSSPVTKSFNRGEC |
| 25 | ANTI-C-KIT LC Q38D/Q124/K169 | DIQMTQSPSSLSASVGDRVTITCRASQSISSYLNWYQDKPGKAPK LLIYYTSRLQSGVPSRFSGSGSGTDFTLTISSLQPEDFATYYCQQG RRLWSFGGGTKVEIKRTVAAPSVFIFPPSDEQLKSGTASVVCLLN NFYPREAKVQWKVDNALQSGNSQESVTEQDSKDSTYSLSSTLTL SKADYEKHKVYACEVTHQGLSSPVTKSFNRGEC |
| 26 | ANTI-C-KIT LC Q38/Q124/K169D | DIQMTQSPSSLSASVGDRVTITCRASQSISSYLNWYQQKPGKAPK LLIYYTSRLQSGVPSRFSGSGSGTDFTLTISSLQPEDFATYYCQQG RRLWSFGGGTKVEIKRTVAAPSVFIFPPSDEQLKSGTASVVCLLN NFYPREAKVQWKVDNALQSGNSQESVTEQDSDDSTYSLSSTLTL SKADYEKHKVYACEVTHQGLSSPVTKSFNRGEC |
| 27 | ANTI-C-KIT LC Q38K/Q124/K169 | DIQMTQSPSSLSASVGDRVTITCRASQSISSYLNWYQKKPGKAPK LLIYYTSRLQSGVPSRFSGSGSGTDFTLTISSLQPEDFATYYCQQG RRLWSFGGGTKVEIKRTVAAPSVFIFPPSDEQLKSGTASVVCLLN NFYPREAKVQWKVDNALQSGNSQESVTEQDSKDSTYSLSSTLTL SKADYEKHKVYACEVTHQGLSSPVTKSFNRGEC |
| 28 | ANTI-C-KIT LC Q38/Q124D/K169 | DIQMTQSPSSLSASVGDRVTITCRASQSISSYLNWYQQKPGKAPK LLIYYTSRLQSGVPSRFSGSGSGTDFTLTISSLQPEDFATYYCQQG RRLWSFGGGTKVEIKRTVAAPSVFIFPPSDEDLKSGTASVVCLLN NFYPREAKVQWKVDNALQSGNSQESVTEQDSKDSTYSLSSTLTL SKADYEKHKVYACEVTHQGLSSPVTKSFNRGEC |
| 29 | ANTI-C-Kit HC PARENTAL | EVQLVESGGGLVQPGGSLRLSCAASGFAFSGYYMAWVRQAPGK GLEWVANINYPGSSTYYLDSVKGRFTISRDNAKNSLYLQMNSLRA |

TABLE 10-continued

Sequence Table

| SEQ ID NO | Description | Sequence |
|---|---|---|
| | | EDTAVYYCARGDYYGTTYWYFDVWGQGTTVTVSSASTKGPSVF PLAPSSKSTSGGTAALGCLVKDYFPEPVTVSWNSGALTSGVHTF PAVLQSSGLYSLSSVVTVPSSSLGTQTYICNVNHKPSNTKVDKRV EPKSCDKTHTCPPCPAPELLGGPSVFLFPPKPKDTLMISRTPEVT CVVVDVSHEDPEVKFNWYVDGVEVHNAKTKPREEQYNSTYRVV SVLTVLHQDWLNGKEYKCKVSNKALPAPIEKTISKAKGQPREPQV YTLPPSREEMTKNQVSLTCLVKGFYPSDIAVEWESNGQPENNYK TTPPVLDSDGSFFLYSKLTVDKSRWQQGNVFSCSVMHEALHNHY TQKSLSLSPGK |
| 30 | ANTI-C-Kit LC PARENTAL | DIQMTQSPSSLSASVGDRVTITCRASQSISSYLNWYQQKPGKAPK LLIYYTSRLQSGVPSRFSGSGSGTDFTLTISSLQPEDFATYYCQQG RRLWSFGGGTKVEIKRTVAAPSVFIFPPSDEQLKSGTASVVCLLN NFYPREAKVQWKVDNALQSGNSQESVTEQDSKDSTYSLSSTLTL SKADYEKHKVYACEVTHQGLSSPVTKSFNRGEC |
| 31 | ANTI-HER3 HC PARENTAL (LALA) | EVQLLESGGGLVQPGGSLRLSCAASGFTFSSYAMSWVRQAPGK GLEWVSVTGAVGRSTYYPDSVKGRFTISRDNSKNTLYLQMNSLR AEDTAVYYCARWGDEGFDIWGQGTLVTVSSASTKGPSVFPLAPS SKSTSGGTAALGCLVKDYFPEPVTVSWNSGALTSGVHTFPAVLQ SSGLYSLSSVVTVPSSSLGTQTYICNVNHKPSNTKVDKRVEPKSC DKTHTCPPCPAPEAAGGPSVFLFPPKPKDTLMISRTPEVTCVVVD VSHEDPEVKFNWYVDGVEVHNAKTKPREEQYNSTYRVVSVLTVL HQDWLNGKEYKCKVSNKALPAPIEKTISKAKGQPREPQVYTLPPS REEMTKNQVSLTCLVKGFYPSDIAVEWESNGQPENNYKTTPPVL DSDGSFFLYSKLTVDKSRWQQGNVFSCSVMHEALHNHYTQKSLS LSPGK |
| 32 | ANTI-HER3 LC PARENTAL | DIQMTQSPSSLSASVGDRVTITCRASQGISNWLAWYQQKPGKAP KLLIYGASSLQSGVPSRFSGSGSGTDFTLTISSLQPEDFATYYCQQ YSSFPTTFGQGTKVEIKRTVAAPSVFIFPPSDEQLKSGTASVVCLL NNFYPREAKVQWKVDNALQSGNSQESVTEQDSKDSTYSLSSTLT LSKADYEKHKVYACEVTHQGLSSPVTKSFNRGEC |
| 33 | ANTI-IL-17 HC PARENTAL (LALA) | EVQLVESGGDLVQPGGSLRLSCAASGFTFSSYWMSWVRQAPGK GLEWVANIKQDGSEKYYVDSVKGRFTISRDNAKNSLYLQMNSLR AEDTAVYYCARDRGSLYYWGQGTLVTVSSASTKGPSVFPLAPSS KSTSGGTAALGCLVKDYFPEPVTVSWNSGALTSGVHTFPAVLQS SGLYSLSSVVTVPSSSLGTQTYICNVNHKPSNTKVDKRVEPKSCD KTHTCPPCPAPEAAGGPSVFLFPPKPKDTLMISRTPEVTCVVVDV SHEDPEVKFNWYVDGVEVHNAKTKPREEQYNSTYRVVSVLTVLH QDWLNGKEYKCKVSNKALPAPIEKTISKAKGQPREPQVYTLPPSR EEMTKNQVSLTCLVKGFYPSDIAVEWESNGQPENNYKTTPPVLD SDGSFFLYSKLTVDKSRWQQGNVFSCSVMHEALHNHYTQKSLSL SPGK |
| 34 | ANTI-IL-17 LC PARENTAL | AIQLTQSPSSLSASVGDRVTITCRPSQGINWELAWYQQKPGKAPK LLIYDASSLEQGVPSRFSGSGSGTDFTLTISSLQPEDFATYYCQQF NSYPLTFGGGTKVEIKRTVAAPSVFIFPPSDEQLKSGTASVVCLLN NFYPREAKVQWKVDNALQSGNSQESVTEQDSKDSTYSLSSTLTL SKADYEKHKVYACEVTHQGLSSPVTKSFNRGEC |
| 35 | ANTI-IL-18 HC PARENTAL (LALA) | EVQLVQSGAEVKKPGSSVKVSCKASGGTFKSYAISWVRQAPGQ GLEWMGNIIPMTGQTYYAQKFQGRVTITADESTSTAYMELSSLRS EDTAVYYCARAAYHPLVFDNWGQGTLVTVSSASTKGPSVFPLAP SSKSTSGGTAALGCLVKDYFPEPVTVSWNSGALTSGVHTFPAVL QSSGLYSLSSVVTVPSSSLGTQTYICNVNHKPSNTKVDKRVEPKS CDKTHTCPPCPAPEAAGGPSVFLFPPKPKDTLMISRTPEVTCVVV DVSHEDPEVKFNWYVDGVEVHNAKTKPREEQYNSTYRVVSVLTV LHQDWLNGKEYKCKVSNKALPAPIEKTISKAKGQPREPQVYTLPP SREEMTKNQVSLTCLVKGFYPSDIAVEWESNGQPENNYKTTPPV LDSDGSFFLYSKLTVDKSRWQQGNVFSCSVMHEALHNHYTQKSL SLSPGK |
| 36 | ANTI-IL-18 LC PARENTAL | DIVLTQPPSVSGAPGQRVTISCSGSSSNIGNHYVNWYQQLPGTAP KLLIYRNNHRPSGVPDRFSGSKSGTSASLAITGLQSEDEADYYCQ SWDYSGFSTVFGGGTKLTVLGQPKAAPSVTLFPPSSEELQANKA TLVCLISDFYPGAVTVAWKADSSPVKAGVETTTPSKQSNNKYAAS SYLSLTPEQWKSHRSYSCQVTHEGSTVEKTVAPTECS |
| 37 | ANTI-HER3 HC Q39K/K147D/S165R (LALA) | EVQLLESGGGLVQPGGSLRLSCAASGFTFSSYAMSWVRKAPGK GLEWVSVTGAVGRSTYYPDSVKGRFTISRDNSKNTLYLQMNSLR AEDTAVYYCARWGDEGFDIWGQGTLVTVSSASTKGPSVFPLAPS SKSTSGGTAALGCLVDDYFPEPVTVSWNSGALTRGVHTFPAVLQ SSGLYSLSSVVTVPSSSLGTQTYICNVNHKPSNTKVDKRVEPKSC |

TABLE 10-continued

Sequence Table

| SEQ ID NO | Description | Sequence |
|---|---|---|
| | | DKTHTCPPCPAPEAAGGPSVFLFPPKPKDTLMISRTPEVTCVVVD VSHEDPEVKFNWYVDGVEVHNAKTKPREEQYNSTYRVVSVLTVL HQDWLNGKEYKCKVSNKALPAPIEKTISKAKGQPREPQVYTLPPS REEMTKNQVSLTCLVKGFYPSDIAVEWESNGQPENNYKTTPPVL DSDGSFFLYSKLTVDKSRWQQGNVFSCSVMHEALHNHYTQKSLS LSPGK |
| 38 | ANTI-HER3 LC Q38D/Q124K/K169D | DIQMTQSPSSLSASVGDRVTITCRASQGISNWLAWYQDKPGKAP KLLIYGASSLQSGVPSRFSGSGSGTDFTLTISSLQPEDFATYYCQQ YSSFPTTFGQGTKVEIKRTVAAPSVFIFPPSDEKLKSGTASVVCLL NNFYPREAKVQWKVDNALQSGNSQESVTEQDSDDSTYSLSSTLT LSKADYEKHKVYACEVTHQGLSSPVTKSFNRGEC |
| 39 | ANTI-HER3 HC Q39D/K147/S165D (LALA) | EVQLLESGGGLVQPGGSLRLSCAASGFTFSSYAMSWVRDAPGK GLEWVSVTGAVGRSTYYPDSVKGRFTISRDNSKNTLYLQMNSLR AEDTAVYYCARWGDEGFDIWGQGTLVTVSSASTKGPSVFPLAPS SKSTSGGTAALGCLVKDYFPEPVTVSWNSGALTDGVHTFPAVLQ SSGLYSLSSVVTVPSSSLGTQTYICNVNHKPSNTKVDKRVEPKSC DKTHTCPPCPAPEAAGGPSVFLFPPKPKDTLMISRTPEVTCVVVD VSHEDPEVKFNWYVDGVEVHNAKTKPREEQYNSTYRVVSVLTVL HQDWLNGKEYKCKVSNKALPAPIEKTISKAKGQPREPQVYTLPPS REEMTKNQVSLTCLVKGFYPSDIAVEWESNGQPENNYKTTPPVL DSDGSFFLYSKLTVDKSRWQQGNVFSCSVMHEALHNHYTQKSLS LSPGK |
| 40 | ANTI HER3 LC Q38K/Q124D/K169 | DIQMTQSPSSLSASVGDRVTITCRASQGISNWLAWYQKKPGKAP KLLIYGASSLQSGVPSRFSGSGSGTDFTLTISSLQPEDFATYYCQQ YSSFPTTFGQGTKVEIKRTVAAPSVFIFPPSDEDLKSGTASVVCLL NNFYPREAKVQWKVDNALQSGNSQESVTEQDSKDSTYSLSSTLT LSKADYEKHKVYACEVTHQGLSSPVTKSFNRGEC |
| 41 | ANTI-IL-17 HC Q39K/K147D/S165R (LALA) | EVQLVESGGDLVQPGGSLRLSCAASGFTFSSYWMSWVRKAPGK GLEWVANIKQDGSEKYYVDSVKGRFTISRDNAKNSLYLQMNSLR AEDTAVYYCARDRGSLYYWGQGTLVTVSSASTKGPSVFPLAPSS KSTSGGTAALGCLVDDYFPEPVTVSWNSGALTRGVHTFPAVLQS SGLYSLSSVVTVPSSSLGTQTYICNVNHKPSNTKVDKRVEPKSCD KTHTCPPCPAPEAAGGPSVFLFPPKPKDTLMISRTPEVTCVVVDV SHEDPEVKFNWYVDGVEVHNAKTKPREEQYNSTYRVVSVLTVLH QDWLNGKEYKCKVSNKALPAPIEKTISKAKGQPREPQVYTLPPSR EEMTKNQVSLTCLVKGFYPSDIAVEWESNGQPENNYKTTPPVLD SDGSFFLYSKLTVDKSRWQQGNVFSCSVMHEALHNHYTQKSLSL SPGK |
| 42 | ANTI-IL-17 LC Q38D/Q124K/K169D | AIQLTQSPSSLSASVGDRVTITCRPSQGINWELAWYQDKPGKAPK LLIYDASSLEQGVPSRFSGSGSGTDFTLTISSLQPEDFATYYCQQF NSYPLTFGGGTKVEIKRTVAAPSVFIFPPSDEKLKSGTASVVCLLN NFYPREAKVQWKVDNALQSGNSQESVTEQDSDDSTYSLSSTLTL SKADYEKHKVYACEVTHQGLSSPVTKSFNRGEC |
| 43 | ANTI c-Kit HC Q39D/K147/S165D | EVQLVESGGGLVQPGGSLRLSCAASGFAFSGYYMAWVRDAPGK GLEWVANINYPGSSTYYLDSVKGRFTISRDNAKNSLYLQMNSLRA EDTAVYYCARGDYYGTTYWYFDVWGQGTTVTVSSASTKGPSVF PLAPSSKSTSGGTAALGCLVKDYFPEPVTVSWNSGALTDGVHTF PAVLQSSGLYSLSSVVTVPSSSLGTQTYICNVNHKPSNTKVDKRV EPKSCDKTHTCPPCPAPELLGGPSVFLFPPKPKDTLMISRTPEVT CVVVDVSHEDPEVKFNWYVDGVEVHNAKTKPREEQYNSTYRVV SVLTVLHQDWLNGKEYKCKVSNKALPAPIEKTISKAKGQPREPQV YTLPPSREEMTKNQVSLTCLVKGFYPSDIAVEWESNGQPENNYK TTPPVLDSDGSFFLYSKLTVDKSRWQQGNVFSCSVMHEALHNHY TQKSLSLSPGK |
| 44 | ANTI C-KIT LC Q38K/Q124D/K169 | DIQMTQSPSSLSASVGDRVTITCRASQSISSYLNWYQKKPGKAPK LLIYYTSRLQSGVPSRFSGSGSGTDFTLTISSLQPEDFATYYCQQG RRLWSFGGGTKVEIKRTVAAPSVFIFPPSDEDLKSGTASVVCLLN NFYPREAKVQWKVDNALQSGNSQESVTEQDSKDSTYSLSSTLTL SKADYEKHKVYACEVTHQGLSSPVTKSFNRGEC |
| 45 | ANTI c-Kit HC Q39K/K147D/S165R | EVQLVESGGGLVQPGGSLRLSCAASGFAFSGYYMAWVRKAPGK GLEWVANINYPGSSTYYLDSVKGRFTISRDNAKNSLYLQMNSLRA EDTAVYYCARGDYYGTTYWYFDVWGQGTTVTVSSASTKGPSVF PLAPSSKSTSGGTAALGCLVDDYFPEPVTVSWNSGALTRGVHTF PAVLQSSGLYSLSSVVTVPSSSLGTQTYICNVNHKPSNTKVDKRV EPKSCDKTHTCPPCPAPELLGGPSVFLFPPKPKDTLMISRTPEVT CVVVDVSHEDPEVKFNWYVDGVEVHNAKTKPREEQYNSTYRVV SVLTVLHQDWLNGKEYKCKVSNKALPAPIEKTISKAKGQPREPQV |

TABLE 10-continued

Sequence Table

| SEQ ID NO | Description | Sequence |
|---|---|---|
| | | YTLPPSREEMTKNQVSLTCLVKGFYPSDIAVEWESNGQPENNYK TTPPVLDSDGSFFLYSKLTVDKSRWQQGNVFSCSVMHEALHNHY TQKSLSLSPGK |
| 46 | ANTI C-KIT LC Q38D/Q124K/K169D | DIQMTQSPSSLSASVGDRVTITCRASQSISSYLNWYQDKPGKAPK LLIYYTSRLQSGVPSRFSGSGSGTDFTLTISSLQPEDFATYYCQQG RRLWSFGGGTKVEIKRTVAAPSVFIFPPSDEKLKSGTASVVCLLN NFYPREAKVQWKVDNALQSGNSQESVTEQDSDDSTYSLSSTLTL SKADYEKHKVYACEVTHQGLSSPVTKSFNRGEC |
| 47 | ANTI-IL-18 HC Q39D/K147/S165D (LALA) | EVQLVQSGAEVKKPGSSVKVSCKASGGTFKSYAISWVRDAPGQG LEWMGNIIPMTGQTYYAQKFQGRVTITADESTSTAYMELSSLRSE DTAVYYCARAAYHPLVFDNWGQGTLVTVSSASTKGPSVFPLAPS SKSTSGGTAALGCLVKDYFPEPVTVSWNSGALTDGVHTFPAVLQ SSGLYSLSSVVTVPSSSLGTQTYICNVNHKPSNTKVDKRVEPKSC DKTHTCPPCPAPEAAGGPSVFLFPPKPKDTLMISRTPEVTCVVVD VSHEDPEVKFNWYVDGVEVHNAKTKPREEQYNSTYRVVSVLTVL HQDWLNGKEYKCKVSNKALPAPIEKTISKAKGQPREPQVYTLPPS REEMTKNQVSLTCLVKGFYPSDIAVEWESNGQPENNYKTTPPVL DSDGSFFLYSKLTVDKSRWQQGNVFSCSVMHEALHNHYTQKSLS LSPGK |
| 48 | ANTI-IL-18 LC Q38K/E124D/N170K | DIVLTQPPSVSGAPGQRVTISCSGSSSNIGNHYVNWYQKLPGTAP KLLIYRNNHRPSGVPDRFSGSKSGTSASLAITGLQSEDEADYYCQ SWDYSGFSTVFGGGTKLTVLGQPKAAPSVTLFPPSSEDLQANKA TLVCLISDFYPGAVTVAWKADSSPVKAGVETTTPSKQSNKYAAS SYLSLTPEQWKSHRSYSCQVTHEGSTVEKTVAPTECS |
| 49 | VK1_39*01 ANTI-HER2 LC | DIQMTQSPSSLSASVGDRVTITCRASQSISSYLNWYQQKPGKAPK LLIYAASSLQSGVPSRFSGSGSGTDFTLTISSLQPEDFATYYCQQS YSTPLTFGQGTKVEIKRTVAAPSVFIFPPSDEQLKSGTASVVCLLN NFYPREAKVQWKVDNALQSGNSQESVTEQDSKDSTYSLSSTLTL SKADYEKHKVYACEVTHQGLSSPVTKSFNRGEC |
| 50 | Vλ3_9*01 ANTI-HER2 LC | SYELTQPLSVSVALGQTARITCGGNNIGSKNVHWYQQKPGQAPV LVIYRDSNRPSGIPERFSGSNSGNTATLTISRAQAGDEADYYCQV WDSSTVVFGGGTKLTVLGQPKAAPSVTLFPPSSEELQANKATLVC LISDFYPGAVTVAWKADSSPVKAGVETTTPSKQSNNKYAASSYLS LTPEQWKSHRSYSCQVTHEGSTVEKTVAPTECS |
| 51 | VK3_15*01 ANTI-HER2 LC | EIVMTQSPATLSVSPGERATLSCRASQSVSSNLAWYQQKPGQAP RLLIYGASTRATGIPARFSGSGSGTEFTLTISSLQSEDFAVYYCQQ YNNWPLTFGQGTKVEIKRTVAAPSVFIFPPSDEQLKSGTASVVCLL NNFYPREAKVQWKVDNALQSGNSQESVTEQDSKDSTYSLSSTLT LSKADYEKHKVYACEVTHQGLSSPVTKSFNRGEC |
| 52 | Vλ1_47*01 ANTI-HER2 LC | QSVLTQPPSASGTPGQRVTISCSGSSSNIGSNYVYWYQQLPGTA PKLLIYRNNQRPSGVPDRFSGSKSGTSASLAISGLRSEDEADYYC AAWDDSLSGWVFGGGTKLTVLGQPKAAPSVTLFPPSSEELQANK ATLVCLISDFYPGAVTVAWKADSSPVKAGVETTTPSKQSNNKYAA SSYLSLTPEQWKSHRSYSCQVTHEGSTVEKTVAPTECS |
| 53 | VK1_33*01 ANTI-HER2 LC | DIQMTQSPSSLSASVGDRVTITCQASQDISNYLNWYQQKPGKAPK LLIYDASNLETGVPSRFSGSGSGTDFTFTISSLQPEDIATYYCQQY DNLPLTFGQGTKVEIKRTVAAPSVFIFPPSDEQLKSGTASVVCLLN NFYPREAKVQWKVDNALQSGNSQESVTEQDSKDSTYSLSSTLTL SKADYEKHKVYACEVTHQGLSSPVTKSFNRGEC |
| 54 | ANTI-HER2 HC VH3_23*01 | EVQLLESGGGLVQPGGSLRLSCAASGFTFSSYAMSWVRQAPGK GLEWVSAISGSGGSTYYADSVKGRFTISRDNSKNTLYLQMNSLRA EDTAVYYCARWGGDGFYAMDYWGQGTLVTVSSASTKGPSVFPL APSSKSTSGGTAALGCLVKDYFPEPVTVSWNSGALTSGVHTFPA VLQSSGLYSLSSVVTVPSSSLGTQTYICNVNHKPSNTKVDKRVEP KSCDKTHTCPPCPAPELLGGPSVFLFPPKPKDTLMISRTPEVTCV VVDVSHEDPEVKFNWYVDGVEVHNAKTKPREEQYNSTYRVVSVL TVLHQDWLNGKEYKCKVSNKALPAPIEKTISKAKGQPREPQVYTL PPCREEMTKNQVSLWCLVKGFYPSDIAVEWESNGQPENNYKTTP PVLDSDGSFFLYSKLTVDKSRWQQGNVFSCSVMHEALHNHYTQK SLSLSPGK |
| 55 | ANTI-HER2 HC VH3_30*01 | QVQLVESGGGVVQPGRSLRLSCAASGFTFSSYGMHWVRQAPGK GLEWVAVISYEGSNKYYADSVKGRFTISRDNSKNTLYLQMNSLRA EDTAVYYCARWGGDGFYAMDYWGQGTLVTVSSASTKGPSVFPL APSSKSTSGGTAALGCLVKDYFPEPVTVSWNSGALTSGVHTFPA VLQSSGLYSLSSVVTVPSSSLGTQTYICNVNHKPSNTKVDKRVEP |

TABLE 10-continued

Sequence Table

| SEQ ID NO | Description | Sequence |
|---|---|---|
| | | KSCDKTHTCPPCPAPELLGGPSVFLFPPKPKDTLMISRTPEVTCV VVDVSHEDPEVKFNWYVDGVEVHNAKTKPREEQYNSTYRVVSVL TVLHQDWLNGKEYKCKVSNKALPAPIEKTISKAKGQPREPQVYTL PPCREEMTKNQVSLWCLVKGFYPSDIAVEWESNGQPENNYKTTP PVLDSDGSFFLYSKLTVDKSRWQQGNVFSCSVMHEALHNHYTQK SLSLSPGK |
| 56 | ANTI-HER2 HC VH3_15*01 | EVQLVESGGGLVKPGGSLRLSCAASGFTFSNAWMSWVRQAPGK GLEWVGRIKSKTEGGTTDYAAPVKGRFTISRDDSKNTLYLQMNSL KTEDTAVYYCARWGGDGFYAMDYWGQGTLVTVSSASTKGPSVF PLAPSSKSTSGGTAALGCLVKDYFPEPVTVSWNSGALTSGVHTF PAVLQSSGLYSLSSVVTVPSSSLGTQTYICNVNHKPSNTKVDKRV EPKSCDKTHTCPPCPAPELLGGPSVFLFPPKPKDTLMISRTPEVT CVVVDVSHEDPEVKFNWYVDGVEVHNAKTKPREEQYNSTYRVV SVLTVLHQDWLNGKEYKCKVSNKALPAPIEKTISKAKGQPREPQV YTLPPCREEMTKNQVSLWCLVKGFYPSDIAVEWESNGQPENNYK TTPPVLDSDGSFFLYSKLTVDKSRWQQGNVFSCSVMHEALHNHY TQKSLSLSPGK |
| 57 | ANTI-HER2 HC VH1_46*01 | QVQLVQSGAEVKKPGASVKVSCKASGYTFTSYYMHWVRQAPGQ GLEWMGIISPSGGSTSYAQKFQGRVTMTRDTSTSTVYMELSSLR SEDTAVYYCARWGGDGFYAMDYWGQGTLVTVSSASTKGPSVFP LAPSSKSTSGGTAALGCLVKDYFPEPVTVSWNSGALTSGVHTFP AVLQSSGLYSLSSVVTVPSSSLGTQTYICNVNHKPSNTKVDKRVE PKSCDKTHTCPPCPAPELLGGPSVFLFPPKPKDTLMISRTPEVTC VVVDVSHEDPEVKFNWYVDGVEVHNAKTKPREEQYNSTYRVVS VLTVLHQDWLNGKEYKCKVSNKALPAPIEKTISKAKGQPREPQVY TLPPCREEMTKNQVSLWCLVKGFYPSDIAVEWESNGQPENNYKT TPPVLDSDGSFFLYSKLTVDKSRWQQGNVFSCSVMHEALHNHYT QKSLSLSPGK |
| 58 | ANTI-HER2 HC VH5_51*01 | EVQLVQSGAEVKKPGESLKISCKGSGYSFTSYWIGWVRQMPGKG LEWMGIIYPGDSDTRYSPSFQGQVTISADKSISTAYLQWSSLKAS DTAMYYCARWGGDGFYAMDYWGRGTLVTVSSASTKGPSVFPLA PSSKSTSGGTAALGCLVKDYFPEPVTVSWNSGALTSGVHTFPAV LQSSGLYSLSSVVTVPSSSLGTQTYICNVNHKPSNTKVDKRVEPK SCDKTHTCPPCPAPELLGGPSVFLFPPKPKDTLMISRTPEVTCVV VDVSHEDPEVKFNWYVDGVEVHNAKTKPREEQYNSTYRVVSVLT VLHQDWLNGKEYKCKVSNKALPAPIEKTISKAKGQPREPQVYTLP PCREEMTKNQVSLWCLVKGFYPSDIAVEWESNGQPENNYKTTPP VLDSDGSFFLYSKLTVDKSRWQQGNVFSCSVMHEALHNHYTQKS LSLSPGK |
| 59 | ANTI-HER2 HC VH6_1*01 | QVQLQQSGPGLVKPSQTLSLTCAISGDSVSSSSAAWNWIRQSPS RGLEWLGRTYYRSKWYNDYAVSVKSRITINPDTSKNQFSLQLNSV TPEDTAVYYCARWGGDGFYAMDYWGQGTLVTVSSASTKGPSVF PLAPSSKSTSGGTAALGCLVKDYFPEPVTVSWNSGALTSGVHTF PAVLQSSGLYSLSSVVTVPSSSLGTQTYICNVNHKPSNTKVDKRV EPKSCDKTHTCPPCPAPELLGGPSVFLFPPKPKDTLMISRTPEVT CVVVDVSHEDPEVKFNWYVDGVEVHNAKTKPREEQYNSTYRVV SVLTVLHQDWLNGKEYKCKVSNKALPAPIEKTISKAKGQPREPQV YTLPPCREEMTKNQVSLWCLVKGFYPSDIAVEWESNGQPENNYK TTPPVLDSDGSFFLYSKLTVDKSRWQQGNVFSCSVMHEALHNHY TQKSLSLSPGK |
| 60 | ENGINEERED VK1_13*02 ANTI-IL-17 LC Q38D/Q124K/K169D | AIQLTQSPSSLSASVGDRVTITCRPSQGINWELAWYQDKPGKAPK LLIYDASSLEQGVPSRFSGSGSGTDFTLTISSLOPEDFATYYCQQF NSYPLTFGGGTKVEIKRTVAAPSVFIFPPSDEKLKSGTASVVCLLN NFYPREAKVQWKVDNALQSGNSQESVTEQDSDDSTYSLSSTLTL SKADYEKHKVYACEVTHQGLSSPVTKSFNRGEC |
| 61 | ENGINEERED VH3_7*01 ANTI-IL-17 HC Q39K/K147D/S165R | EVQLVESGGDLVQPGGSLRLSCAASGFTFSSYWMSWVRKAPGK GLEWVANIKQDGSEKYYVDSVKGRFTISRDNAKNSLYLQMNSLR AEDTAVYYCARDRGSLYYWGQGTLVTVSSASTKGPSVFPLAPSS KSTSGGTAALGCLVDDFPEPVTVSWNSGALTRGVHTFPAVLQS SGLYSLSSVVTVPSSSLGTQTYICNVNHKPSNTKVDKRVEPKSCD KTHTCPPCPAPELLGGPSVFLFPPKPKDTLMISRTPEVTCVVVDV SHEDPEVKFNWYVDGVEVHNAKTKPREEQYNSTYRVVSVLTVLH QDWLNGKEYKCKVSNKALPAPIEKTISKAKGQPREPQVCTLPPSR EEMTKNQVSLWCAVKGFYPSDIAVEWESNGQPENNYKTTPPVLD SDGSFFLVSKLTVDKSRWQQGNVFSCSVMHEALHNHYTQKSLSL SPGK |
| 62 | ENGINEERED VK1_39*01 | DIQMTQSPSSLSASVGDRVTITCRASQSISSYLNWYQKKPGKAPK LLIYAASSLQSGVPSRFSGSGSGTDFTLTISSLQPEDFATYYCQQS |

TABLE 10-continued

Sequence Table

| SEQ ID NO | Description | Sequence |
|---|---|---|
|  | ANTI-HER2 LC Q38K/Q124D | YSTPLTFGQGTKVEIKRTVAAPSVFIFPPSDEDLKSGTASVVCLLN NFYPREAKVQWKVDNALQSGNSQESVTEQDSKDSTYSLSSTLTL SKADYEKHKVYACEVTHQGLSSPVTKSFNRGEC |
| 63 | ENGINEERED Vλ3_9*01 ANTI-HER2 LC Q38K/N170R | SYELTQPLSVSVALGQTARITCGGNNIGSKNVHWYQKKPGQAPV LVIYRDSNRPSGIPERFSGSNSGNTATLTISRAQAGDEADYYCQV WDSSTVVFGGGTKLTVLGQPKAAPSVTLFPPSSEELQANKATLVC LISDFYPGAVTVAWKADSSPVKAGVETTTPSKQSRNKYAASSYLS LTPEQWKSHRSYSCQVTHEGSTVEKTVAPTECS |
| 64 | ENGINEERED VK3_15*01 ANTI-HER2 LC Q38K/Q124D | EIVMTQSPATLSVSPGERATLSCRASQSVSSNLAWYQKKPGQAP RLLIYGASTRATGIPARFSGSGSGTEFTLTISSLQSEDFAVYYCQQ YNNWPLTFGQGTKVEIKRTVAAPSVFIFPPSDEDLKSGTASVVCLL NNFYPREAKVQWKVDNALQSGNSQESVTEQDSKDSTYSLSSTLT LSKADYEKHKVYACEVTHQGLSSPVTKSFNRGEC |
| 65 | ENGINEERED Vλ1_47*01 ANTI-HER2 LC Q38K/N170R | QSVLTQPPSASGTPGQRVTISCSGSSSNIGSNYVYWYQKLPGTA PKLLIYRNNQRPSGVPDRFSGSKSGTSASLAISGLRSEDEADYYC AAWDDSLSGWVFGGGTKLTVLGQPKAAPSVTLFPPSSEELQANK ATLVCLISDFYPGAVTVAWKADSSPVKAGVETTTPSKQSRNKYAA SSYLSLTPEQWKSHRSYSCQVTHEGSTVEKTVAPTECS |
| 66 | ENGINEERED VK1_33*01 ANTI-HER2 LC Q38K/Q124D | DIQMTQSPSSLSASVGDRVTITCQASQDISNYLNWYQKKPGKAPK LLIYDASNLETGVPSRFSGSGSGTDFTFTISSLQPEDIATYYCQQ DNLPLTFGQGTKVEIKRTVAAPSVFIFPPSDEDLKSGTASVVCLLN NFYPREAKVQWKVDNALQSGNSQESVTEQDSKDSTYSLSSTLTL SKADYEKHKVYACEVTHQGLSSPVTKSFNRGEC |
| 67 | ENGINEERED ANTI-HER2 HC VH3_23*01 Q39D/S165D | EVQLLESGGGLVQPGGSLRLSCAASGFTFSSYAMSWVRDAPGK GLEWVSAISGSGGSTYYADSVKGRFTISRDNSKNTLYLQMNSLRA EDTAVYYCARWGGDGFYAMDYWGQGTLVTVSSASTKGPSVFPL APSSKSTSGGTAALGCLVKDYFPEPVTVSWNSGALTDGVHTFPA VLQSSGLYSLSSVVTVPSSSLGTQTYICNVNHKPSNTKVDKRVEP KSCDKTHTCPPCPAPELLGGPSVFLFPPKPKDTLMISRTPEVTCV VVDVSHEDPEVKFNWYVDGVEVHNAKTKPREEQYNSTYRVVSVL TVLHQDWLNGKEYKCKVSNKALPAPIEKTISKAKGQPREPQVYTL PPCREEMTKNQVSLWCLVKGFYPSDIAVEWESNGQPENNYKTTP PVLDSDGSFFLYSKLTVDKSRWQQGNVFSCSVMHEALHNHYTQK SLSLSPGK |
| 68 | ENGINEERED ANTI-HER2 HC VH3_30*01 Q39D/S165D | EVQLLESGGGLVQPGGSLRLSCAASGFTFSSYAMSWVRDAPGK GLEWVSAISGSGGSTYYADSVKGRFTISRDNSKNTLYLQMNSLRA EDTAVYYCARWGGDGFYAMDYWGQGTLVTVSSASTKGPSVFPL APSSKSTSGGTAALGCLVKDYFPEPVTVSWNSGALTDGVHTFPA VLQSSGLYSLSSVVTVPSSSLGTQTYICNVNHKPSNTKVDKRVEP KSCDKTHTCPPCPAPELLGGPSVFLFPPKPKDTLMISRTPEVTCV VVDVSHEDPEVKFNWYVDGVEVHNAKTKPREEQYNSTYRVVSVL TVLHQDWLNGKEYKCKVSNKALPAPIEKTISKAKGQPREPQVYTL PPCREEMTKNQVSLWCLVKGFYPSDIAVEWESNGQPENNYKTTP PVLDSDGSFFLYSKLTVDKSRWQQGNVFSCSVMHEALHNHYTQK SLSLSPGK |
| 69 | ENGINEERED ANTI-HER2 HC VH3_15*01 Q39D/S165D | EVQLVESGGGLVKPGGSLRLSCAASGFTFSNAWMSWVRDAPGK GLEWVGRIKSKTEGGTTDYAAPVKGRFTISRDDSKNTLYLQMNSL KTEDTAVYYCARWGGDGFYAMDYWGQGTLVTVSSASTKGPSVF PLAPSSKSTSGGTAALGCLVKDYFPEPVTVSWNSGALTDGVHTF PAVLQSSGLYSLSSVVTVPSSSLGTQTYICNVNHKPSNTKVDKRV EPKSCDKTHTCPPCPAPELLGGPSVFLFPPKPKDTLMISRTPEVT CVVVDVSHEDPEVKFNWYVDGVEVHNAKTKPREEQYNSTYRVV SVLTVLHQDWLNGKEYKCKVSNKALPAPIEKTISKAKGQPREPQV YTLPPCREEMTKNQVSLWCLVKGFYPSDIAVEWESNGQPENNYK TTPPVLDSDGSFFLYSKLTVDKSRWQQGNVFSCSVMHEALHNHY TQKSLSLSPGK |
| 70 | ENGINEERED ANTI-HER2 HC VH1_46*01 Q39D/S165D | QVQLVQSGAEVKKPGASVKVSCKASGYTFTSYYMHWVRDAPGQ GLEWMGIISPSGGSTSYAQKFQGRVTMTRDTSTSTVYMELSSLR SEDTAVYYCARWGGDGFYAMDYWGQGTLVTVSSASTKGPSVFP LAPSSKSTSGGTAALGCLVKDYFPEPVTVSWNSGALTDGVHTFP AVLQSSGLYSLSSVVTVPSSSLGTQTYICNVNHKPSNTKVDKRVE PKSCDKTHTCPPCPAPELLGGPSVFLFPPKPKDTLMISRTPEVTC VVVDVSHEDPEVKFNWYVDGVEVHNAKTKPREEQYNSTYRVVS VLTVLHQDWLNGKEYKCKVSNKALPAPIEKTISKAKGQPREPQVY TLPPCREEMTKNQVSLWCLVKGFYPSDIAVEWESNGQPENNYKT TPPVLDSDGSFFLYSKLTVDKSRWQQGNVFSCSVMHEALHNHYT QKSLSLSPGK |

TABLE 10-continued

Sequence Table

| SEQ ID NO | Description | Sequence |
|---|---|---|
| 71 | ENGINEERED ANTI-HER2 HC VH5_51*01 Q39D/S165D | EVQLVQSGAEVKKPGESLKISCKGSGYSFTSYWIGWVRDMPGKG LEWMGIIYPGDSDTRYSPSFQGQVTISADKSISTAYLQWSSLKAS DTAMYYCARWGGDGFYAMDYWGRGTLVTVSSASTKGPSVFPLA PSSKSTSGGTAALGCLVKDYFPEPVTVSWNSGALTDGVHTFPAV LQSSGLYSLSSWVTVPSSSLGTQTYICNVNHKPSNTKVDKRVEPK SCDKTHTCPPCPAPELLGGPSVFLFPPKPKDTLMISRTPEVTCVV VDVSHEDPEVKFNWYVDGVEVHNAKTKPREEQYNSTYRVVSVLT VLHQDWLNGKEYKCKVSNKALPAPIEKTISKAKGQPREPQVYTLP PCREEMTKNQVSLWCLVKGFYPSDIAVEWESNGQPENNYKTTPP VLDSDGSFFLYSKLTVDKSRWQQGNVFSCSVMHEALHNHYTQKS LSLSPGK |
| 72 | ENGINEERED ANTI-HER2 HC VH6_1*01 Q39D/S165D | QVQLQQSGPGLVKPSQTLSLTCAISGDSVSSSSAAWNWIRDSPS RGLEWLGRTYYRSKWYNDYAVSVKSRITINPDTSKNQFSLQLNSV TPEDTAVYYCARWGGDGFYAMDYWGQGTLVTVSSASTKGPSVF PLAPSSKSTSGGTAALGCLVKDYFPEPVTVSWNSGALTDGVHTF PAVLQSSGLYSLSSVVTVPSSSLGTQTYICNVNHKPSNTKVDKRV EPKSCDKTHTCPPCPAPELLGGPSVFLFPPKPKDTLMISRTPEVT CVVVDVSHEDPEVKFNWYVDGVEVHNAKTKPREEQYNSTYRVV SVLTVLHQDWLNGKEYKCKVSNKALPAPIEKTISKAKGQPREPQV YTLPPCREEMTKNQVSLWCLVKGFYPSDIAVEWESNGQPENNYK TTPPVLDSDGSFFLYSKLTVDKSRWQQGNVFSCSVMHEALHNHY TQKSLSLSPGK |
| 73 | ENGINEERED ANTI-IL-17 HC Q39K/G44C/K147D/ S165R/C220A | EVQLVESGGDLVQPGGSLRLSCAASGFTFSSYWMSWVRKAPGK CLEWVANIKQDGSEKYYVDSVKGRFTISRDNAKNSLYLQMNSLRA EDTAVYYCARDRGSLYYWGQGTLVTVSSASTKGPSVFPLAPSSK STSGGTAALGCLVDDYFPEPVTVSWNSGALTRGVHTFPAVLQSS GLYSLSSVVTVPSSSLGTQTYICNVNHKPSNTKVDKRVEPKSADK THTCPPCPAPELLGGPSVFLFPPKPKDTLMISRTPEVTCVVVDVS HEDPEVKFNWYVDGVEVHNAKTKPREEQYNSTYRVVSVLTVLHQ DWLNGKEYKCKVSNKALPAPIEKTISKAKGQPREPQVCTLPPSRE EMTKNQVSLSCAVKGFYPSDIAVEWESNGQPENNYKTTPPVLDS DGSFFLVSKLTVDKSRWQQGNVFSCSVMHEALHNHYTQKSLSLS PGK |
| 74 | ENGINEERED ANTI-IL-17 LC Q38D/Q100C/Q124K/ K169D/C214A | AIQLTQSPSSLSASVGDRVTITCRPSQGINWELAWYQDKPGKAPK LLIYDASSLEQGVPSRFSGSGSGTDFTLTISSLQPEDFATYYCQQF NSYPLTFGCGTKVEIKRTVAAPSVFIFPPSDEKLKSGTASVVCLLN NFYPREAKVQWKVDNALQSGNSQESVTEQDSDDSTYSLSSTLTL SKADYEKHKVYACEVTHQGLSSPVTKSFNRGEA |
| 75 | ENGINEERED ANTI-IL-17 HC G44C/C220A | EVQLVESGGDLVQPGGSLRLSCAASGFTFSSYWMSWVRQAPGK CLEWVANIKQDGSEKYYVDSVKGRFTISRDNAKNSLYLQMNSLRA EDTAVYYCARDRGSLYYWGQGTLVTVSSASTKGPSVFPLAPSSK STSGGTAALGCLVKDYFPEPVTVSWNSGALTSGVHTFPAVLQSS GLYSLSSVVTVPSSSLGTQTYICNVNHKPSNTKVDKRVEPKSADK THTCPPCPAPELLGGPSVFLFPPKPKDTLMISRTPEVTCVVVDVS HEDPEVKFNWYVDGVEVHNAKTKPREEQYNSTYRVVSVLTVLHQ DWLNGKEYKCKVSNKALPAPIEKTISKAKGQPREPQVCTLPPSRE EMTKNQVSLSCAVKGFYPSDIAVEWESNGQPENNYKTTPPVLDS DGSFFLVSKLTVDKSRWQQGNVFSCSVMHEALHNHYTQKSLSLS PGK |
| 76 | ENGINEERED ANTI-IL-17 LC Q100C/C214A | AIQLTQSPSSLSASVGDRVTITCRPSQGINWELAWYQQKPGKAPK LLIYDASSLEQGVPSRFSGSGSGTDFTLTISSLQPEDFATYYCQQF NSYPLTFGCGTKVEIKRTVAAPSVFIFPPSDEQLKSGTASVVCLLN NFYPREAKVQWKVDNALQSGNSQESVTEQDSKDSTYSLSSTLTL SKADYEKHKVYACEVTHQGLSSPVTKSFNRGEA |

The invention claimed is:

1. A method of preparing an heterodimeric IgG antibody or fragment thereof comprising an engineered VH and CH1 domain and an engineered VL and CL domain that correspond to form an interface, the method comprising substituting at least two amino acids in the VH and CH1 domains such that the engineered domains comprise an acidic amino acid at position 39, a basic amino acid at position 147 and an acidic amino acid at position 165, and substituting an amino acid in the VL and CL domains such that the engineered domains comprise a basic amino acid at position 38, an acidic amino acid at position 124 and a basic amino acid at position 169 or 170, and wherein said charged amino acids in the VH and CH1 domains and the corresponding amino acids of the interface in the VL and CL domains pairwise are of opposing charge, and form an interface that is electrostatically favourable to heterodimerization,
wherein the acidic amino acid is aspartic acid (D) or glutamic acid (E), the basic amino acid is arginine (R), lysine (K) or histidine (H), and
wherein the numbers are according to EU numbering.

2. The method of claim 1, wherein heterodimerization of at least 95% is achieved as determined by liquid chromatography-mass spectrometry.

3. The method of claim 1, wherein the engineered heavy chain variable domain is of the VH1, VH2, VH3, VH5 or VH6 subtype.

4. The method of claim 1, wherein the engineered light chain variable domain is of the Vκ1 or Vκ3 subfamily and comprises either (1) a basic amino acid at position 38, an acidic amino acid at position 124 and a basic amino acid at position 169 or (2) an acidic amino acid at position 38, a basic amino acid at position 124 and an acidic amino acid at position 169.

5. The method of claim 1, wherein the engineered light chain variable domain is of the Vλ1, Vλ2 or Vλ3 subfamily and comprises either (1) a basic amino acid at position 38, an acidic amino acid at position 124 and a basic amino acid at position 170 or (2) an acidic amino acid at position 38, a basic amino acid at position 124 and an acidic amino acid at position 170.

6. The method of claim 1, wherein the heterodimeric antibody or fragment thereof comprises an engineered light chain variable domain of the Vκ1 or Vκ3 subfamily and an engineered light chain variable domain of the VλI, Vλ2 or Vλ3 subfamily.

7. The method of claim 1, wherein the heterodimeric antibody or fragment thereof comprising an IgG Fc region.

8. The method of claim 7, wherein the IgG Fc region comprises a first CH3 region having a substitution at position 336 and a second CH3 region having a substitution at positions 336, 368 and 407.

9. The method of claim 7, wherein the IgG Fc region comprises a first CH3 region having a substitution at positions 336 and 354 and a second CH3 region having a substitution at positions 336, 368, 407 and 349.

10. The method of claim 9, wherein the first CH3 region comprises the substitutions T366W and S354C and the second CH3 region comprises the substitutions T366S, L368A, Y407A and Y349C.

11. The method of claim 1, wherein the heterodimeric antibody or fragment thereof comprises the substitutions selected from the group consisting of:
  i. Q39D and S165D in the VH and CH1, and Q38K the VL and CL;
  ii. Q39K and K147D in the VH and CH1, and Q38D and Q124K in the kappa VL and CL; and
  iii. Q39D and S165D in the VH and CH1, and Q38K and Q124D in the kappa VL and CL;
  iv. Q39K, K147D and S165R in the VH and CH1, and Q38D, Q124K and K169D in the kappa VL and CL;
  v. Q39D and S165D in the VH and CH1, and Q38K, E124D and N170K in the lambda VL and CL; and
  vi. Q39D and S165D in the VH and CH1, and Q38K and N170R in the lambda VL and CL.

12. The method of claim 1, wherein heterodimerization of up to 100% is achieved as determined by liquid chromatography-mass spectrometry.

13. The method of claim 1, wherein the heterodimeric IgG antibody or fragment thereof comprises an additional Fab comprising:
an engineered heavy chain variable domain (VH) and constant domain 1 (CH1) comprising an acidic amino acid at position 39, a basic amino acid at position 147 and an acidic amino acid at position 165; and an engineered light chain variable domain (VL) and constant domain (CL) comprising a basic amino acid at position 38, an acidic amino acid at position 124 and a basic amino acid at position 169 or 170, or
(b) an engineered VH domain and CH1 domain comprising a basic amino acid at position 39, an acidic amino acid at position 147 and a basic amino acid at position 165 and an engineered VL domain and CL domain comprising an acidic amino acid at position 38, a basic amino acid at position 124 and an acidic amino acid at position 169 or 170,
wherein said amino acids in the VH and CH1 domains and in the VL and CL domains pairwise are of opposing charge, and correspond to form an interface that is electrostatically favourable to heterodimerization; and
wherein the charges at each of positions 39, 147 and 165 in the engineered VH of one Fab are different to the charges at each of positions 39, 147 and 165 in the engineered VH of the additional Fab,
wherein the acidic amino acid is aspartic acid (D) or glutamic acid (E), the basic amino acid is arginine (R), lysine (K) or histidine (H), and
wherein the numbers are according to EU numbering.

14. The method of claim 13, wherein one Fab comprises the substitutions Q39K, K147D and S165R in the VH and CH1 and the substitutions Q38D, Q124K and K169D in the VL and CL; and the additional Fab comprises the substitutions Q39D and S165D in the VH and CH1 and substitutions in the VL and CL selected from (i) Q38K and Q124D in the kappa VL and CL; (ii) Q38K in the lambda VL; (iii) Q38K and N170R in the lambda VL and CL; or (iv) Q38K, E124D and N170K in the lambda VL and CL.

15. The method of claim 13, wherein an interchain disulfide bond of the additional Fab is replaced with an engineered VH-VL interchain disulfide bond.

16. The method 15 wherein one Fab comprises the substitutions Q39K, K147D and S165R in the VH and CH1 and the substitutions Q38D, Q124K and K169D in the VL and CL; and the additional Fab comprises the substitutions Q39D, G44C, S165D and C220A in the VH and CH1 and substitutions in the VL and CL selected from (i) Q38K, Q100C, Q124D and C214A in the kappa VL and CL; (ii) Q38K, G100C and C214A in the lambda VL; (iii) Q38K, G100C N170R and C214A in the lambda VL and CL; or (iv) Q38K, G100C, E124D, N170K and C214A in the lambda VL and CL.

* * * * *